United States Patent
Yoshinaga et al.

[11] Patent Number: 6,153,879
[45] Date of Patent: *Nov. 28, 2000

[54] INVISIBLE INFORMATION DETECTING APPARATUS

[75] Inventors: Kazuo Yoshinaga, Machida; Hiroshi Tanioka; Shinobu Arimoto, both of Yokohama; Toshio Hayashi, Kawasaki; Takehiko Nakai, Tokyo; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/624,955
[22] Filed: Mar. 27, 1996

Related U.S. Application Data

[62] Division of application No. 08/184,502, Jan. 19, 1994, Pat. No. 5,503,904.

[30] Foreign Application Priority Data

Jan. 19, 1993 [JP] Japan ......... 5-6975

[51] Int. Cl.$^7$ .................... G07D 7/20
[52] U.S. Cl. ............ 250/271; 250/341.8
[58] Field of Search ............... 250/271, 341.8

[56] References Cited

U.S. PATENT DOCUMENTS

| | | | |
|---|---|---|---|
| Re. 25,136 | 3/1962 | Carlson | 252/62.1 |
| 2,221,776 | 11/1940 | Carlson | 95/5 |
| 2,297,691 | 10/1942 | Carlson | 95/5 |
| 2,576,047 | 11/1951 | Schaffert | 101/426 |
| 2,618,551 | 11/1952 | Walkup | 95/1.9 |
| 2,618,552 | 11/1952 | Wise | 95/1.9 |
| 2,626,865 | 1/1953 | Mayo et al. | 95/1.9 |
| 2,638,146 | 5/1953 | Rounseville et al. | 154/1.76 |
| 2,638,416 | 5/1953 | Walkup et al. | 95/1.9 |
| 2,776,907 | 1/1957 | Carlson | 117/17.5 |
| 2,788,288 | 4/1957 | Rheinfrank et al. | 117/17.5 |
| 2,803,542 | 8/1957 | Ullrich, Jr. | 96/1 |
| 2,874,063 | 2/1959 | Greig | 117/17.5 |
| 2,962,374 | 11/1960 | Dessauer | 96/1 |
| 2,970,906 | 2/1961 | Bixby | 96/1 |
| 3,121,007 | 2/1964 | Middleton et al. | 96/1 |

(List continued on next page.)

FOREIGN PATENT DOCUMENTS

| | | |
|---|---|---|
| 0263446 | 4/1988 | European Pat. Off. . |
| 0542286 | 5/1993 | European Pat. Off. . |
| 0595583 | 5/1994 | European Pat. Off. . |
| 0599218 | 6/1994 | European Pat. Off. . |
| 59-180680 | 10/1984 | Japan ............... 250/271 |
| WO92 04192 | 3/1992 | WIPO . |

OTHER PUBLICATIONS

Patent Abstracts of Japan, vol. 9, No. 122 (p.–359) (1845) May 28, 1985 of JP–A–60–8880.

*Primary Examiner*—Constantine Hannaher
*Attorney, Agent, or Firm*—Fitzpatrick, Cella, Harper & Scinto

[57] ABSTRACT

An invisible information detection apparatus includes parts that irradiate a light onto a medium, detect infrared light generated from the medium, and judge a specific pattern consisting of a combination of two areas on the medium in accordance with the detection result. One of the areas represents higher reflectance than the reflectance of the medium in substantially the same infrared wavelength region, and the other area represents lower reflectance than that of the medium. An invisible information detection method comprises an irradiation step, a detection step and a judgment step. The judgment step judges a specific pattern of a combination of two areas on the medium in accordance with the result from the detection step. One of the areas represents higher reflectance, and the other area represents lower reflectance, as compared to the reflectance of the medium, in substantially the same infrared wavelength region.

12 Claims, 19 Drawing Sheets

U.S. PATENT DOCUMENTS

| | | | |
|---|---|---|---|
| 3,151,982 | 10/1964 | Corrsin | 96/1 |
| 3,166,432 | 1/1965 | Gundlach | 117/17.5 |
| 3,186,838 | 6/1965 | Graff, Jr. et al. | 96/1 |
| 4,238,524 | 12/1980 | LaLiberte et al. | 427/7 |
| 4,736,425 | 4/1988 | Jalon | 380/59 |
| 4,745,267 | 5/1988 | Davis et al. | 235/379 |
| 4,896,034 | 1/1990 | Kiriseko | 250/271 |
| 5,073,700 | 12/1991 | D'Onofrio | 235/436 |
| 5,210,411 | 5/1993 | Oshima et al. | 250/271 |
| 5,225,900 | 7/1993 | Wright | 358/501 |
| 5,264,310 | 11/1993 | Kawai | 430/5 |
| 5,289,547 | 2/1994 | Ligas et al. | 382/7 |
| 5,292,885 | 3/1994 | Krutak et al. | 528/289 |
| 5,318,943 | 6/1994 | Ueno et al. | 503/227 |

SIR-159

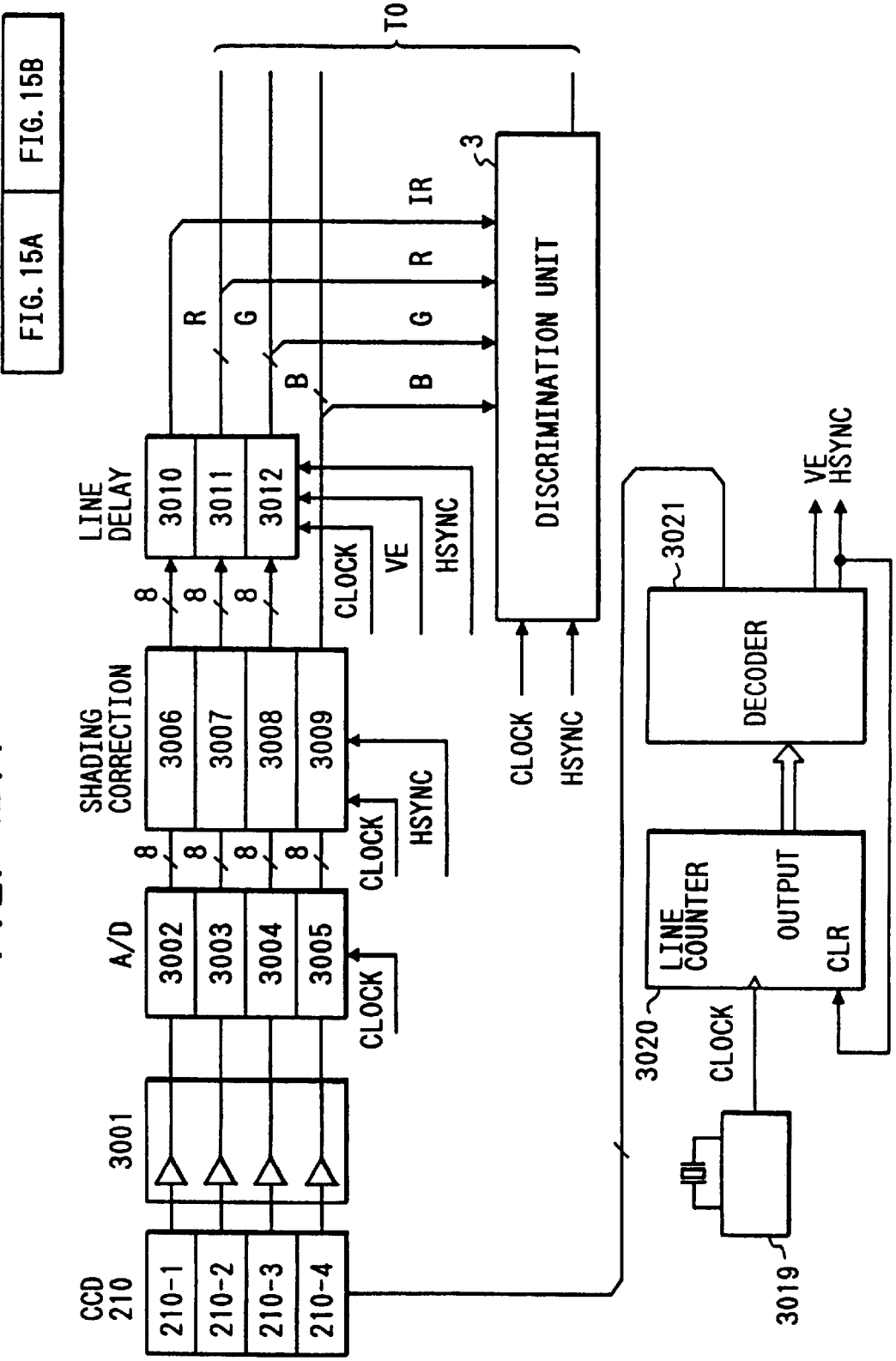

COMPOUND (51)

COMPOUND (56)

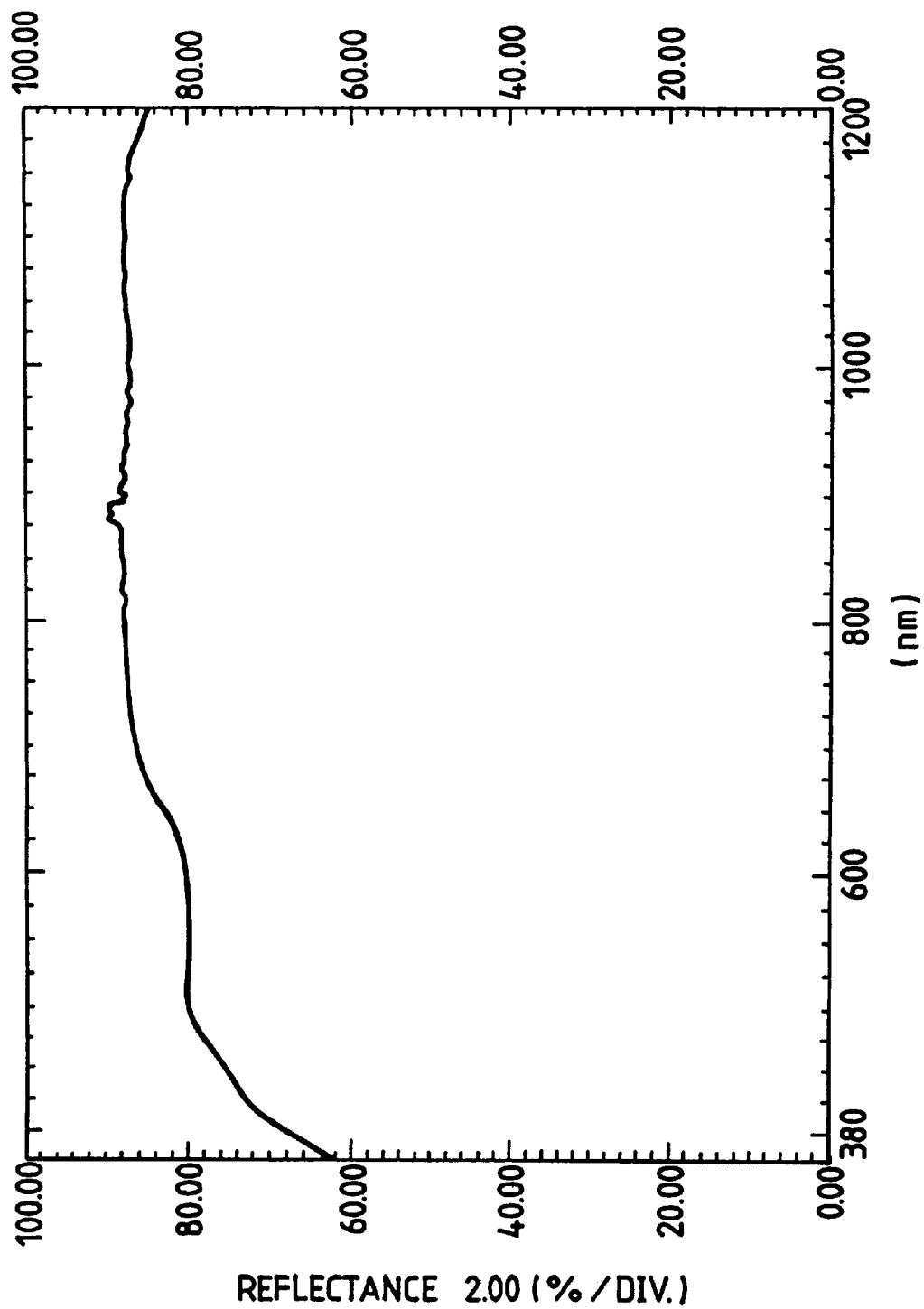

INVISIBLE INFORMATION DETECTING APPARATUS

This application is a division of application Ser. No. 08/184,502 filed Jan. 19, 1994, now U.S. Pat. No. 5,503,904.

BACKGROUND OF THE INVENTION

1. Field of the Invention

The present invention relates to an invisible information recorded medium on which invisible information has been recorded, a detecting apparatus for detecting the invisible information and a recording agent for recording the invisible information.

2. Related Background Art (1) Hitherto, the trend of improving the performance of copying machines arises a risk of forgery of bills, securities and notes and the like. Therefore, there arises a necessity of judging whether or not forgery of the bill or the like has been performed. Further, the forgery of the bills must be previously detected and prevented. In order to prevent the forgery, there have suggested a marking method using a ultraviolet ray exciting fluorescent pigment, a method using a diffraction phenomenon such as hologram, a method of applying a magnetic substance to be detected by a magnetic head, a method using color change occurring due to photochromism and a method of discriminating a specific image, such as a bill, by image recognition.

(2) With the improvement in the performance of the copying machine and so forth, copying of various information items can easily be performed.

On the other hand, privacy guarding and trade secret confidence have been considered important, causing a problem to arise in that copying can easily be performed.

Hitherto, the foregoing copying has been prevented by bonding a special film to the document or the like to cause the copied image to be deteriorated or to cause the forgery to be informed.

(3) A method has been known which is arranged in such a manner that an image is formed on the surface of a photoconductive material by an electrostatic method and then the image is developed. As disclosed in U.S. Pat. No. 2,297,691 filed by C. F. Carlson, the basic electrophotographic method comprises the steps of uniformly loading static electricity onto a photoconductive insulating layer, exposing the layer to a light and dark image to delete the electric charge of the region exposed to light, and allowing fine substance called a toner to adhere to an electrostatic latent image thus-obtained so that the foregoing electrostatic latent image is developed.

The toner is usually attracted to a region of a layer in which the charge is left, causing a toner image corresponding to the electrostatic latent image to be formed.

Then, the thus-formed powder image can be transferred onto the surface of a supporting member, such as paper. The transferred image can permanently be secured onto the surface of the supporting member with, for example, heat.

In place of forming the latent image by uniformly charging the layer of the photoconductive layer and by exposing the layer to the light and dark image, the latent image may be formed by directly charging the layer in the form of the image.

If the process of transferring the powder image is intended to be omitted, the powder image may be secured to the photoconductive layer. Another method may be employed in which an adequate fixing means, such as solvent treatment or outer layer coating process, is employed in place of the heat fixing process.

There have been some known methods of using toner particles as the electrostatic latent image to be developed. One of the developing methods has been disclosed in U.S. Pat. No. 2,618,552 filed by E. N. Wise which is a cascade development method.

The cascade development method comprises the steps of carrying a developer composed of relatively large carrier particles having fine tone particles electrostatically coated on the carrier to the surface of electrostatic latent image carrying surface as to be rolled or cascaded.

The composition of the carrier particles is so selected that the toner particles are charged in a frictional charge manner to a desired polarity.

When the mixture is cascaded or rolled while exceeding the development carrying surface, the toner particles are allowed to electrostatically adhere and secure to the charged portion of the dissolved image but the same does not adhere to the portion, in which the image is not charged, that is, the base portion.

The toner particles accidentally allowed to adhere to the base portion are substantially removed with the rolling carrier due to a fact that the electrostatic attractive force between the toner and the carrier is larger than that between the toner and the non-charged base portion.

The carrier and the excess toner are then recirculated. The foregoing method is significantly effective to develop a linear copied image.

Another method for developing the electrostatic image is a magnetic brush method as disclosed in, for example, U.S. Pat. No. 2,874,063. The foregoing method comprises the step of carrying a developing substance containing a toner and magnetic carrier particles with a magnet. The magnetic field of the magnet arranges the magnetic carrier to be formed into a brush-like shape. The magnetic brush comes in contact with the surface of the electrostatic image carrying surface, causing the toner particles to be attracted from the brush to the latent image with the electrostatic attractive force.

Another method capable of developing the electrostatic latent image is a powder cloud method as disclosed in, for example, U.S. Pat. No. 2,221,776 filed by C. F. Carlson. The foregoing method comprises the step of allowing to pass a developing substance containing electrically charged toner particles in a gaseous fluid through a position adjacent to the surface carrying the electrostatic latent image. The toner particles are attracted from the gas to the latent image by the electrostatic attractive force. The foregoing method is significantly effective to develop an image in which light portions and dark portions are distributed continuously.

A touch-down method disclosed in U.S. Pat. No. 3,166,432 filed by R. W. Gundlach may be employed if necessary.

Among the foregoing available methods, the magnetic brush method has been widely used.

Although the foregoing methods are used to make a black and white copied product, they are able to form an image in another color or an image formed by combining colors.

Similarly to another coloring method, an electrophotographic coloring method is usually based on a color-additive or subtractive color formation type synthesis of three colors. That is, if the electrophotographic method is performed in a full color manner, three or more color toners, that is, developing particles must be used to synthesize any desired color.

In order to color-copy a full-color original, three or more color decomposed images are mutually matched and combined with one another. In the color electrophotography, three or more electrostatic images are, as described above, generated by exposing a photosensitive member to an optical color decomposed image as disclosed in, for example, U.S. Pat. No. 2,962,374.

The electrostatic latent images respectively are developed by different color toners, and then the three-type toner images are combined with each other so that a final image is formed. The combination of the three color toner images are usually formed on a copying sheet, such as paper, and the toner image is permanently fixed on the sheet.

The most ordinary method for fixing the toner images on a paper copying sheet is a method comprising the steps of using a resin toner containing a coloring agent and fusing the toner image onto the copying sheet with heat.

The image may be fixed by another method, for example, it is exposed to molten vapor. With the progress of the copying method, information confidence becomes an important fact.

Forgery copying has been prevented by a method comprising the step of bonding a special film to the document or the like to deteriorate the quality of the copied image or a method of clearing the forgery copying.

(1) However, the method using the ultraviolet rays exciting fluorescent pigment encounters a problem in that a countermeasure can be taken because the fluorescent pigment can easily be detected by an ultraviolet irradiation means, such as a black lamp. Further, the necessity of using a ultraviolet ray source in the apparatus makes the optical system to be complicated. The method using the diffraction phenomenon, such as hologram, encounters a problem in that the formation of the mark on the bill or the like raises the cost. The method of applying the magnetic substance arises a necessity of bringing the bill or the like into contact with the magnetic head in a hermetical manner, causing a problem to arise in that the structure to be complicated. The method using photochromism suffers from instability of the photochromism compound. The method based on the image recognition requires a large quantity of data to recognize all bills and securities and so forth, causing a heavy load to be burden by the apparatus and the cost to be enlarged.

Another method using near infrared fluorescent has been disclosed to overcome the foregoing problems, so that a long life light emitting diode is enabled to be used, and therefore an influence of contamination can be prevented satisfactorily.

If the near infrared ray absorbing film or the like is used between the detecting apparatus and the original document, there arises a problem in that the detection cannot easily be performed. The necessity of individually using a light emitting diode and a photodiode sensitive to long wavelength causes the structure of the apparatus to be complicated.

(2) However, each of the foregoing conventional methods has been structured to correspond to analog copying machines. Therefore, it has been difficult to prevent the forgery copying and reading in a copying machine or a printer comprising a reading unit using a CCD or the like.

Therefore, it is preferable that the detection apparatus identifies that the recorded medium is the copy and read inhibited medium to stop the operation.

Each of the foregoing identifying marks has a problem.

(3) However, each of the foregoing conventional methods has been structured to correspond to analog copying machines. Therefore, it is unsatisfactory to realize secret confidence with a copying machine or a printer comprising a reading unit using a CCD or the like. The fact that the easy recognition arises a problem in that an effective secret confidence method has not been realized against reproduction writing and photography.

SUMMARY OF THE INVENTION

The present invention is directed to overcome the foregoing problems. Accordingly, an object of the present invention is to provide a recorded medium on which invisible information is recorded to cheaply and assuredly judging a specific image, such as a bill, and an invisible information detecting apparatus for detecting and using the mark.

Another object of the present invention is to provide an invisible information recorded medium serving as recording paper with which a fact that the subject original document is a copy inhibited special original document can easily be identified.

Another object of the present invention is to provide a novel recording agent for use in an image forming apparatus, such as a copying machine, and more particularly in an electrophotographic apparatus.

In order to achieve the foregoing objects, according to one aspect of the present invention, there is provided an invisible information recorded medium comprising an identification mark recorded tehreon, said identification mark being composed of a region having a high reflectance and a region having a low reflectance in the same near infrared wavelength as compared with the reflectance of said medium.

According to another aspect of the present invention, there is provided an invisible information detecting apparatus comprising: detection means for detecting a region having a high reflectance and a region having a low reflectance with respect to the reflectance of the medium in the same infrared ray region; and judging means for judging a specific original document in accordance with the results of detection performed by said detection means.

According to another aspect of the present invention, there is provided an invisible information recorded medium for use to record image, comprising: a visible region having no information recorded thereon; and an identification mark, the reflectance of which is changed in the near infrared ray region.

According to another aspect of the present invention, there is provided a recording agent comprising toner particles containing a resin and a coloring material, wherein said coloring material is near infrared ray absorbing coloring material or pigment free from absorption in a visible region and absorbed in the near infrared ray region.

Other and further objects, features and advantages of the invention will be appear more fully from the following description.

BRIEF DESCRIPTION OF THE DRAWINGS

FIG. 21 illustrates reflection spectrum of a medium having the identification pattern recorded thereon;

DESCRIPTION OF THE PREFERRED EMBODIMENT

First Embodiment

Figure 1A:
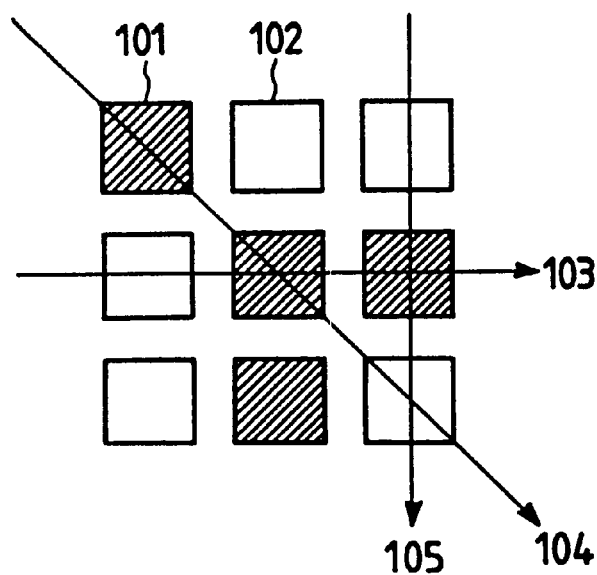
FIGS. 1A and 1B are structural views which illustrate a specific original document identification pattern according to a first embodiment of the present invention.

This embodiment is arranged in such a manner that a invisible information recorded medium having an identification mark, which is composed of a region having a relatively high reflectance as compared with the reflectance of a medium at the same near infrared wavelength and a region having a low reflectance, and an apparatus for detecting the medium are used to assuredly judge a specific original document with a low cost.

Further, the specific original document can be judged while preventing an erroneous recognition in a case where a judgment prevention is performed while using an infrared ray absorption film or an infrared reflective film.

Preferred embodiments of the present invention will now be described.

The operation of recording the region will now be described which has a higher reflectance as compared with the reflectance of a medium and arranged to be used to record an identification mark having invisible information recorded for recognizing bills, securities and notes and the like (copy inhibited original documents which are subjects of the forgery inhibition) and inhibiting copying of them. Fluorescent coloring material or pigment is dissolved or dispersed in a binder so that a predetermined pattern is formed on the copy inhibition original document by printing or the like. The fluorescent coloring material or pigment may be a material having the fluorescent wavelength peak in a range of 700 nm or longer, preferably 750 nm or longer. Since the material having the fluorescent wavelength peak in a range of 700 nm or shorter can be visually detected, the secrecy cannot satisfactorily be maintained. If a material having the fluorescent wavelength peak in a range of 1100 nm or longer is used, sensitivity of a Si-type photo-detection device, such as a CCD, deteriorates. In this case, the identification mark cannot accurately be judged. It is further preferable to employ a fluorescent coloring material or pigment having the fluorescent wavelength peak in a range of 1000 nm or shorter. Since the near infrared fluorescent rays can be detected when they are separated from exciting rays, it is preferable that the two types of the rays have wavelengths which are considerably different from each other. Therefore, near infrared fluorescent coloring material or pigment and exciting rays are selected such that they are different from each other by 50 nm or more, preferably 100 nm or more. The exciting wavelength is selected depending upon the type of the light source and the spectral filter.

The near infrared fluorescent coloring material may be a xanthene, oxazine, thiazine, polymethine or stryl compound. As an inorganic compound, a solid laser material of a type containing a rare earth element is used.

More specifically, any one of the following near infrared fluorescent coloring material may be used. However, a material may be used regardless of the exemplified materials if it has fluorescent rays in the near infrared ray region and exhibits excellent fluorescent quantum yield, weather and light resistance.

Compounds (1) to (61)

The binder resin for use in the foregoing near infrared fluorescent coloring material or pigment may be a urea resin, melamine resin, alkyd resin, acryl resin, vinyl chloride resin, aromatic sulfonamide resin, or a benzoquanamine resin or their copolymer. By using a ultraviolet absorber or an anti-oxidant with the foregoing resin, the light resistance of the resin can be improved. The binder resin can be manufactured by a block resin crushing method, emulsification polymerizing method or a resin precipitation method or the like.

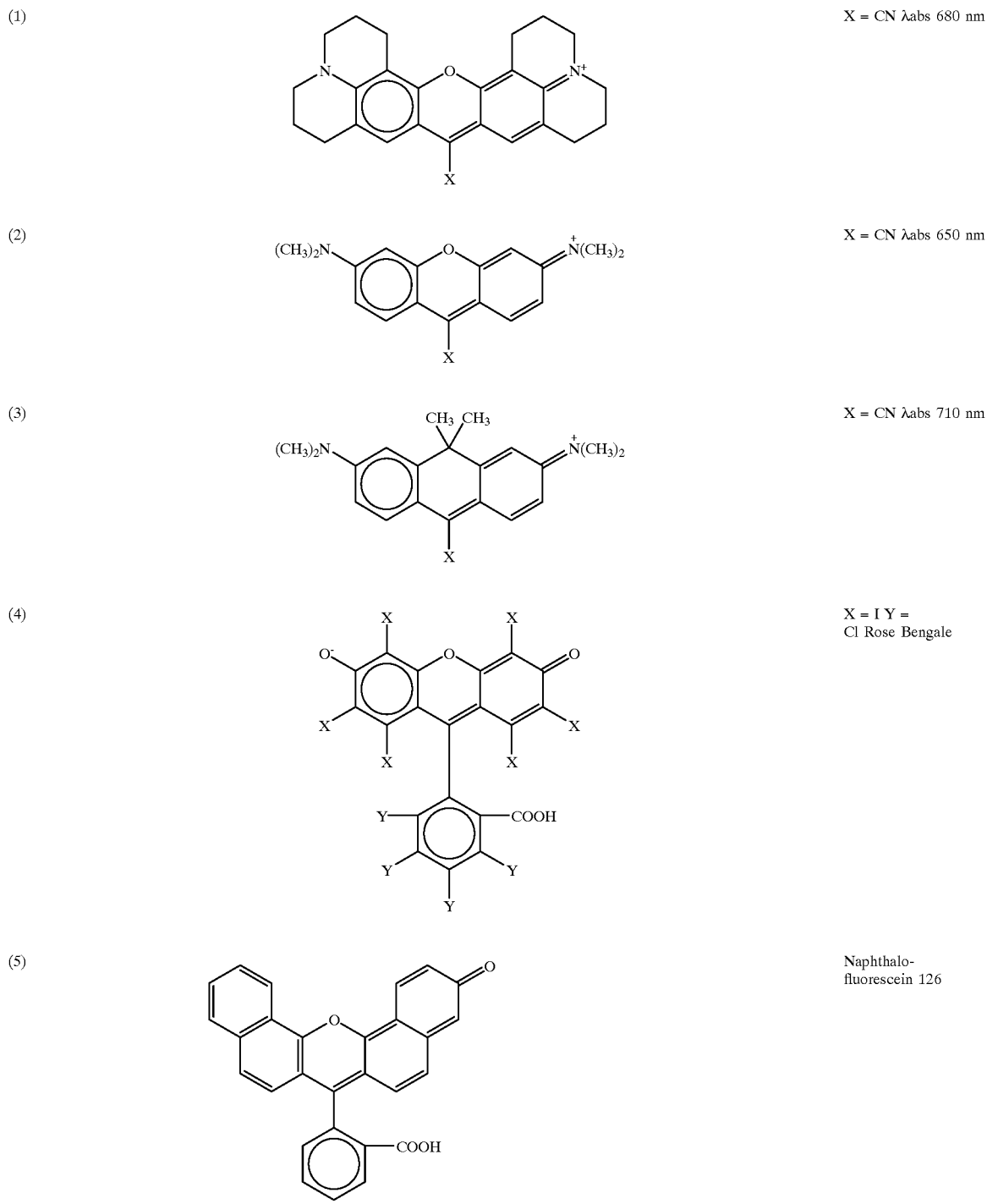

-continued
(6) 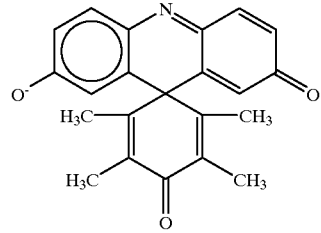 Carbazine 122
(7) 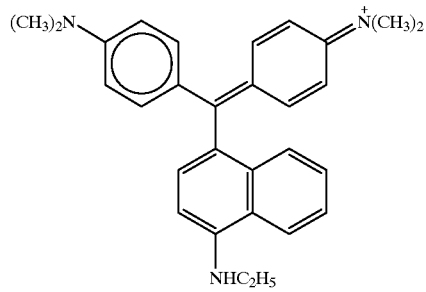 Victoria Blue R
(8) 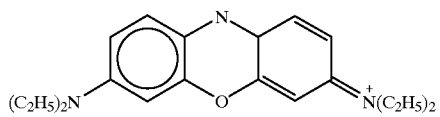 λabs 650 nm
(9) 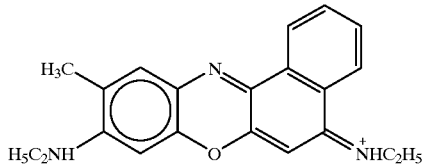 λabs 620 nm
(10) 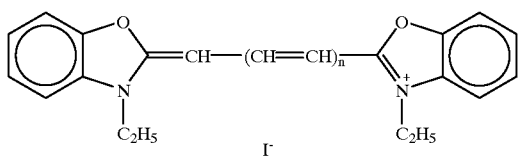 n = 3 λabs 690 nm
(11) 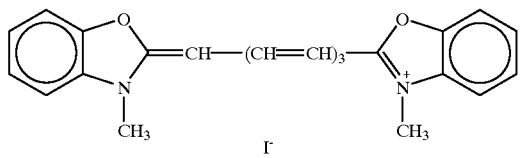 λabs 680 nm
(12) 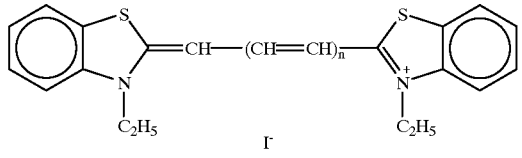 n = 2 λabs 650 nm
n = 3 λabs 760 nm
(13) 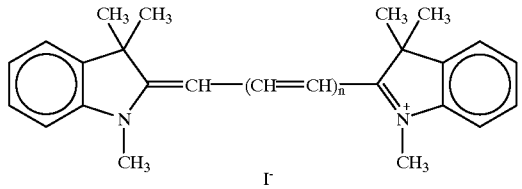 λabs 740 nm -continued
(14) 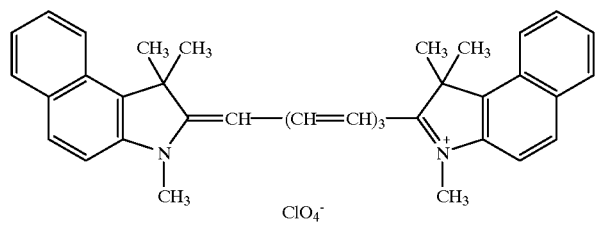 λabs 780 nm
(15) 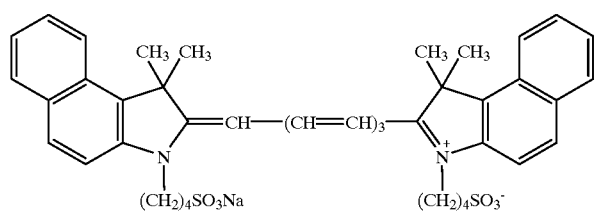 λabs 790 nm
(16) 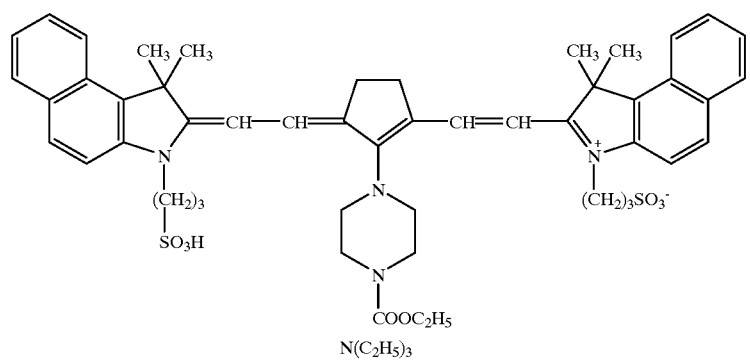 λabs 745 nm
(17) 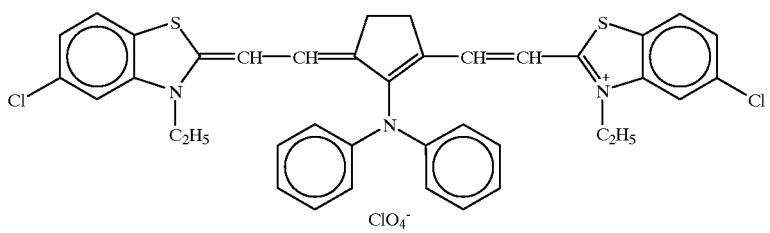 λabs 820 nm
(18) 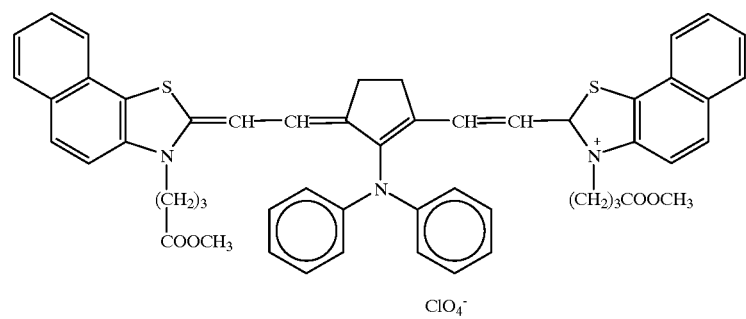

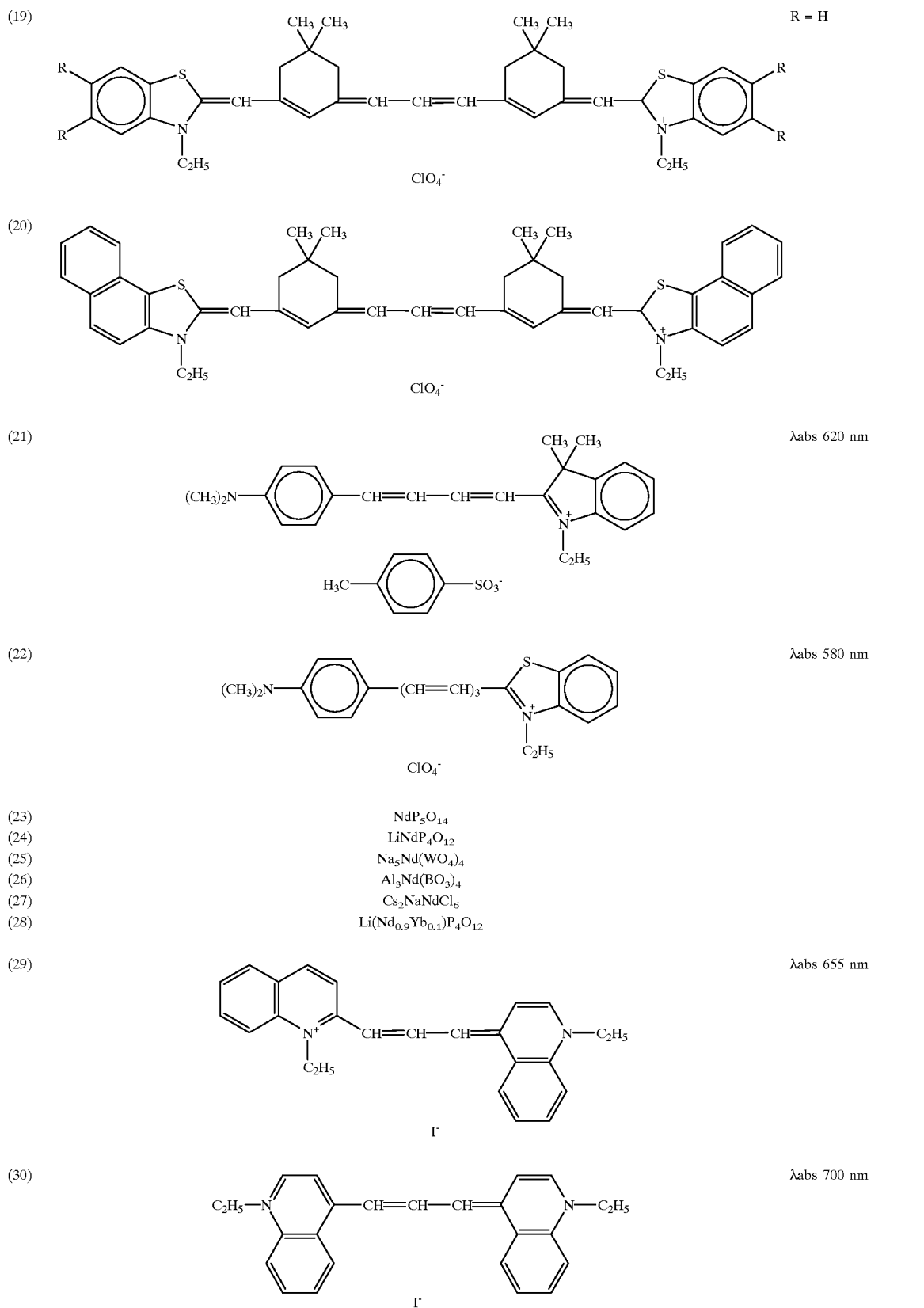

-continued
(31) 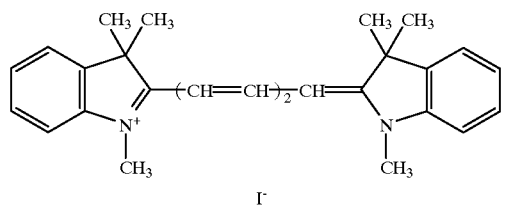 λabs 640 nm
(32) 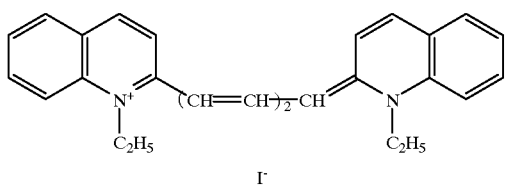 λabs 705 nm
(33) 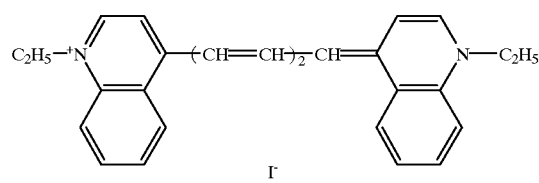 λabs 810 nm
(34) 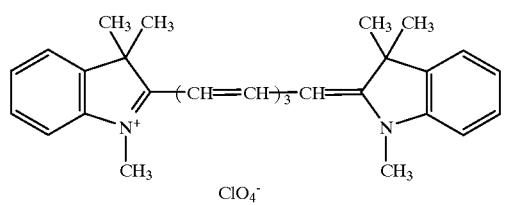 λabs 740 nm
(35) 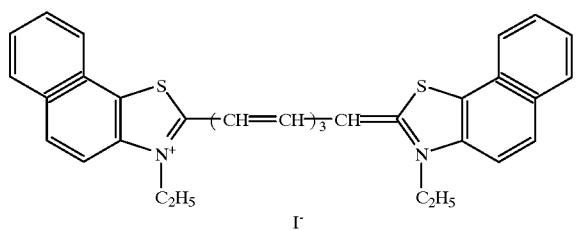 λabs 790 nm
(36) 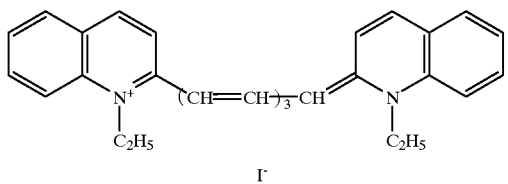 λabs 820 nm
(37) 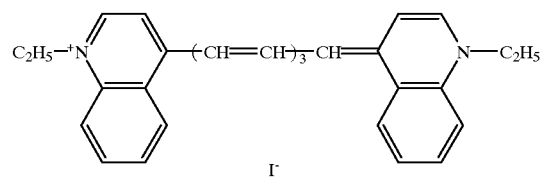 λabs 930 nm -continued
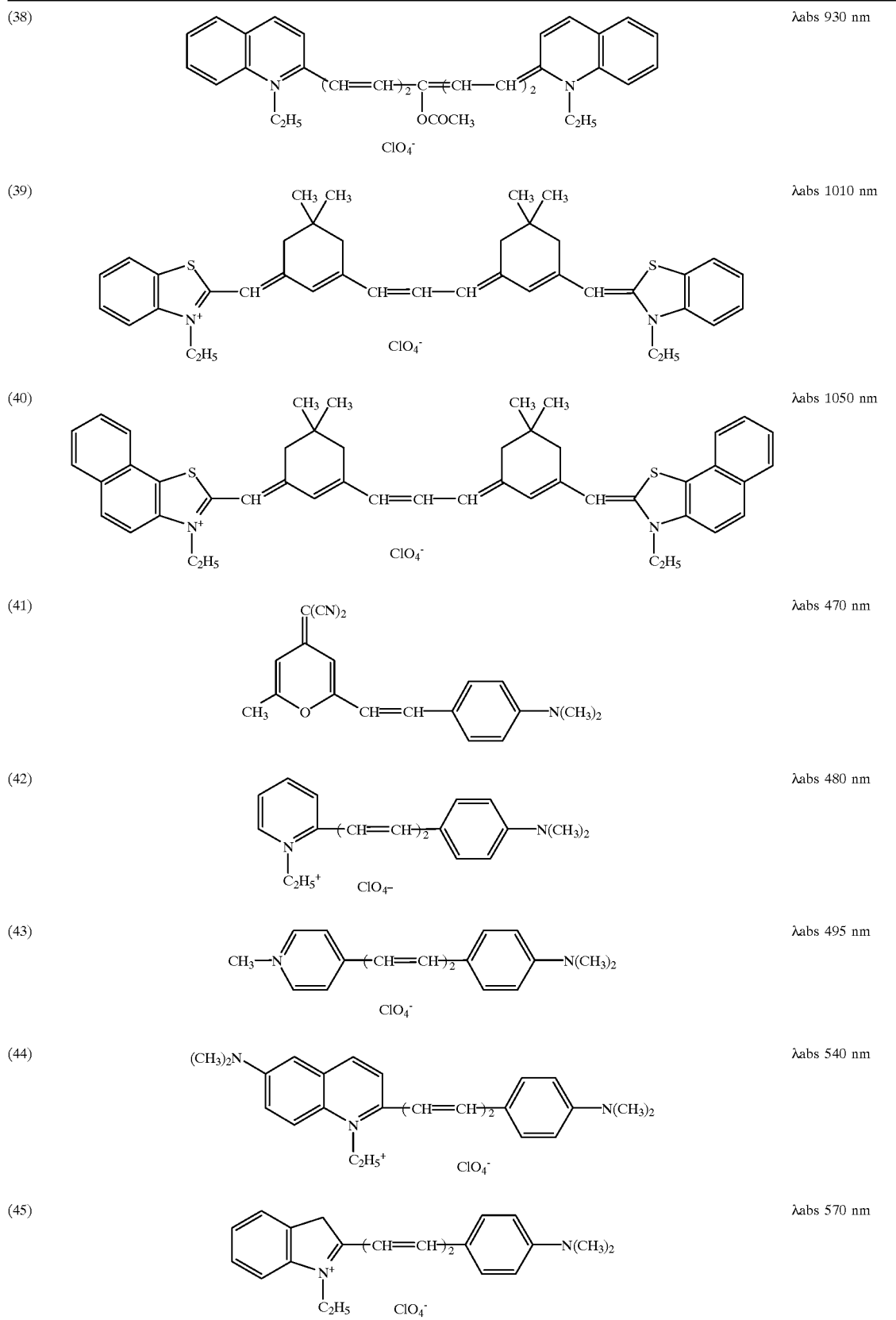

-continued
(46) 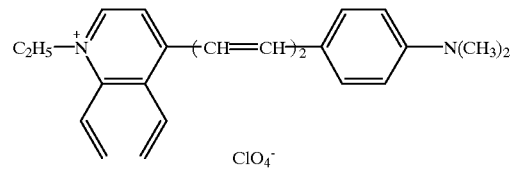 λabs 570 nm
(47) 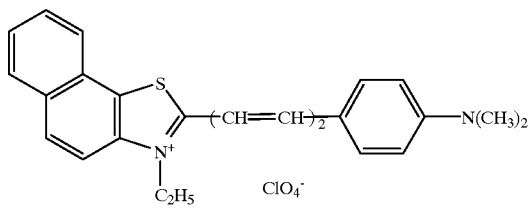 λabs 570 nm
(48) 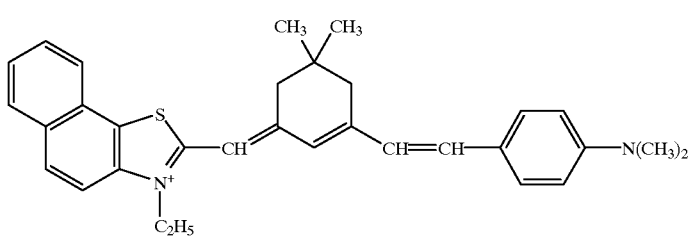 λabs 580 nm
(49) 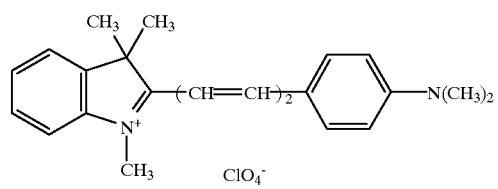 λabs 610 nm
(50) 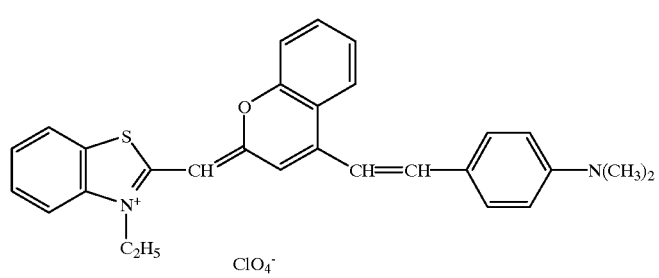 λabs 600 nm
(51) 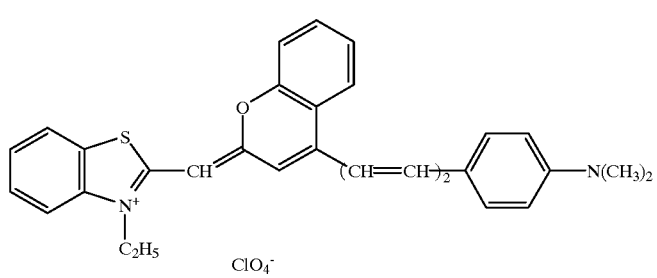 λabs 610 nm

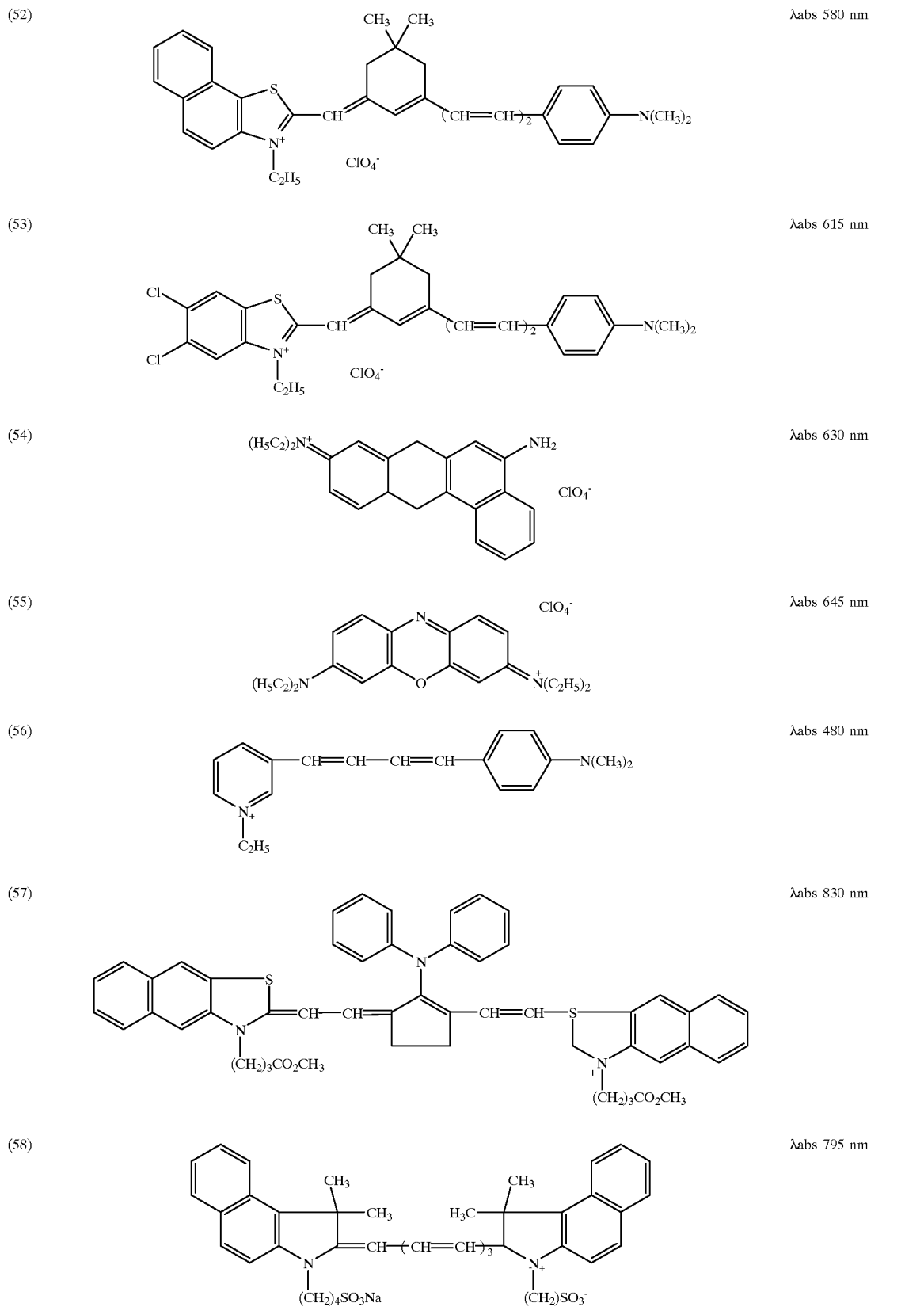

-continued

(59) 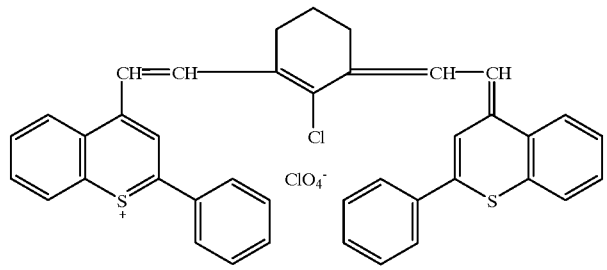 λabs 1080 nm

| (60) | Nichia Chemical Industry NP-870 | λabs 250 nm |
| (61) | LiAlO$_2$: Fe$^{3+}$ | λabs 250 nm |

The material of a type in which the near infrared fluorescent coloring material is dispersed or mixed in the binder may be used while being combined with a usual coloring material or pigment. It is preferable that the usual coloring material or pigment to be used while being combined do not absorb the exciting wavelength for the near infrared fluorescent coloring material. If the exciting wavelength for the near infrared fluorescent coloring material or pigment is not included in the visible ray region, covering with the usual coloring material or pigment or white pigment is able to improve the confidentiality of the copy prevention function.

The region which has a higher reflectance as compared with the reflectance of the medium and arranged to be used to record an identification mark having invisible information recorded for recognizing bills, securities and notes and the like (copy inhibited original documents which are subjects of the forgery inhibition) and inhibiting copying of them is formed by dissolving or dispersing the color material or pigment which is absorbed in the infrared ray region and by printing a predetermined pattern in the copy-inhibited original document.

The near infrared fluorescent coloring material or pigment can be a material having the absorption wavelength peak in a region of 700 nm or longer, preferably 750 nm or longer. Since the material having the fluorescent wavelength peak in a range of 700 nm or shorter can be visually detected, the secrecy cannot satisfactorily be maintained. If a material having the fluorescent wavelength peak in a range of 1100 nm or longer is used, sensitivity of a Si-type photo-detection device, such as a CCD, deteriorates. In this case, the identification mark cannot accurately be judged. It is further preferable to employ a fluorescent coloring material or pigment having the fluorescent wavelength peak in a range of 1000 nm or shorter. The material of a type in which the near infrared fluorescent coloring material is dispersed or mixed in the binder may be used while being combined with a usual coloring material or pigment. It is preferable that the near infrared fluorescent coloring material do not absorb the exciting wavelength for the near infrared fluorescent coloring material. The inhibition of the absorption of visible rays enables covering and improves the confidentiality of the copy inhibition function.

Specifically, the near infrared fluorescent coloring material or pigment that can be used is as follows. However, a material which can be absorbed in the infrared region, which has a large absorption coefficient and which exhibits excellent weather and light resisntace.

Compounds (62) to (126)

The binder resin for use in the foregoing near infrared fluorescent coloring material or pigment may be a urea resin, melamine resin, alkyd resin, acryl resin, vinyl chloride resin, aromatic sulfonamide resin, or a benzoquanamine resin or their copolymer.

(62) 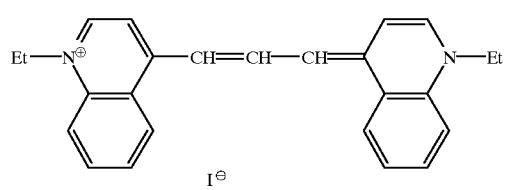 λ$_{max}$ = 706 nm

(63) 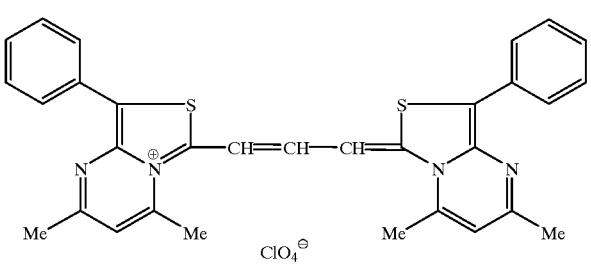 λ$_{max}$ = 791 nm

-continued
(64) 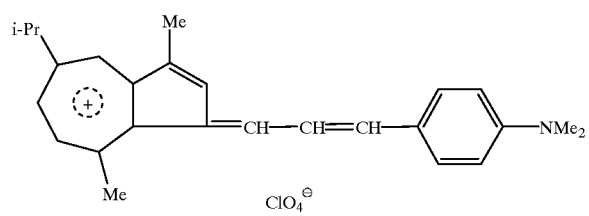 λ_max = 728 nm
(65) 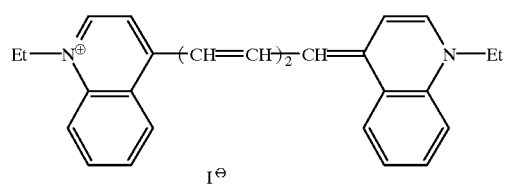 λ_max = 820 nm
(66) 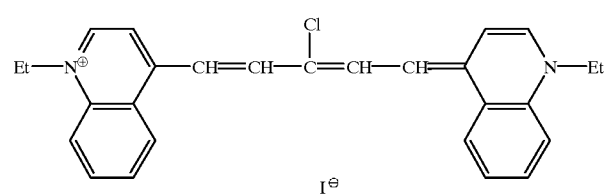 λ_max = 798 nm
(67) 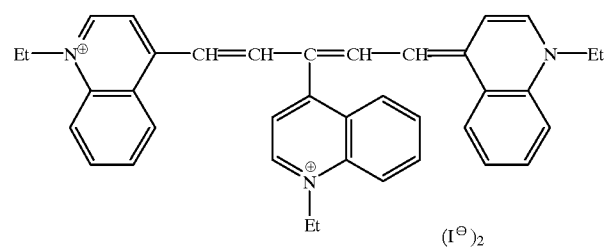 λ_max = 773 nm
(68) 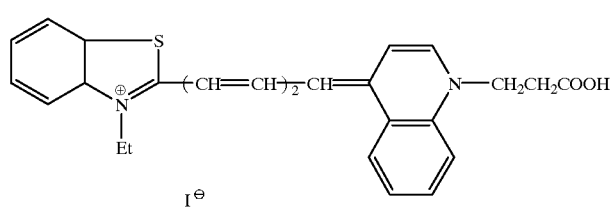 λ_max = 723 nm
(69) 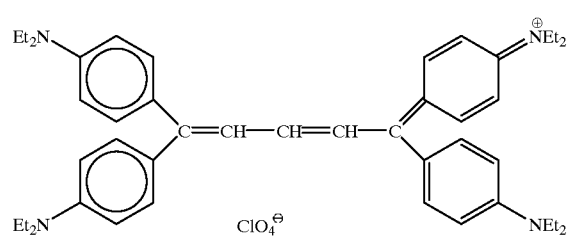 λ_max = 816 nm
(70) 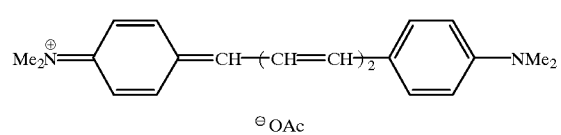 λ_max = 790 nm -continued
(71) 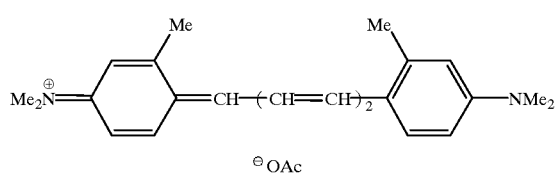 λ_max = 800 nm
(72) 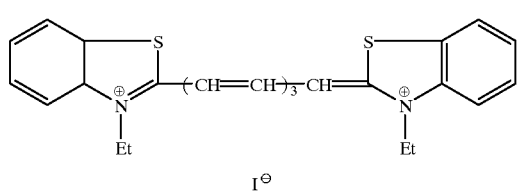 λ_max = 759 nm
(73) 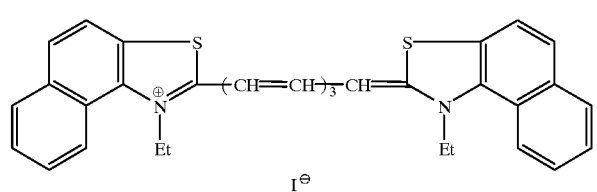 λ_max = 796 nm
(74) 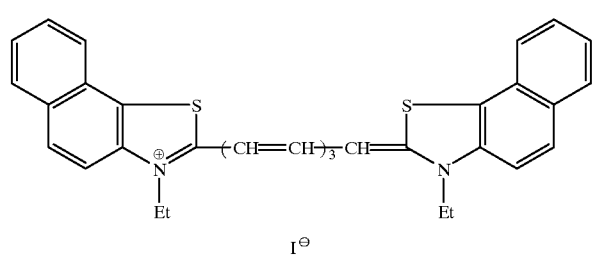 λ_max = 793 nm
(75) 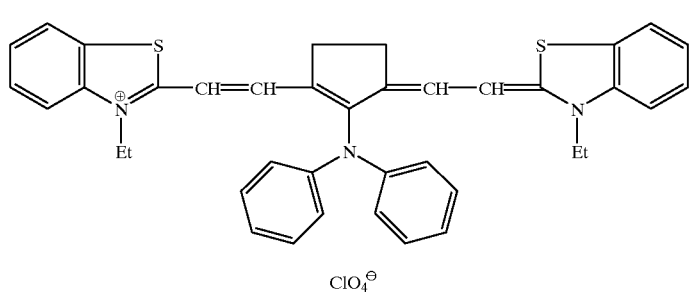 λ_max = 801 nm
(76) 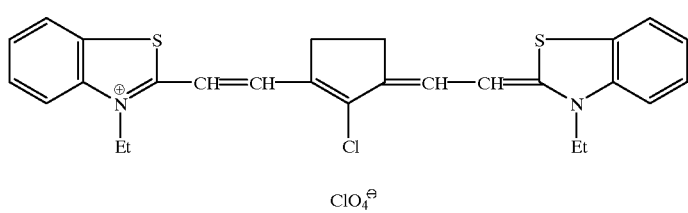 λ_max = 819 nm
(77) 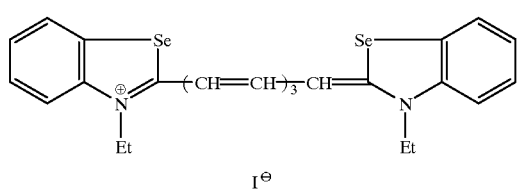 λ_max = 769 nm -continued
(78) 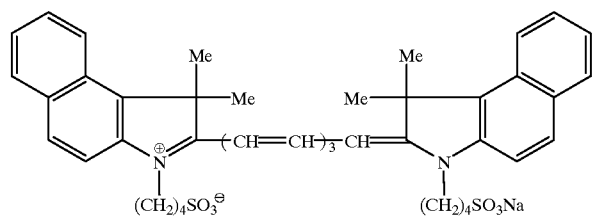 λ_max = 785 nm
(79) 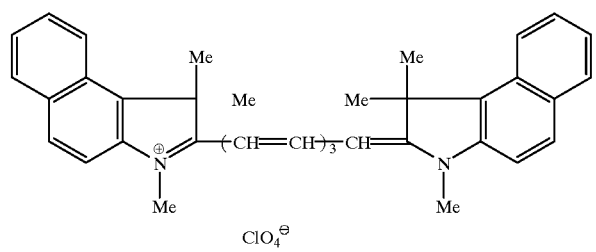 λ_max = 778 nm
(80) 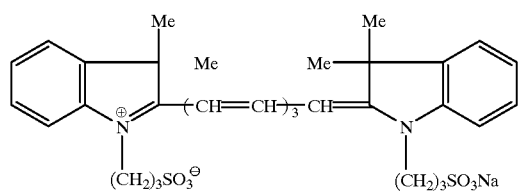 λ_max = 746 nm
(81) 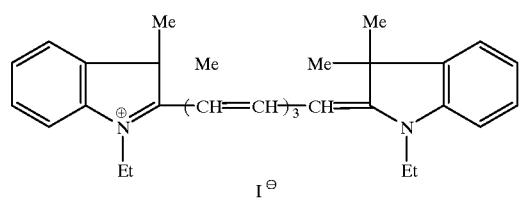 λ_max = 743 nm
(82) 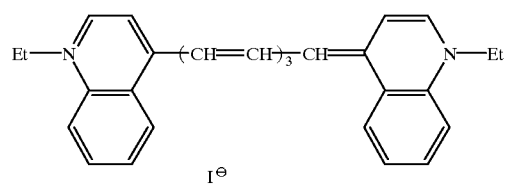 λ_max = 928 nm
(83) 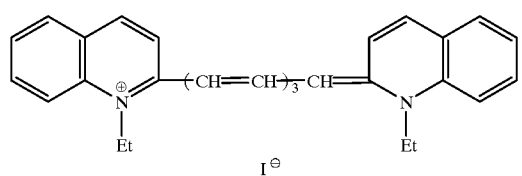 λ_max = 816 nm
(84) 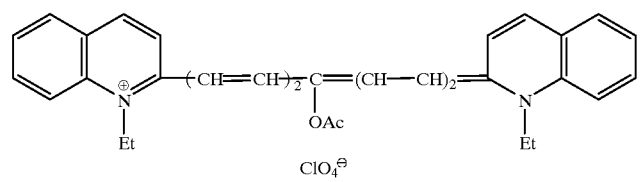 λ_max = 927 nm

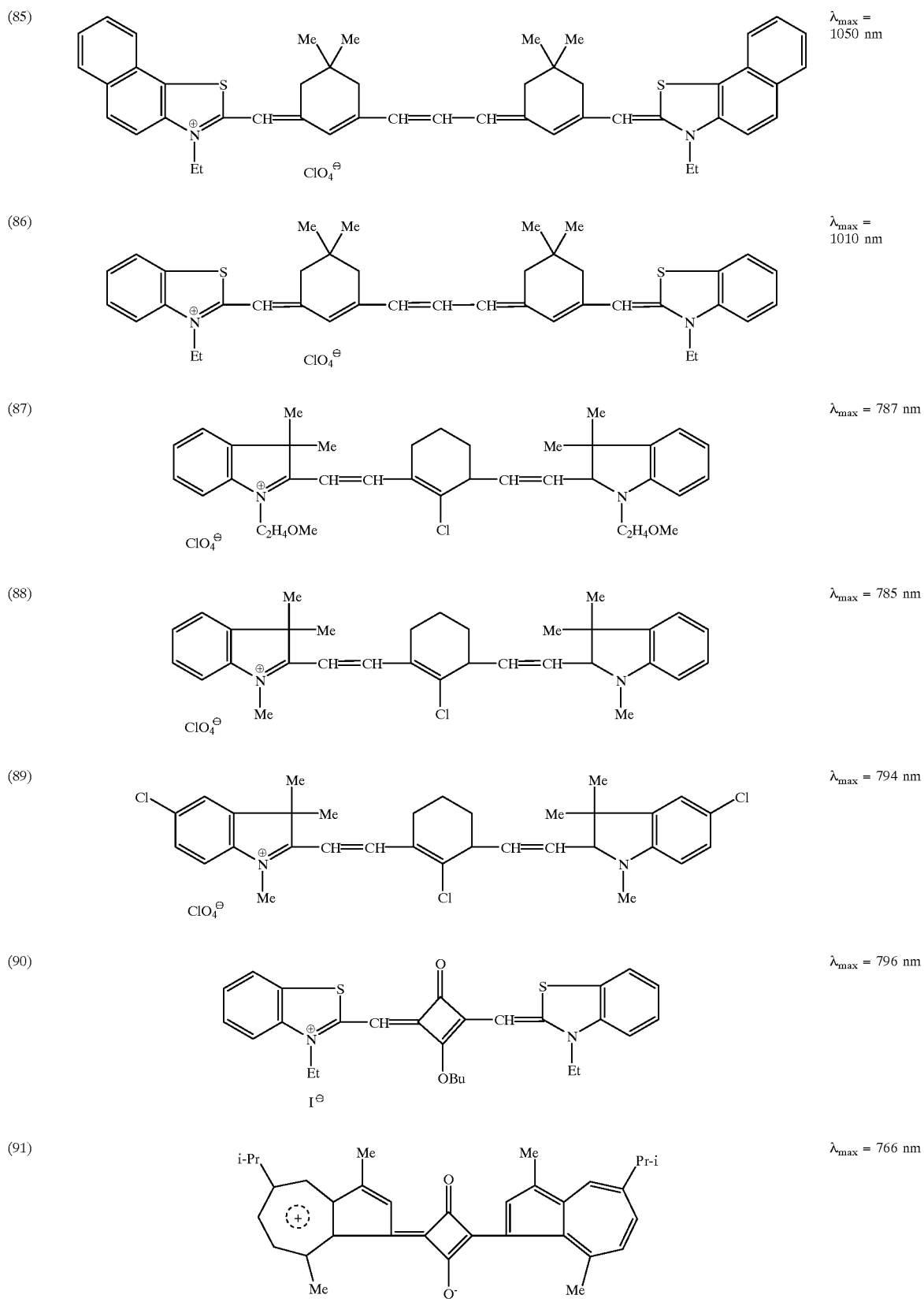

-continued
(92) 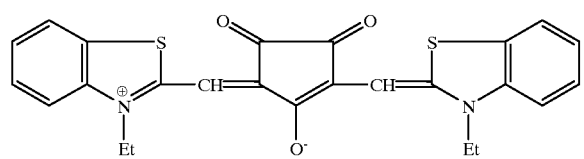 λ_max = 771 nm
(93) 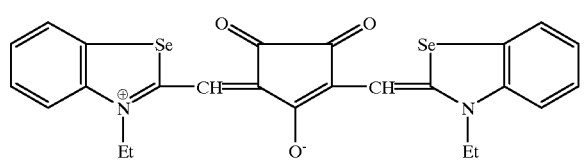 λ_max = 790 nm
(94) 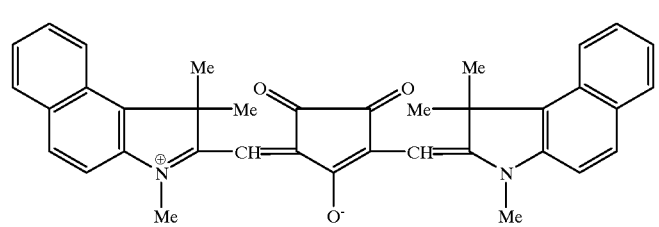 λ_max = 791 nm
(95) 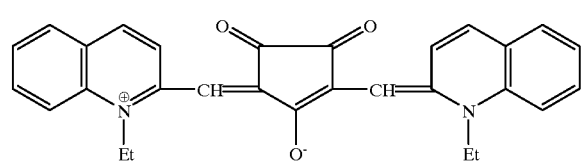 λ_max = 831 nm
(96) 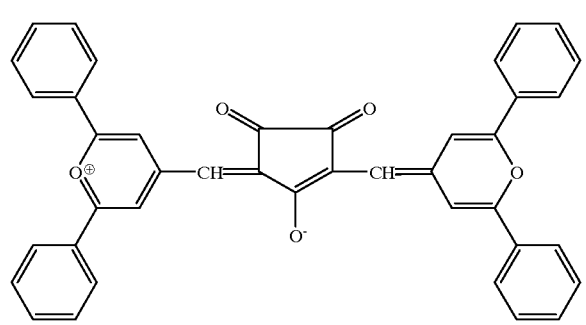 λ_max = 954 nm
(97) 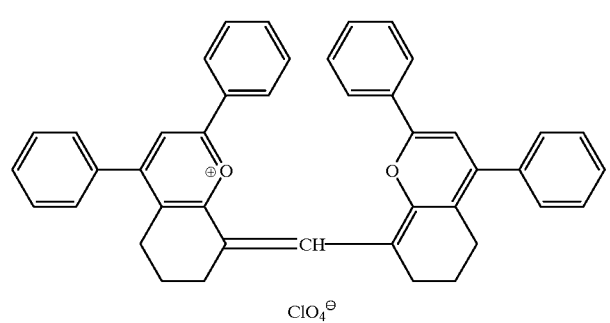 λ_max = 838 nm -continued
(98) 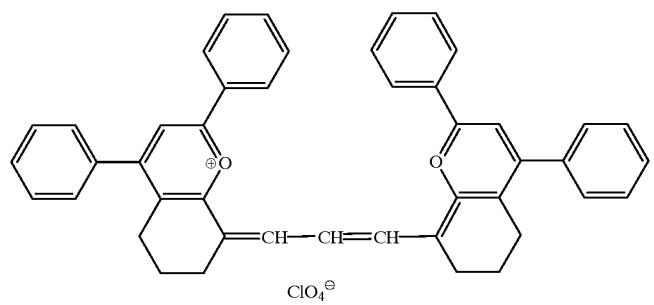 λ_max = 940 nm
(99) 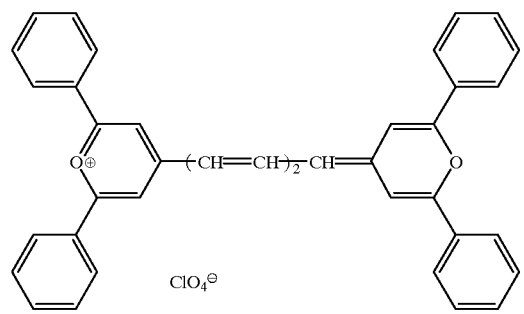 λ_max = 805 nm
(100) 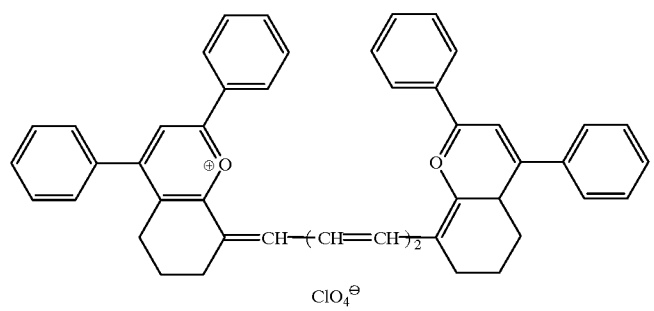 λ_max = 1060 nm
(101) 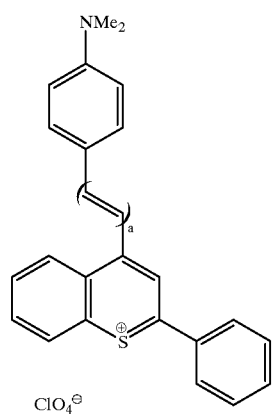 λ_max = 944 nm -continued
(102) 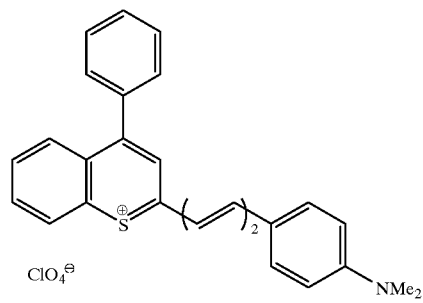 λ_max = 807 nm
(103) 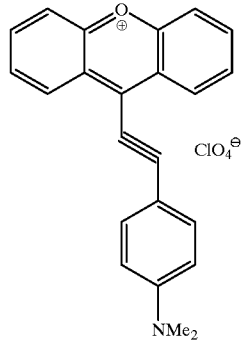 λ_max = 737 nm
(104) 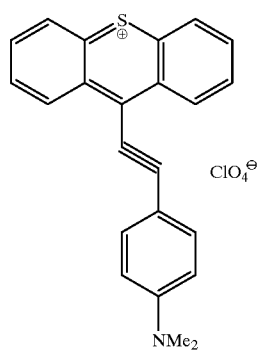 λ_max = 775 nm
(105) 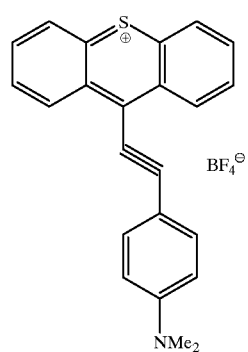 λ_max = 775 nm -continued
(106) 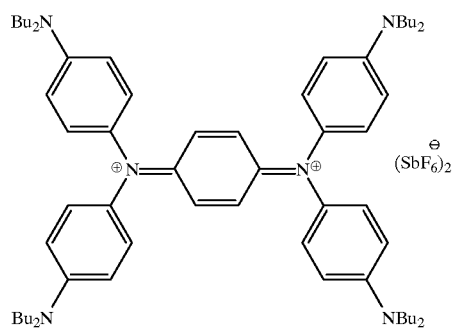 λ<sub>max</sub> = 1090 nm
(107) 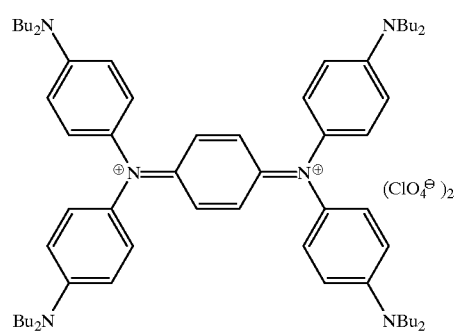 λ$_{max}$ = 1090 nm
(108) 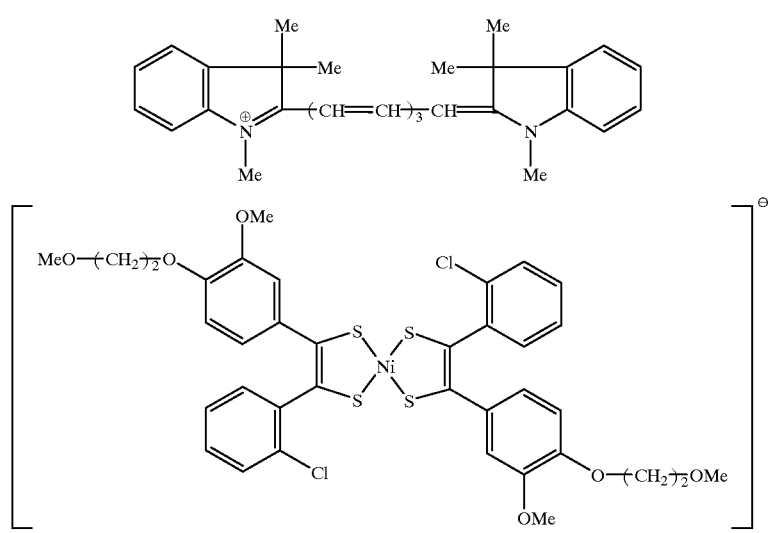 λ$_{max}$ = 750 nm
(109) 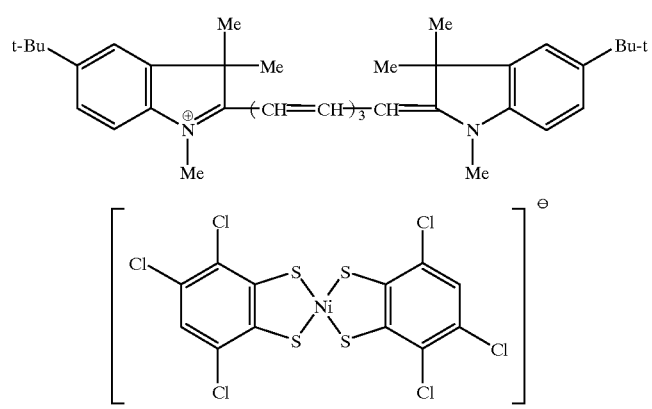 λ$_{max}$ = 765 nm -continued
(110) 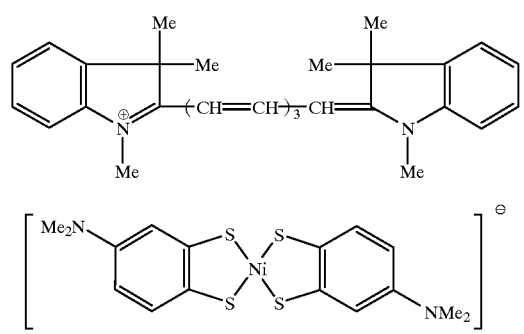 λ_max = 750 nm
(111) 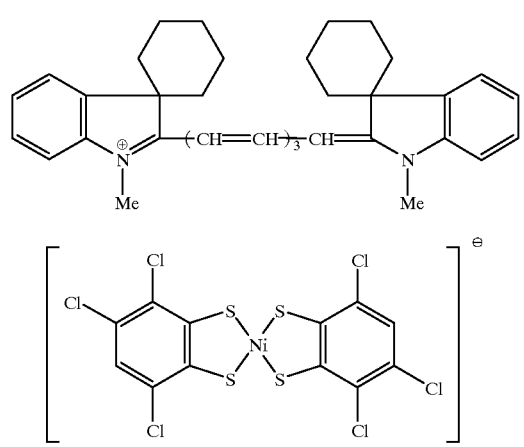 λ_max = 765 nm
(112) 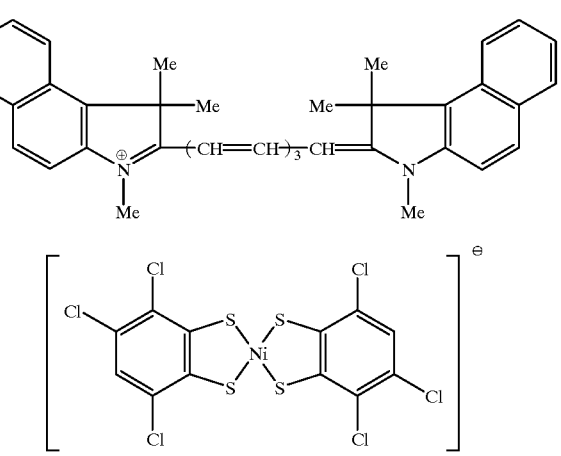 λ_max = 790 nm
(113) 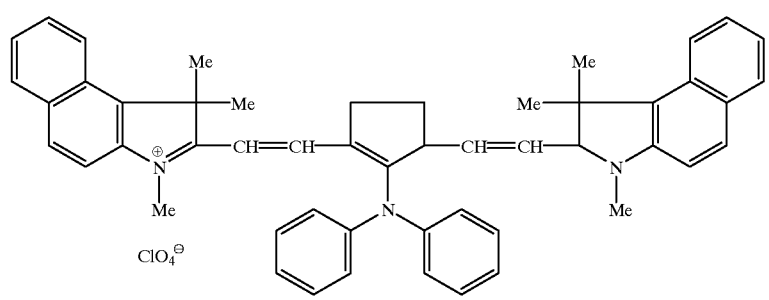 λ_max = 835 nm -continued
(114) 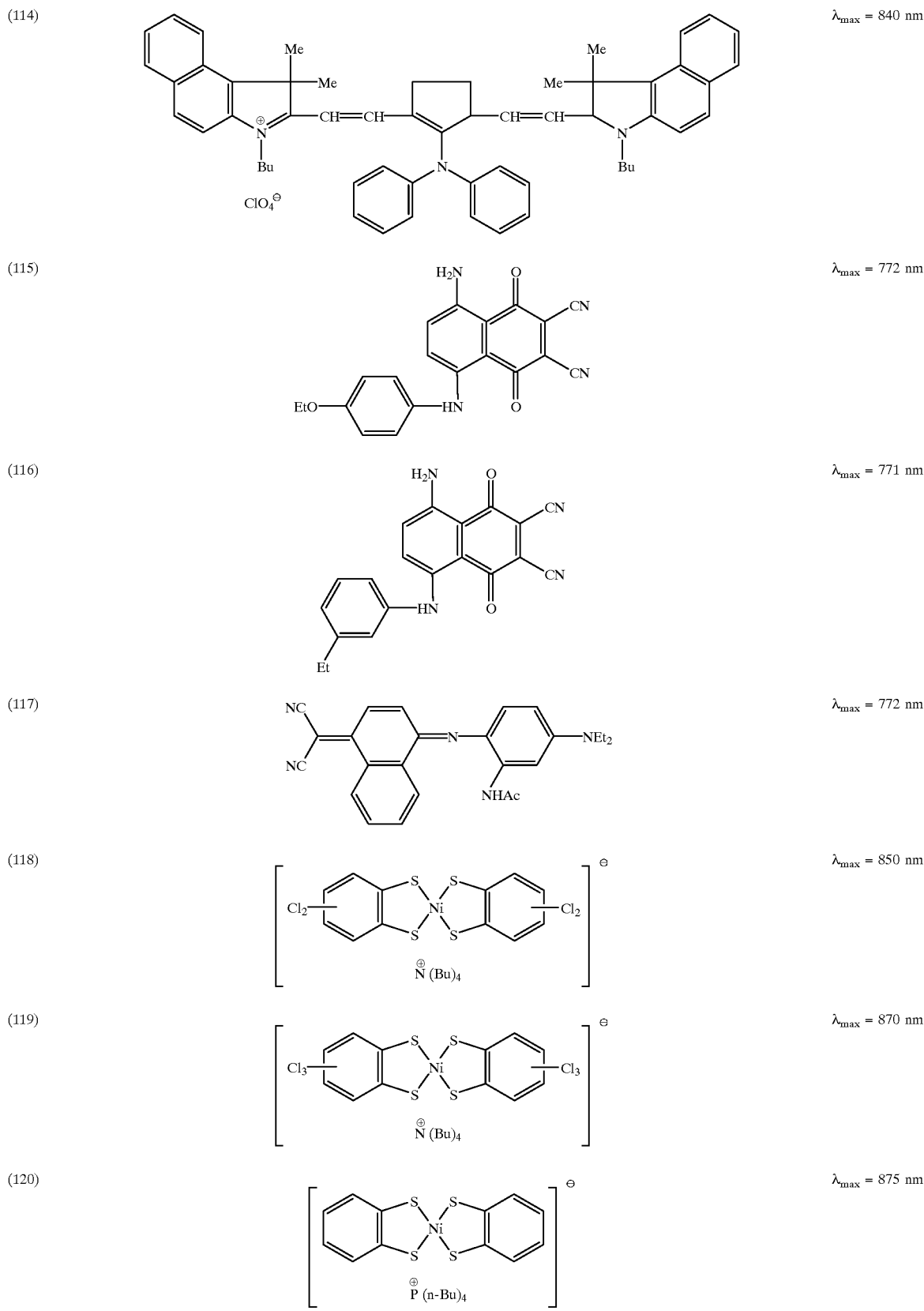 λ<sub>max</sub> = 840 nm
(115) λ<sub>max</sub> = 772 nm
(116) λ<sub>max</sub> = 771 nm
(117) λ<sub>max</sub> = 772 nm
(118) λ<sub>max</sub> = 850 nm
(119) λ<sub>max</sub> = 870 nm
(120) λ<sub>max</sub> = 875 nm -continued
(121) 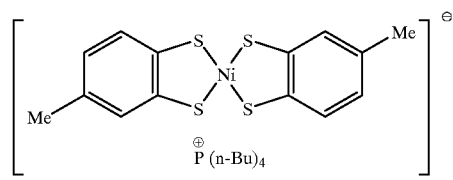 λ_max = 905 nm
(122) 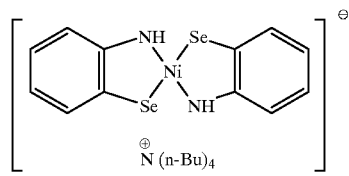 λ_max = 858 nm
(123) 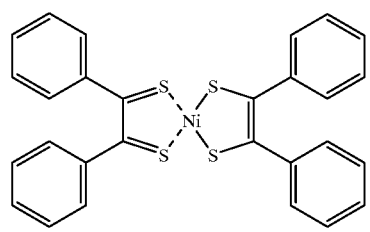 λ_max = 855 nm
(124) 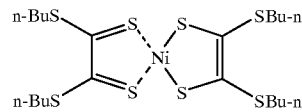 λ_max = 1010 nm
(125) 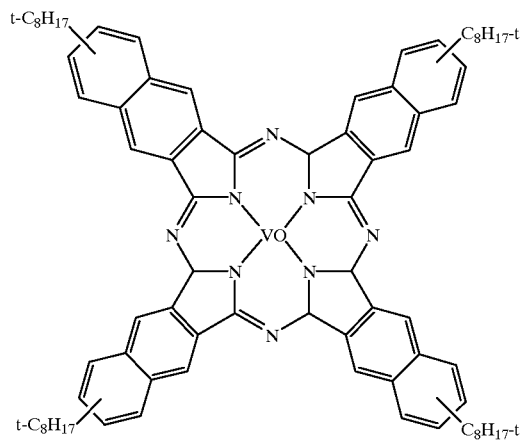 λ_max = 770 nm (126)

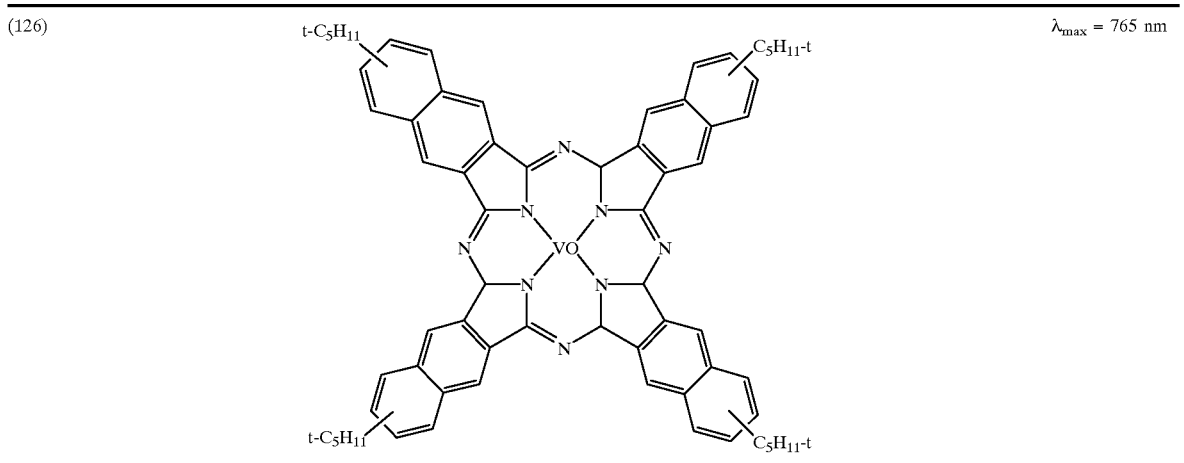

$\lambda_{max}$ = 765 nm

By using an ultraviolet absorber or an anti-oxidant in the resin, the weather resistance of the resin can be improved. The resin can be manufactured by a block resin crushing method, emulsification polymerizing method or a resin precipitation method or the like.

The maximal wavelength of the fluorescent spectrum of the near infrared fluorescent coloring material or pigment and the maximal wavelength of the absorption spectrum of the near infrared fluorescent coloring material must be the same. In usual, the difference between them is 100 nm or shorter, more preferably 50 nm or shorter.

If the maximal wavelength of the fluorescent spectral and that of the absorption spectral are different from each other by 100 nm or more, the transmission wavelength region of the CCD for detecting the near infrared rays is enlarged excessively, causing the contrast to be lowered undesirably.

FIG. 21 is a graph of a reflectance of a copying paper for a copying machine. Since the copying paper has a substantially constant reflectance in a range from 450 to 1200 nm, it is preferable to be used as a medium in the present invention.

Although a copying machine will now be described as an example of application of the detection apparatus of the present invention, the present invention is not limited to this. The present invention may, of course, be applied to various apparatus, such as an image scanner.

Figure 2:
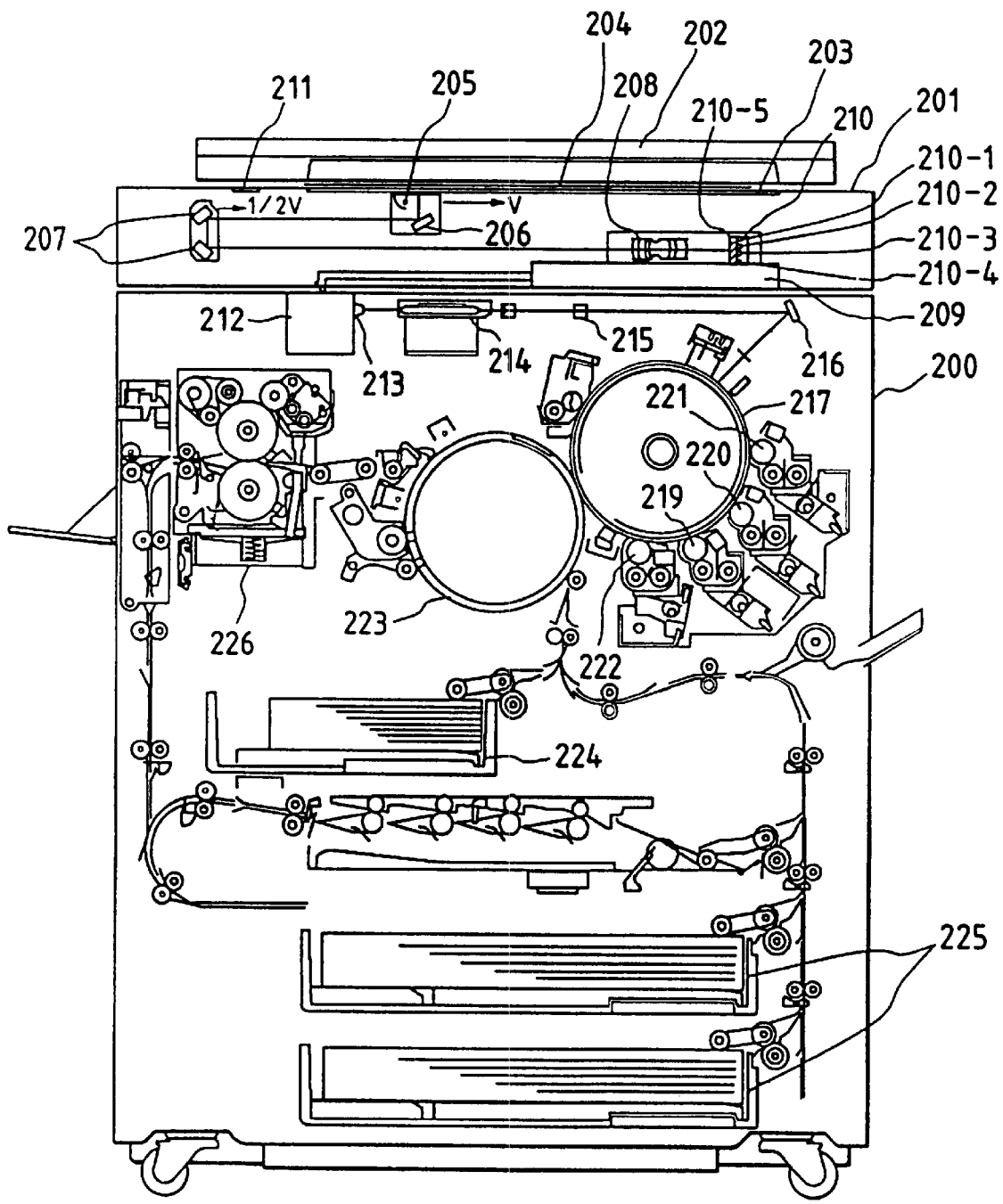
FIG. 2 is a structural view which illustrates a color copying apparatus employing the structure according to the present invention.

FIG. 2 is a schematic view which illustrates the copying machine according to the present invention.

Referring to FIG. 2, reference numeral 201 represents an image scanner portion for reading an original document and performing a digital signal process. Reference numeral 200 represents a printer portion for transmitting a full color image corresponding to the image of an original document read by the image scanner 201 on to paper.

In the image scanner portion 201, reference numeral 202 represents a thick plate for an original document for securing an original document 204 placed on an original document retainer glass (hereinafter called a platen) 203. The original document 204 is irradiated with light emitted from a halogen lamp 205. Light reflected by the original document 204 is introduced by mirrors 206 and 207 so that an image is, by a lens 208, formed on a four-line sensor (hereinafter called a "CCD") composed of four line CCD line sensors. The CCD 210 decomposes the color of optical information of the original document to transmit, to a signal processing portion 209, red (R), green (G) and blue (B) components of full color information and infrared ray information (IR) component. The elements 205 and 206 are moved mechanically at speed v and the element 207 is moved also mechanically at speed ½v in a vertical direction (hereinafter a "sub-scan direction") with respect to the electrical scan direction (hereinafter called a "main scan direction") of the line sensor so that the overall surface of the original document is scanned.

Reference numeral 211 represents a standard white plate for generating data for correcting read data corresponding to the line sensors 210-1 to 210-4 for IR, R, G and B components when shading correction is performed.

Figure 8:
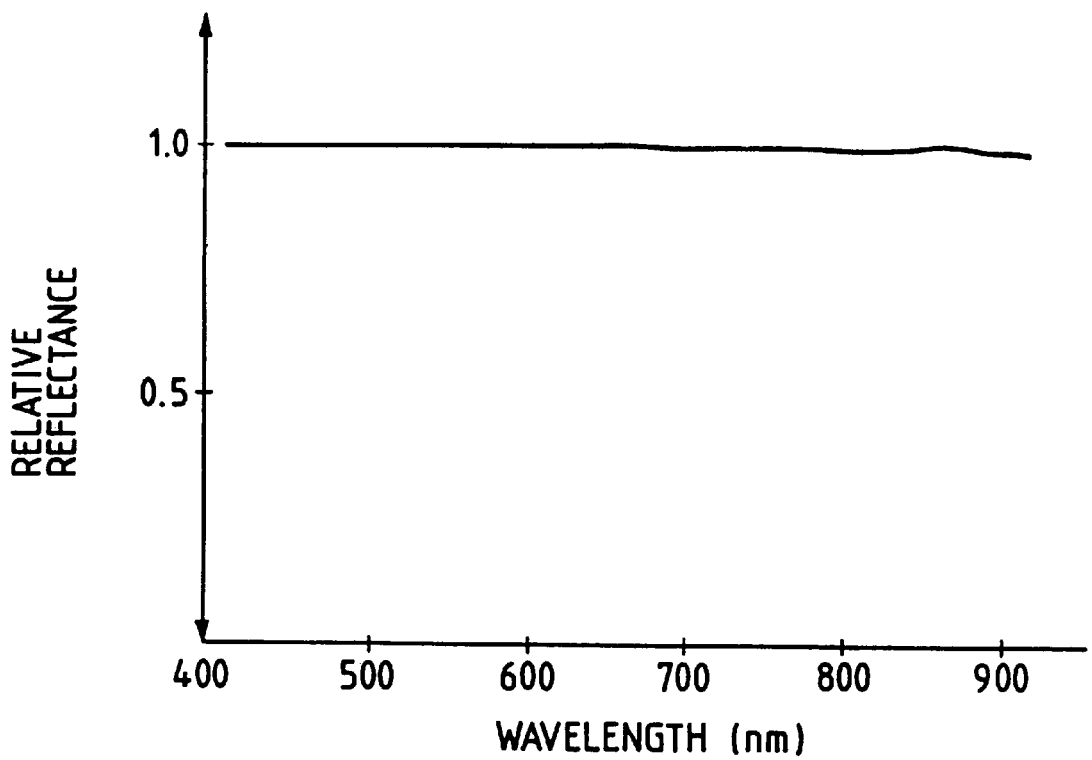
FIG. 8 illustrates a spectrum reflectance of a standard white plate.

The standard white plate has substantially uniform reflecting characteristics with respect to visible rays to infrared rays as shown in FIG. 8, the standard white plate being white with respect to visible rays.

The standard white plate is used to correct data transmitted from the IR sensor 210-1 with respect to infrared rays and data transmitted from the R, G, and B visible-ray sensors 210-2 to 210-4.

The signal processing portion 209 electrically processes the read signal to decompose the signal into magenta (M), cyan (C), yellow (Y) and black (BK) components which are then transmitted to the printer portion 200. One of the M, C, Y and BK components is plane-sequentially transmitted to the printer 200 whenever the image scanner portion 201 scans the original document. When the original document has been scanned four times, a color image can be formed.

The M, C, Y and BK image signals transmitted from the image scanner portion 201 are transmitted to a laser driver 212. The laser driver 212 modulates and operates a semiconductor laser 213 in response to the image signals. Laser beams are allowed to pass through a polygonal mirror 214, a f-θ lens 215, and the mirror 216 as to scan the surface of a photosensitive drum 217.

Reference numerals 219 to 222 represent developing units comprising a magenta developing unit 219, a cyan developing unit 220, a yellow developing unit 221 and a black developing unit 222. The four developing units 219 to 222 alternately come in contact with the photosensitive drum so that M, C, Y and BK electrostatic latent images formed on the photosensitive drum 217 are developed by corresponding toners.

Reference numeral 223 represents a transfer drum for winding paper supplied from a paper cassette 224 or 225 around a transfer drum 223 to transfer a toner image developed on the photosensitive drum 217 on to the paper.

Thus, the four colors, that is, M, C, Y and BK are sequentially transferred, and then the paper is allowed to pass through a fixing unit 226 before it is discharged.

The halogen lamp 205 is commonly used to read visible ray information and to read infrared ray information, the halogen lamp 205 having both irradiation wavelength components required to read the two types of information items. By using the common irradiation system as described above, irradiation light beams having different wavelength components for reading visible and infrared rays information are effectively applied to the original document.

Figure 7A:
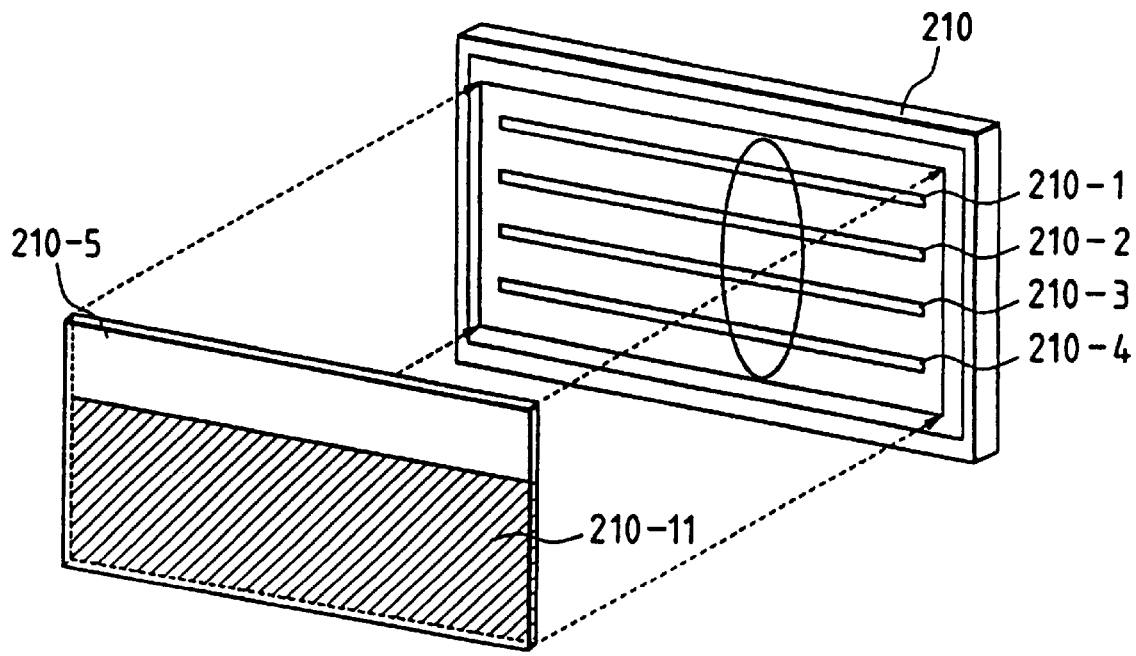
FIGS. 7A and 7B are structural views which illustrate a CCD according to the first embodiment of the present invention.

FIG. 7A illustrates the structure of the CCD 210 for use in this embodiment.

Referring to FIG. 7A, reference numeral 210-1 represents a light receiving device array for reading infrared ray (IR), and 210-2, 210-3 and 210-4 represent light receiving device arrays for respectively reading R, G and B wavelength components.

The IR, R, G and B sensors 210-1 to 210-4 respectively have openings having a diameter of 10 lm in the main scan direction and the sub-scan direction.

The four light receiving device arrays having different optical characteristics are disposed on the same silicon chip in a monolithic manner so that the IR, R, G and B sensors are disposed in parallel to each other to read the same line of the original document.

By using the CCD constituted as described above, the common optical system, such as the lens, can be used to read the visible rays and infrared rays.

As a result, accuracy in the optical adjustment can be improved and the adjustment can easily be completed.

Reference numeral 210-5 represents a glass plate having a characteristic capable of cutting infrared rays in the diagonal line section thereof, the glass plate 210-5 having a thickness of about 300 $\mu$m.

Figure 11:
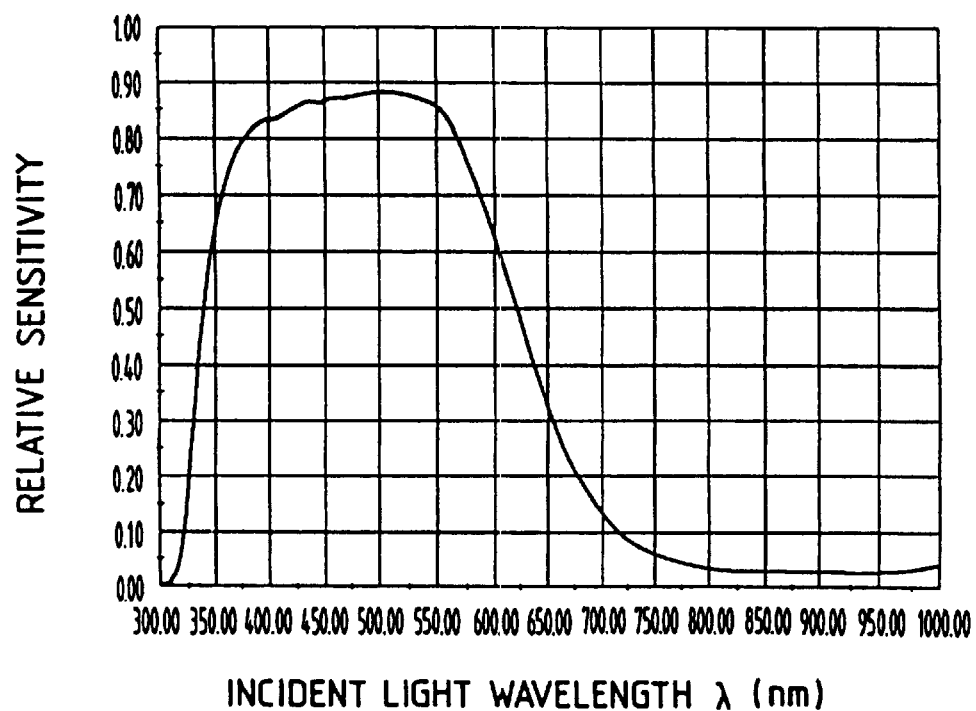
FIG. 11 illustrates characteristics of a dichroic filter for cutting infrared rays.

The characteristic of cutting infrared rays is realized in the diagonal line section due to a diachronic mirror 210-11. The characteristic of cutting infrared rays is shown in FIG. 11.

The glass plate is bonded to the surface of the chip in such a manner that the evaporated surface of the glass plate faces the sensor side.

Figure 7B:
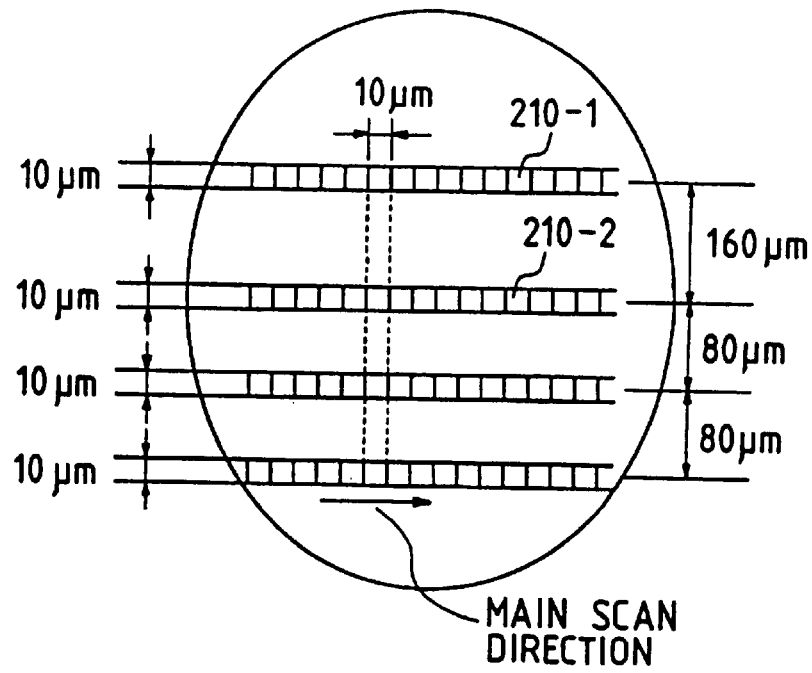

FIG. 7B is an enlarged view which illustrates the light receiving device. Each sensor has a length of 10 $\mu$m per length in the main scan direction. Each sensor includes 5,000 pixels in the main scan direction as to read the shorter side direction (297 mm) of an A3-size original document at a resolving power of 40 dpi. The R, G and B sensors are disposed at a line interval of 80 $\mu$m while being disposed at each 8 lines when the resolving power in the sub-scan direction is 400 lpi (line per inch).

The line interval between the IR sensor 210-1 and the R sensor 210-2 is made to be 160 $\mu$m (16 lines) which is twice the other line interval. As a result of the foregoing structure in which the interval between the IR sensor 210-1 and the R sensor 210-2 is made to be longer than the interval between the other sensors, the evaporated surface 210-11 of the glass plate 210-5 can be made to face the sensors 210-2 to 210-4 while making the non-evaporated portion to face the sensor 210-1 at a low fastening position accuracy at the time of bonding the glass plate 210-5 to the surface of the chip.

Figure 13:
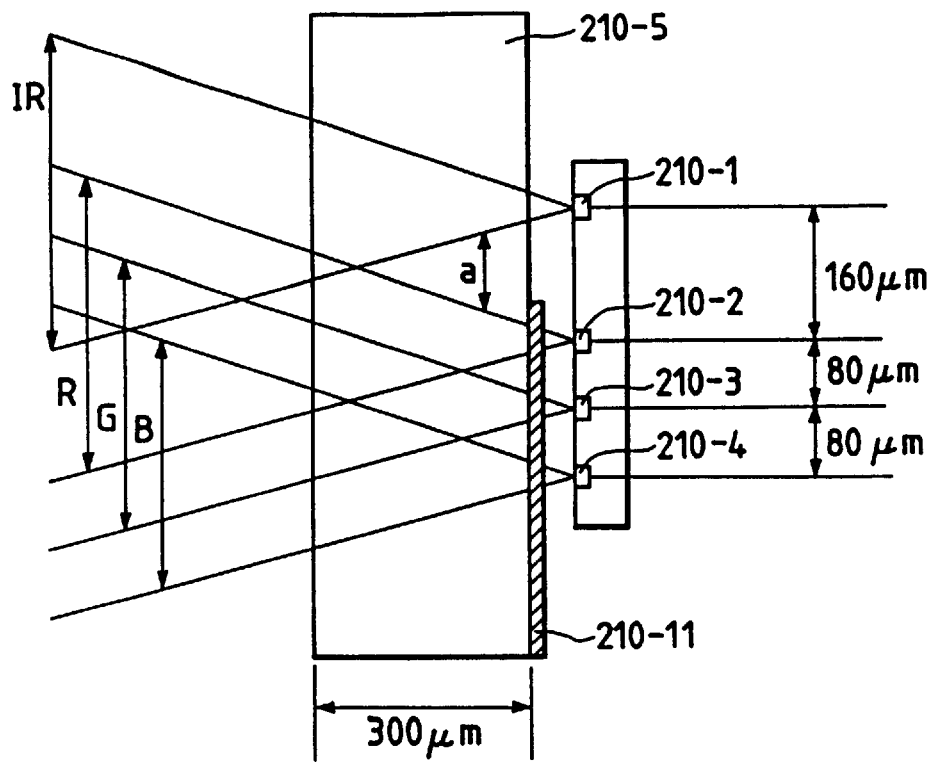
FIG. 13 is a view which illustrates a state where an infrared ray cutting glass is fastened to a CCD sensor.

The glass plate 210-5 is fastened adjacent to the sensor surface, while the evaporated film 210-11 for blocking infrared rays is fastened to face the sensor. The reason for this is that light beams passing toward the sensor are converged by the lens 209 and therefore the light beams passing toward the sensors are superposed at a position distant from the surface of the sensor as shown in FIG. 13.

That is, if the infrared ray cutting filter 210-11 is made to filter only light beams passing toward the sensors 210-2 to 210-4, the infrared ray cutting filter 210-11 must be fastened to a position adjacent to the sensor at which the IR light beam and the R light beam are not, superposed.

The arrangement made in such a manner that the infrared ray cutting filter 210-11 is disposed adjacent to the surface of the sensor enables the allowable width a for fitting the IR filter between the IR light beams and the R light beams to be widened. Therefore, the accuracy for fitting the glass plate 210-13 to the sensor chip can be lowered.

If the infrared ray cutting filter is fastened to the surface of the glass plate 210-5 opposing the sensor, the IR light beams and the R light beams are superposed. As a result, if the infrared ray cutting filter is disposed to sufficiently filter the R light beams, a major portion of the IR light beams focused on to the IR sensor 210-1 is undesirably cut, causing the level of the IR signal to be lowered excessively.

Figure 14:
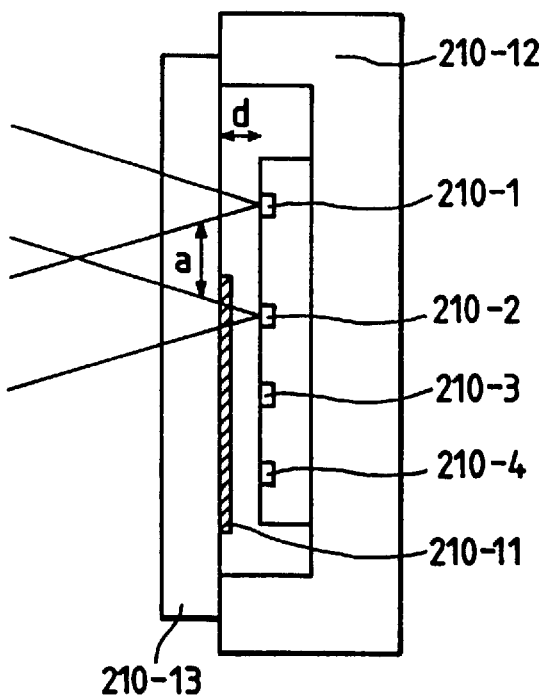
FIG. 14 is a view which illustrates a fastened cover glass in a case where the glass for cutting infrared rays is disposed on the cover glass of the CCD.

As an alternative to the structure in which the glass plate 210-5 is fastened as shown in FIG. 14, the infrared ray cutting filter 210-11 may be disposed on the surface of the cover glass 210-13 facing the sensor. In this case, the distance d from the surface of the sensor to the internal surface of the cover glass must sufficiently be shortened by constituting a ceramic package 210-12 of the CCD sensor so that the infrared ray cutting filter 210-11 disposed on the internal surface of the cover glass does not substantially interrupt the IR light beams.

Figure 10:
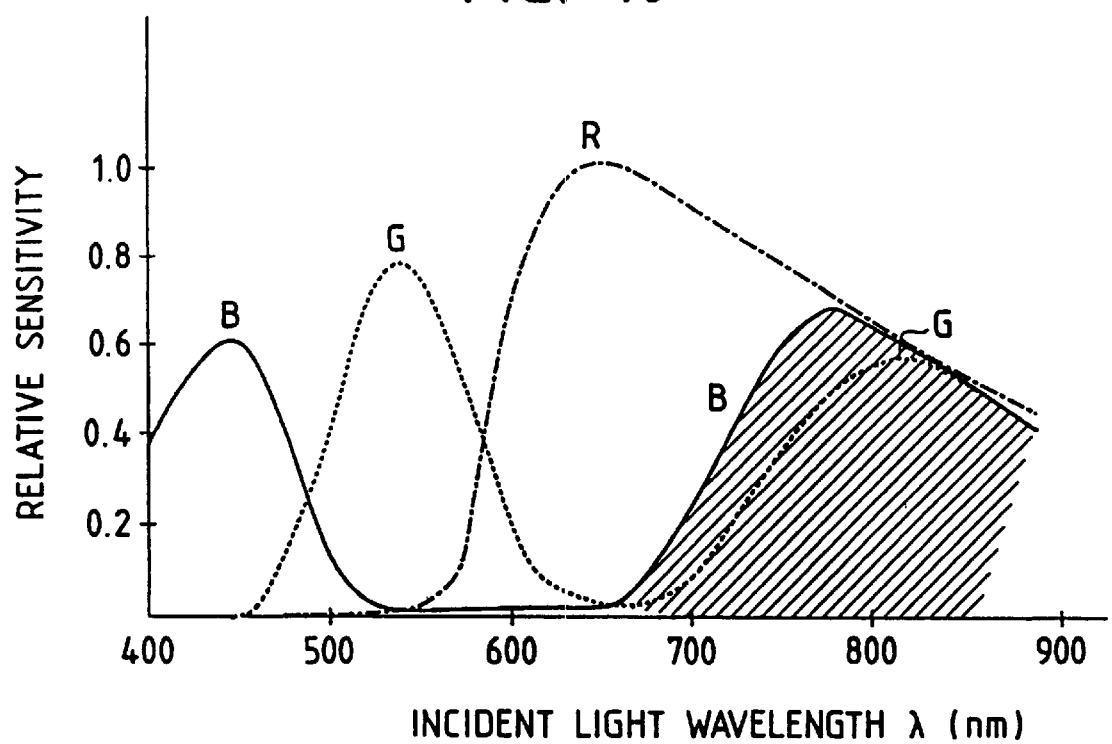
FIG. 10 are graphs which illustrate spectral sensitivity characteristics of a visible line sensor and characteristics of a filter for an infrared ray reading sensor according to this embodiment.

With reference to FIG. 10, the filter spectrum characteristic of the IR, R, G and B line sensors of the CCD 210 will now be described.

The characteristics R has sensitivity with respect to light beams in the red wavelength region and the infrared ray wavelength region. The characteristics G has sensitivity with respect to light beams in the green wavelength region and the infrared wavelength region. The characteristics B has sensitivity with respect to light beams in the blue wavelength region and the infrared wavelength region.

Since filters 210-6 and 210-7 are superposed on the IR sensor 210-1, the IR sensor 210-1 has sensitivity with respect to infrared light beams represented by the diagonal lines shown in FIG. 10.

As can be understood from FIG. 10, the R, G and B filters 210-8 to 210-10 have sensitivity with respect to infrared rays in a range of 700 nm or longer. Therefore, the infrared ray cutting filter 210-11 has characteristics shown in FIG. 11.

Figure 9:
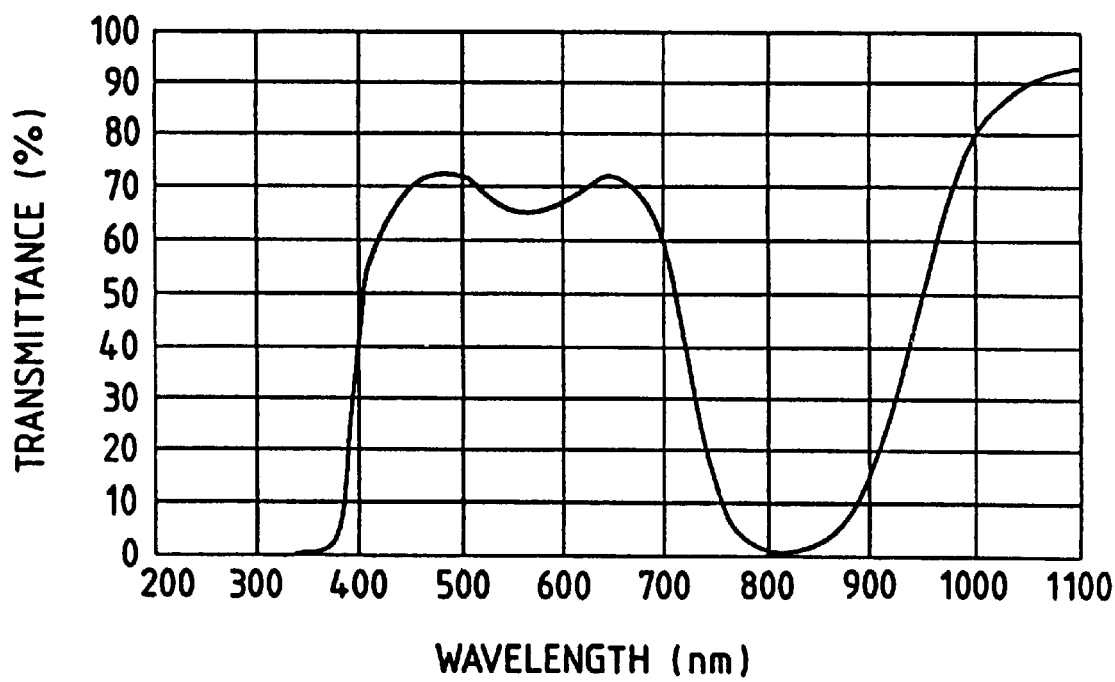
FIG. 9 illustrates a spectrum transmission ratio of a specific pattern.

FIG. 9 shows spectrum absorption ratio of an infrared ray absorber SIR-159 manufactured by Mitsui Toatsu for used to form a detection mark of a specific original document according to this embodiment. This embodiment is arranged in such a manner that the presence of the infrared ray absorber is read by the IR sensor that is arranged to detect only infrared rays ranging from 750 nm to 850 nm.

Figure 12:
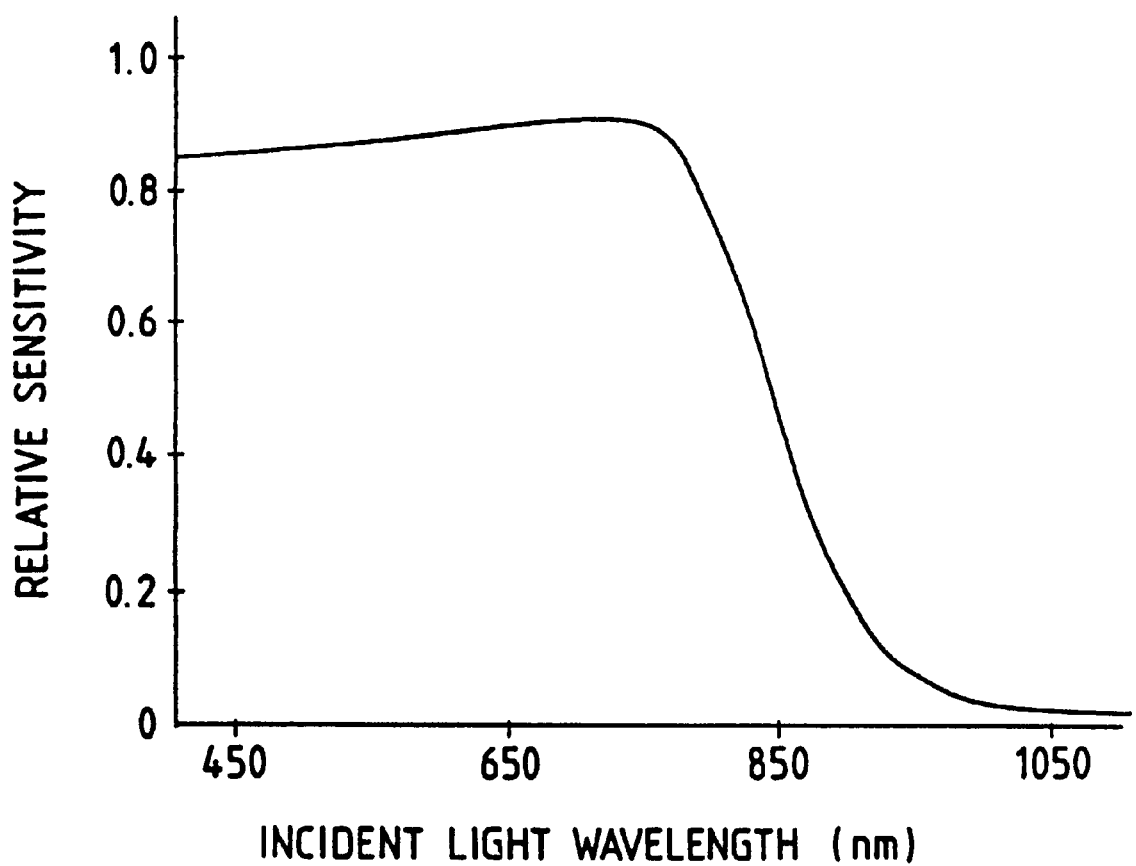
FIG. 12 illustrates characteristics of a filter for cutting far infrared rays.

In order to achieve this, a far infrared ray cutting filter of a diachronic mirror as shown in FIG. 12 is disposed on the lens 209. Since the foregoing filter does not adversely affect the R, G and B sensors 210-2 to 210-4 as well as the IR sensor 210-1, it is disposed in the lens portion commonly provided for the visible rays and infrared rays. As a result, the filter to be fastened to the lens 209 can be designed to simply have the far infrared ray cutting characteristics. Therefore, excellent far infrared ray cutting characteristics can be realized by a simple interference film structure.

Figure 15B:
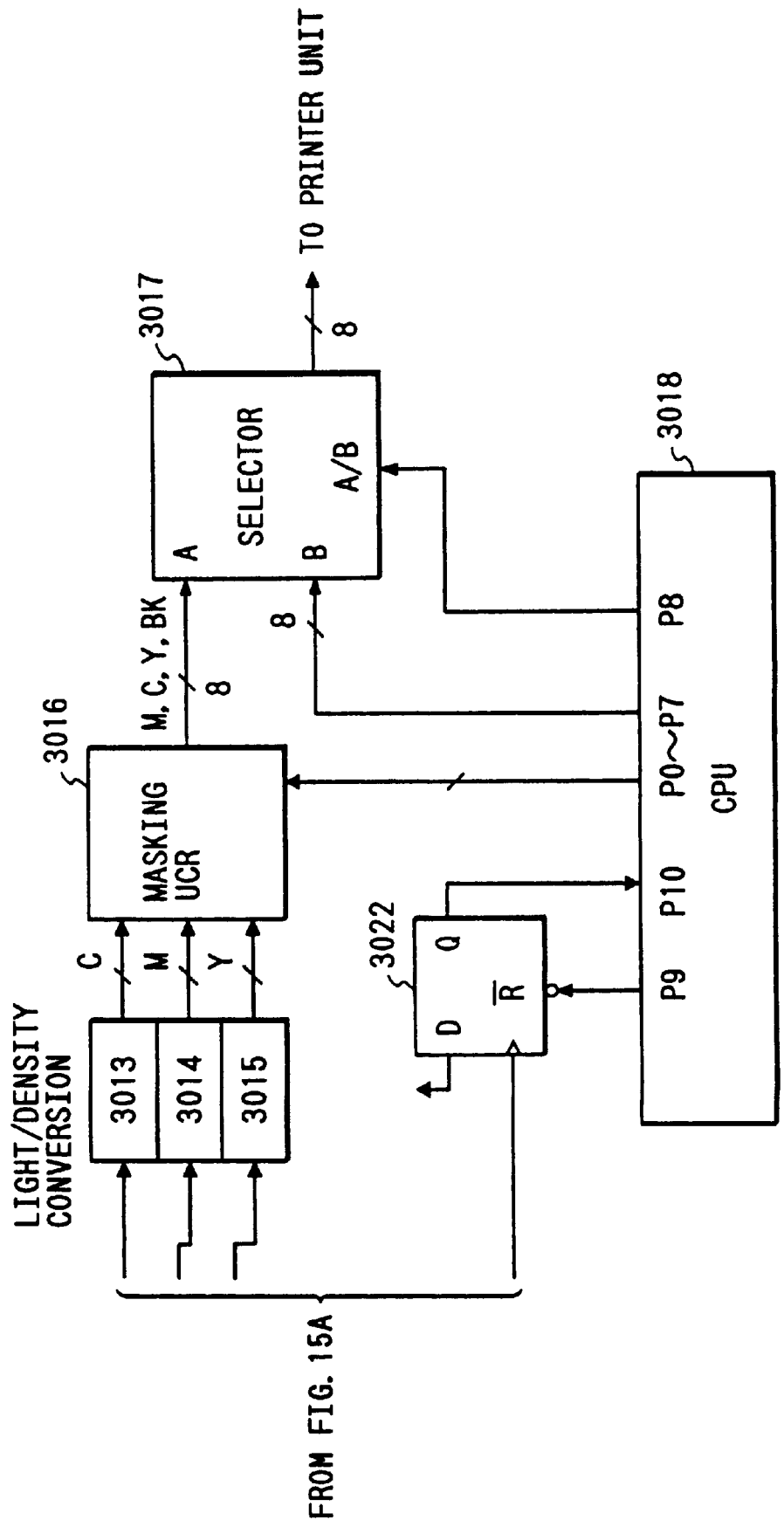
FIG. 15 is comprised of FIGS. 15A and 15B illustrate an image signal control portion.

FIGS. 15A and 15B are block diagrams which illustrates the flow of an image signal in the image scanner portion 201. The image signal transmitted from the CCD 210 is received by an analog signal processing portion 3001 as to be subjected to a gain adjustment and an offset adjustment, and then converted by A/D converters 3002 to 3005 into 8-bit digital image signals for each color signal. Then, the image signal is supplied to shading correction portions 3006 to 3009 as to be subjected to a known shading correction using a read signal of the standard while plate 211 for each color.

Reference numeral 3019 represents a clock generating portion for generating clocks in a pixel unit. Reference numeral 3020 represents a line counter for counting clocks to generate a pixel address output for one line. Reference numeral 3021 represents a decoder for decoding main scan address supplied from the main scan address counter 3020 to generate CCD drive signals, such as shift pulses and reset pulses, VE signals representing an effective region in a read signal for one line supplied from the CCD, and a line synchronizing signal HSYNC. The counter 3020 is cleared in response to the HSYNC signal to start counting the main scan address of the next line.

Since the light receiving portions 210-1, 210-2, 210-3 and 210-4 of the CCD 210 are disposed while having predetermined intervals, the spatial deviation in the sub-scan direction is corrected in line delay devices 3010, 3011 and 3012. Specifically, the IR, R, and G signals for reading information about the original document in the sub-scan direction with respect to the B signal are line-delayed in the sub-scan direction to be made coincide with the B signal.

Reference numerals 3013, 3014 and 3015 represent light quantity/density conversion portion each comprising a look up table ROM to convert R, G and B brightness signals into C, M and Y density signals. Reference numeral 3016 represents a known masking and UCR circuit which receives three primary color signals Y, M and C to sequentially transmit Y, M, C and Bk signals while having a predetermined bit length, for example, 8 bits whenever a reading operation is performed.

Reference numeral 3 represents an identifying portion for detecting a specific pattern in the original document which is the characteristic of the present invention.

Reference numeral 3018 represents a CPU portion for controlling an optical system for reading the original document, controlling the sequence for controlling the operation for turning on/off an original document irradiation lamp 205 and generating a pixel region signal VSYNC in the sub-scanning direction. In accordance with the result of judgment supplied from the recognition portion 3, the CPU portion 3018 controls a selector 3017 to transmit, to the printer, a port output in place of the read signal to inhibit the operation of copying the specific original document.

Figure 16:
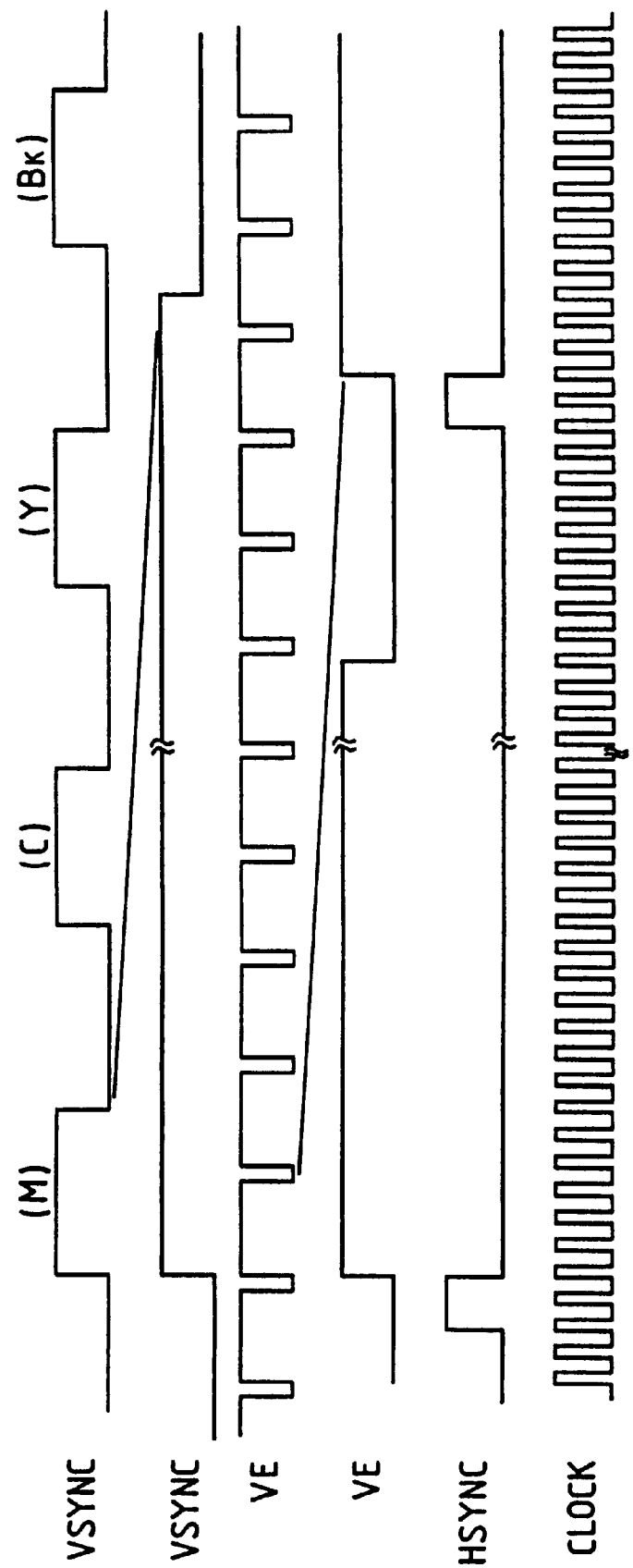
FIG. 16 is a timing chart of an image control signal.

FIG. 16 shows timings of the respective control signals.

The VSYNC signal is an image effective region signal in the sub-scan direction as to be used to form sequential output signals (M), (C), (Y) and (Bk) with which the image is read in a region of "1". The VE signal is an image effective region signal in the main scan direction to arrange the balance of the main scan start position in the region of "1". The CLOCK signal is a pixel synchronizing signal which transfers image data at the first transition timing 0→1.

Figure 1B:
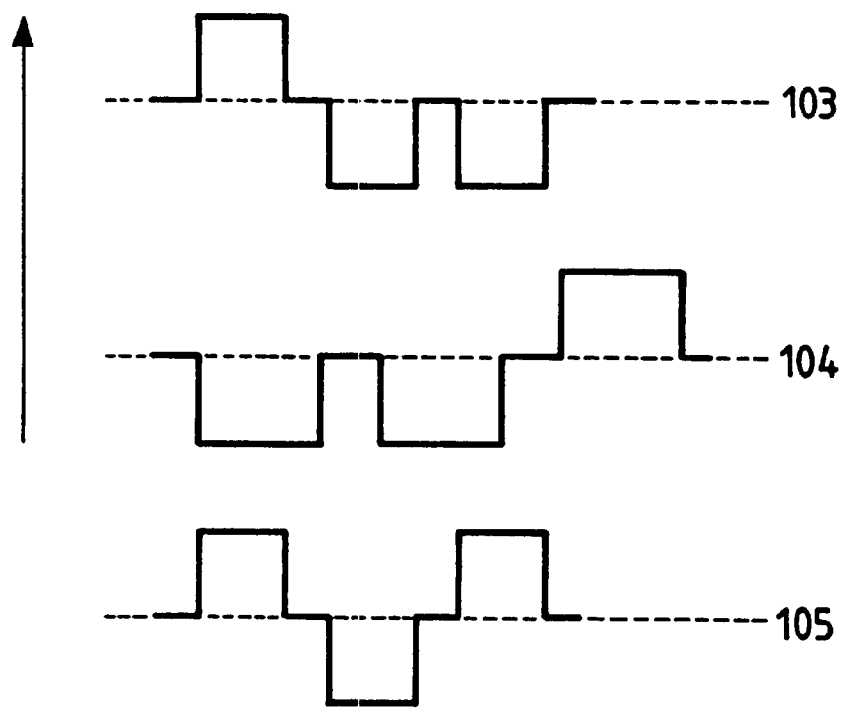

The image pattern to be detected in the present invention will now be described with reference to FIGS. 1A and 1B. FIGS. 1A and 1B illustrate near infrared fluorescent coloring materials which do not absorb visible rays having the characteristics shown in FIG. 9 is used together with a coloring material which absorbs about 600 nm to record low reflectance portions 101.

Figure 20A:
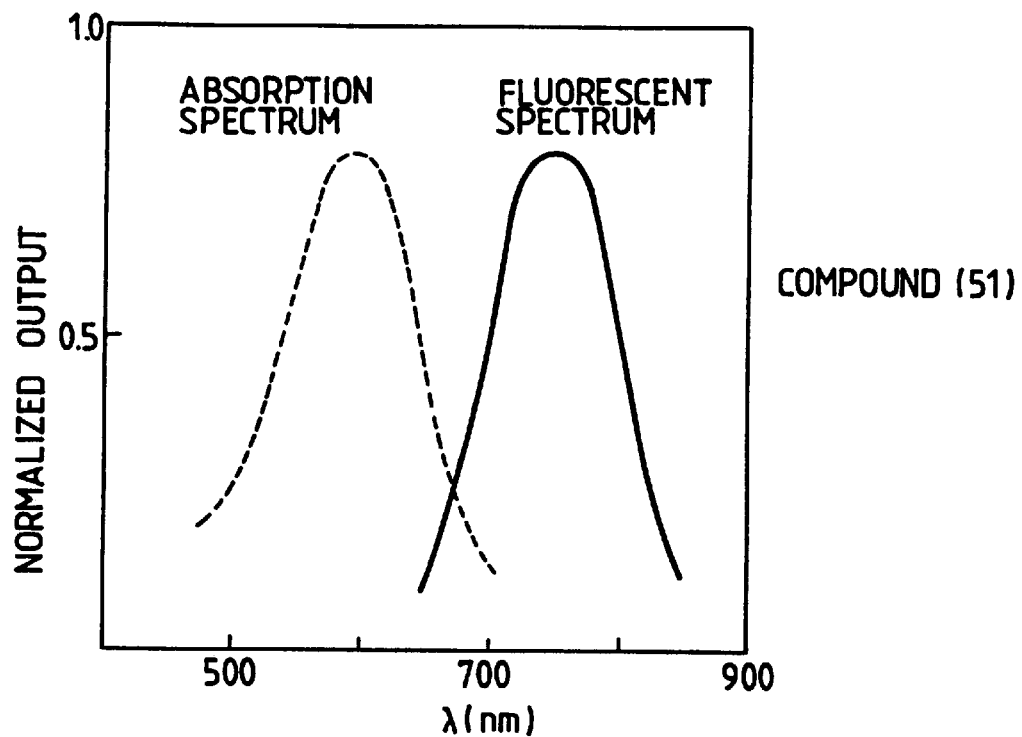
FIGS. 20A and 20B illustrate absorption spectrum and fluorescent spectrum of an ink (fluorescent coloring material) for use in a high reflectance portion of the specific pattern.
Figure 20B:
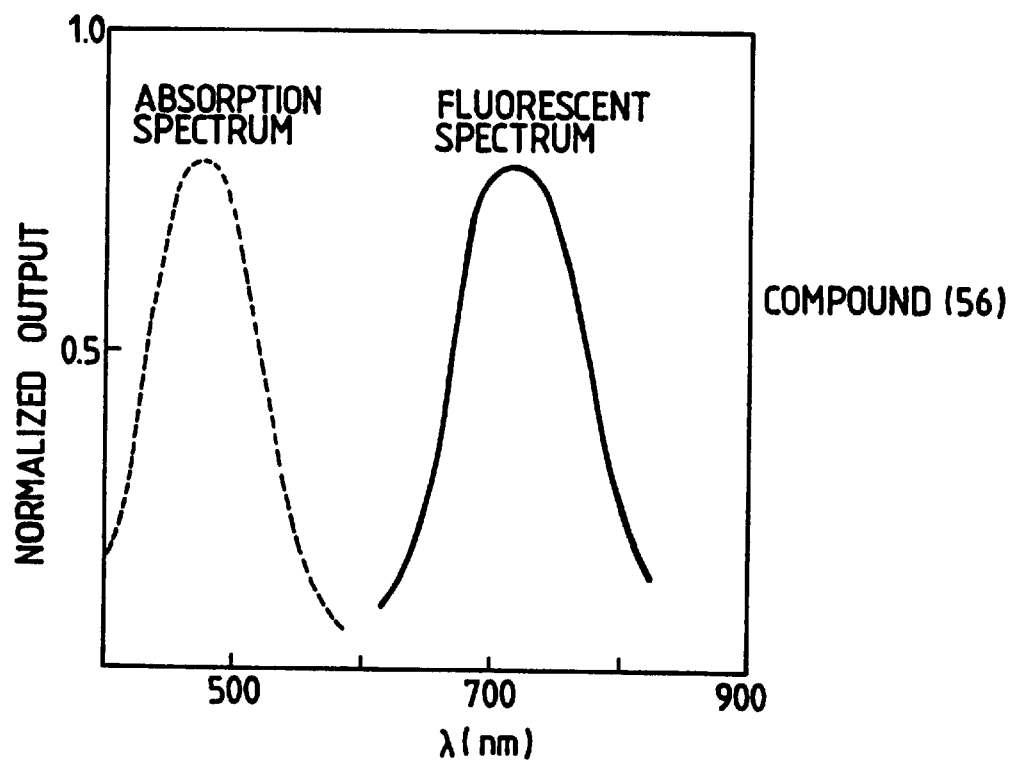

Near infrared fluorescent coloring material having characteristics shown in FIG. 20A is used in high reflectance portions 102. Since the high reflectance portions 102 are printed as small patterns in the form of squares each having a side of about 12.0 μm and they are substantially the same color in the visible region, the image pattern shown in FIGS. 1A and 1B cannot be identified visually. However, it can be detected in an infrared region. Although a pattern in the form of a square having a side of about 120 μm is described as an example to make ensuing descriptions, the foregoing region has a size of about four pixels if the same is read at 400 dpi (dot per inch). It should be noted that the method of forming the pattern is not limited to the foregoing method.

Figure 4:
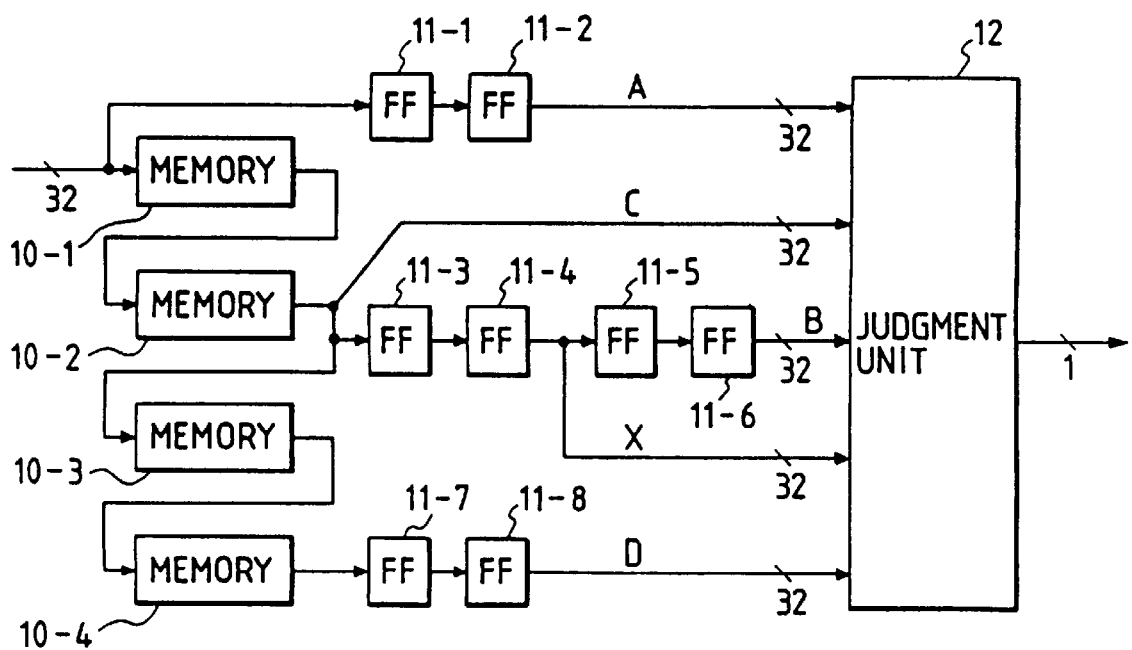
FIG. 4 is a 2D-area signal generating portion for detecting the specific pattern according to the first embodiment of the present invention.

With reference to FIG. 4, the identifying portion shown in FIGS. 15A and 15B will now be described. Reference numerals 10-1 to 10-4 shown in FIG. 4 represent image data line delay portions each comprising a FIFO. An address pointer is initialized in response to a line synchronizing signal HSYNC (omitted from illustration), while data is written or read for pixel unit in response to the CLOCK signal. Each of the image data line delay portions 10-1 to 10-4 delay R, G, B and IR data of 32 bits by one line.

First, an input signal is held in flip flops 11-1 and 11-2 to be delayed for two pixels to generate data for pixel A. Further, the line memories 10-1 and 10-2 delay the data for two lines to generate data for pixel C. Data items for the pixel C respectively are delayed by two pixels and four pixels to generate data about subject pixel data X and data about pixel B. Similarly, data about pixel D is supplied to a judging portion 12.

Figure 5:
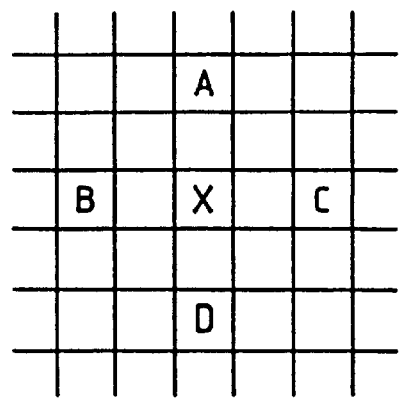
FIG. 5 illustrates a reference pixel for detecting the specific pattern according to the first embodiment of the present invention.

The position relationship among the pixels A, B, C and D around the subject pixel X is as shown in FIG. 5.

That is, if the subject pixel X is reading the low reflectance portion 101 shown in FIGS. 1A and 1B, the pixels Ar Bo C and D are reading the pixels of the patterns positioned around the low reflectance portion 101.

A judgment algorithm set to the judging portion 12 according to this embodiment will now be described.

Assuming that R, G, B and IR components of the reading signal which forms the pixel signal for A are AR, AG, AB and AIR and pixels signals for B, C and D are defined, average values YR, YG, YB and YIR of the read signals for each color component R, G, B and IR in each pixel signal are defined by the following equations:

$$Y_R = \tfrac{1}{4}(A_R + B_R + C_R + D_R)$$

$$Y_G = \tfrac{1}{4}(A_G + B_G + C_G + D_G)$$

$$Y_B = \tfrac{1}{4}(A_B + B_B + C_B + D_B)$$

$$Y_{IR} = \tfrac{1}{4}(A_{IR} + B_{IR} + C_{IR} + D_{IR})$$

An aimed pattern is judged in accordance with the difference between average value Y obtained by the foregoing equation and the subject pixel X.

That is, assuming that the R, G, B and IR components of X are XR, XG, XB and XIR respectively, the following relationships are held:

$$\Delta R = |Y_R - X_R|$$

$$\Delta G = |Y_G - X_G|$$

$$\Delta B = |Y_B - X_B|$$

$$\Delta IR = |Y_{IR} - X_{IR}|$$

If the following relationships are held, a judgment is made that a pattern is present:

$$\Delta R < K \text{ and}$$

$$\Delta G < K \text{ and}$$

$\Delta B < K$ and $\Delta IR > L1$ or $Y_{IR}/X_{IR} > L2$ where K, L1 and L2 are constants.

That is, if the color tone is not considerably different in the visible region (smaller than K) between the subject pixel X and the adjacent pixels A, B, and C and D and if the difference is larger by the constant L1 in the infrared region, or if the ratio of the level of the subject pixel X and that of the adjacent pixels is larger than the constant L1, a judgment is made that a specific pattern is present.

The reason why the ratio is used to make the judgment as well as the judgment of the infrared region is that the deterioration in the infrared ray signal level due to contamination of the original document must be compensated. In this embodiment, the overall damping of the infrared ray read signal due to the influence of contamination is compensated by detecting the ratio.

If the high reflectance portion 102 recorded with ink containing the near infrared fluorescent coloring material is present adjacent to the subject pixel X, the level difference for use in the judgment is further enlarged. Therefore, erroneous recognition can be prevented.

When reading operations 103, 104 and 105 are performed in different scan directions as shown in FIG. 1A, the intensities of the IR signals respectively are as shown in FIG. 1B so that the low reflectance portion, the reflectance portion of the medium and the high reflectance portion are detected. Therefore, the recognition rate can be improved while performing together the foregoing judgment.

If a near infrared ray absorbing film is used to prevent the judgment, the overall IR intensity is lowered so that the abnormality can be judged.

If a near infrared ray reflecting film is used to prevent the judgment, the abnormality can be judged because the overall IR intensity is excessively high.

If an intermediate-density infrared ray absorbing film or an infrared ray reflecting film is used, the IR intensity of the medium is simply changed, and therefore the judgment can be performed normally.

Figure 6:
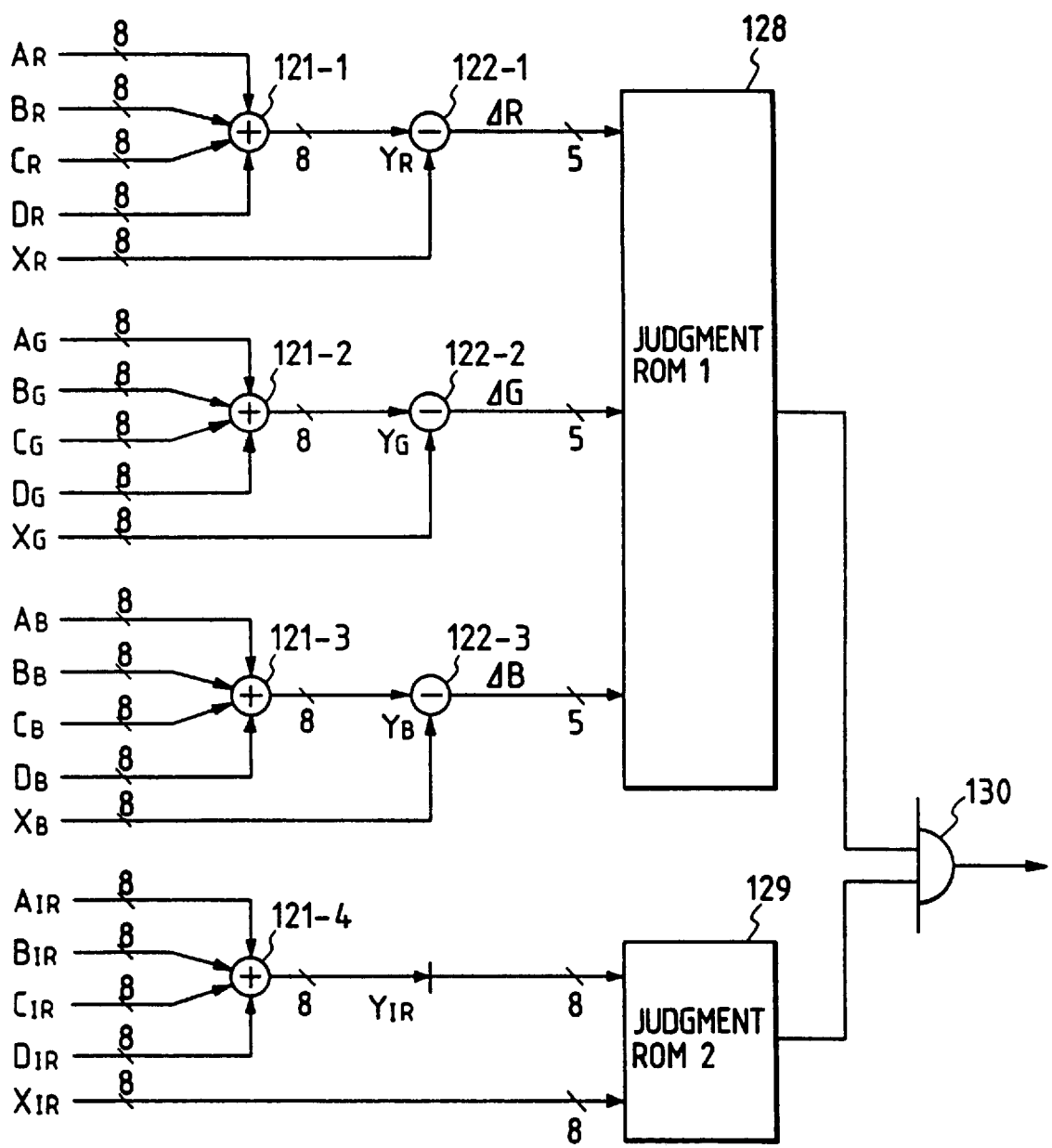
FIG. 6 is a structural view which illustrates a specific pattern judgment portion according to the first embodiment of the present invention.

FIG. 6 illustrates the structure of the judgment portion 12 adapted to the foregoing algorithm.

An adder 121 simply adds the color components for four pixels to transmit the upper eight bits to obtain YR, YG, YB and YIR. A subtractor 122 obtains the difference from each component of the subject pixel signal to supply upper five bits of the components $\Delta R$, $\Delta G$ and $\Delta B$ to a judgment LUT 128 comprising a ROM. If each of the upper five bits is smaller than constant K, 1 is transmitted from the LUT 128.

Similarly, 8-bit YIR and XIR are supplied to an address terminal of a judgment LUT comprising a ROM in a case of an infrared read signal. If the judgment $\Delta IR > L1$ or YIR/XIR>L2 is resulted in the foregoing calculation $\Delta IR = YIR - XIR$, 1 is transmitted from the LUT 129.

The logical product of the output from each LUT is calculated in an AND gate 130, and therefore a pattern can be detected if 1 is obtained at the output terminal of the AND gate 130.

The result of the judgment is supplied to a latch 3022 shown in FIGS. 15A and 15B. The latch output is supplied to an input port P10 of a CPU 3018 so that the CPU recognizes the detection of the specific mark. The CPU clears the latch 3022 in response to a signal of an output port P9 prior to starting the copying sequence to prepare for the next pattern detection.

Figure 17:
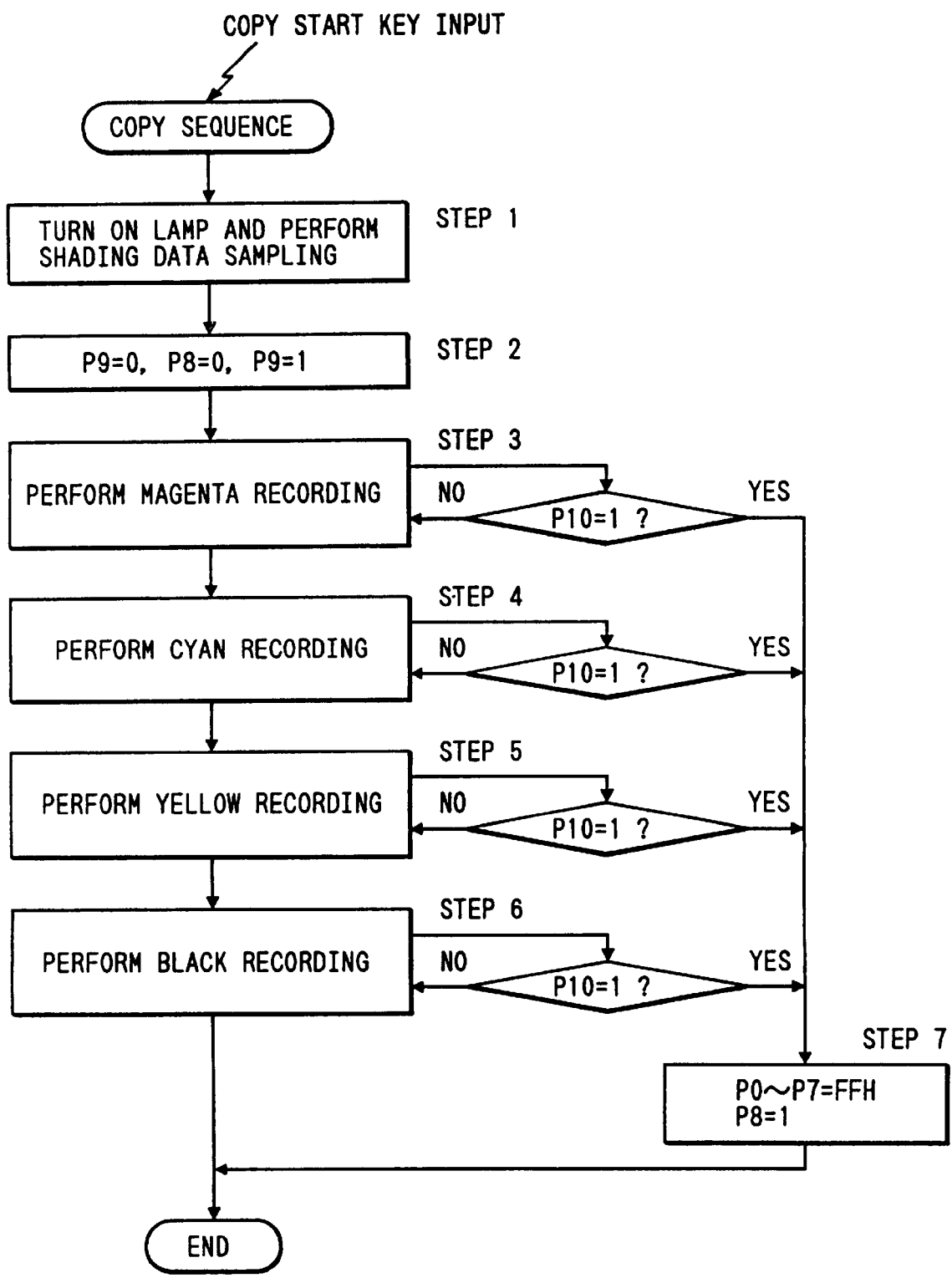
FIG. 17 is a flow chart for control performed by a CPU.

A usual copying operation and an operation of the CPU to control the operation of judging the recognition mark will now be described with reference to FIG. 17.

When an operator places the original document 204 on the platen 203 and starts the copying operation by operating a control portion (omitted from illustration), the CPU 3018 controls a motor (omitted from illustration) to move the reflecting mirror 206 to a position below the standard white plate 211.

Then, the halogen lamp 205 is lit on to irradiate the standard white plate 211 so that the shading correction portions 3006 to 3009 sample shading data for the IR, R, G and B signals (step 1).

Then, the port output P9 is made to be zero, the output from the latch 3022 is made to be zero-cleared, the output from P8 is made to be zero, input A of the selector 3017 is selected so that a masked and UCR-processed image signal is supplied to the printer. Then, the output from P9 is made to be 1, and the clearing operation of the latch 3022 is completed (step 2).

Then, the original document is read four times to correspond to the operation of recording the four colors M, C, Y and BK performed in the printer portion so that the image is recorded. Further, the recognition mark is detected, and the recording operation is controlled in accordance with the result of the detection.

First, a magenta image is recorded in such a manner that the CPU qualifies the processing condition for processing the magenta image to be performed by the masking and UCR processing portion to cause the optical system to perform the scanning operation and to supply a magenta signal to the printer. After the scanning operation has been completed, the CPU returns the optical system to the scan start position (step 3).

The CPU periodically reads the port 10 during the operation of reading the original document to judge whether or not the input to the port 10 is 1. If the P10 is 1, a judgment is made that a specific original document, the normal reproduction of which must not be inhibited, is being copied, and the outputs from P0 to P7 are made to be FFH in step 7. Further, the output from P8 is made to be 1 to transmit a solid signal FFH to the printer to inhibit the normal copying operation.

Similarly, recording of cyan, yellow and black data is controlled in steps 4 to 6, and the CPU periodically examines the state of P10. If the output from P10 is 1, full black FFH data is transmitted to the printer in step 7.

If P10=1 is detected during the operation of recording the cyan data, the magenta data is normally copied. However, all of cyan, yellow and black data items are recorded in the form of solid FFH data.

Second Embodiment

Figure 18A:
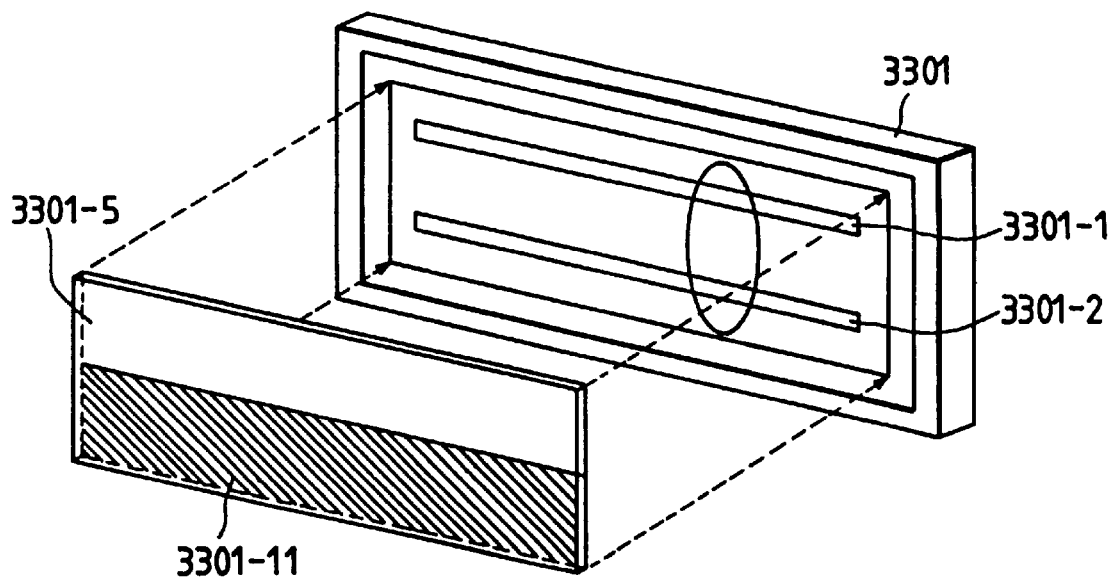
FIGS. 18A and 18B are structural views which illustrate an image reading apparatus according to a second embodiment of the present invention.
Figure 18B:
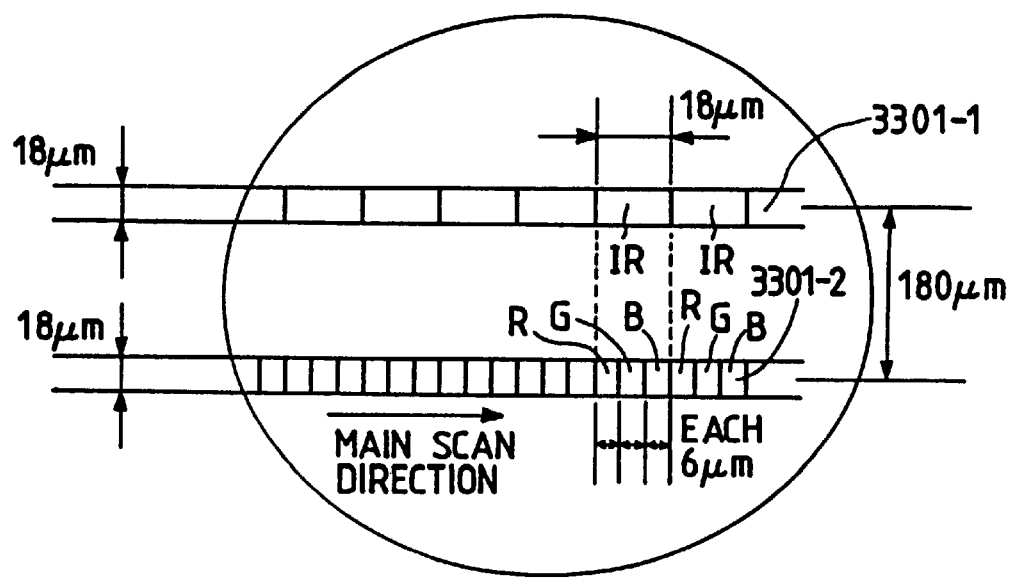

FIGS. 18A and 18B illustrate an example of a second structure of an image reading apparatus according to the present invention.

A CCD is, as shown in FIG. 18A, is arranged in such a manner that two-line sensors are formed on a common silicon chip in a monolithic manner.

A line sensor 3301-1 is an infrared ray reading sensor (an IR sensor), and a line sensor 3301-2 is a full color line sensor in which R, G and B sensors are alternately disposed in pixel units.

A glass plate 3301-5 having a dichroic filter 3301-11 for cutting infrared rays evaporated thereof is fastened on to the foregoing sensor by a method similar to that shown in FIGS. 7A and 7B.

The dichroic filter 3301-11 has the infrared ray cutting characteristics shown in FIG. 11 similarly to 210-11.

The glass plate is fastened to the CCD chip similarly to the method shown in FIGS. 7A and 7B such that the end of the evaporated portion is positioned between the line sensors 3301-1 and 3301-2.

FIG. 18B is an enlarged view which illustrates pixels of the line sensors 3301-1 and 3301-2.

The IR sensor 3301-1 has a pixel size 18 μm×18 μm and in which R and B filters having characteristics shown in FIG. 10 are superposed on the sensor, the IR sensor 3301-1 having the infrared ray transmission characteristics of the IR sensor 210-1.

By combining the IR sensor 3301-1 with a far infrared ray cutting filter disposed in the imaging optical system similar to that according to the first embodiment and having the characteristics shown in FIG. 12, infrared ray reading characteristics similar to that according to the first embodiment are attained.

Reference numeral 3301-2 represents R, G and B sensor arrays positioned away from the IR sensor by 180 μm (for 10 lines), the sensor array 3301-2 having an arrangement in which R, G and B pixels having a size of 6 μm to correspond to the size of 18 mm of one pixel of the IR sensor in the main scan direction. Each of the R, G and B pixels is provided with a color decomposing filter having the characteristics shown in FIG. 10.

The sensor according to this embodiment has 5,000 pixels in the main scan direction to read an A3-size original document at 400 dpi, and 5,000 combinations of R, G and B are provided.

In order to project the size 63.5 μm (one pixel of 400 dpi) of the original document retainer onto a size of 18.5 μm, the contraction ratio of the optical system is made to be 18.5/63.5.

When the identification pattern according to the first embodiment was measured by the foregoing detection apparatus, an excellent judgment was performed.

Third Embodiment

Figure 19A:
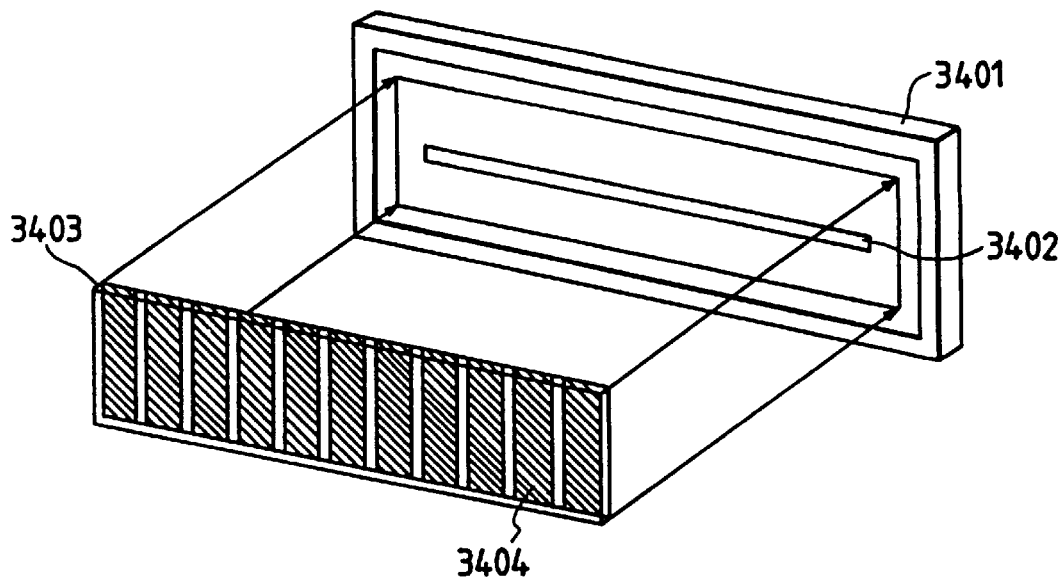
FIGS. 19A and 19B are structural views which illustrate an image reading apparatus according to a third embodiment of the present invention.
Figure 19B:
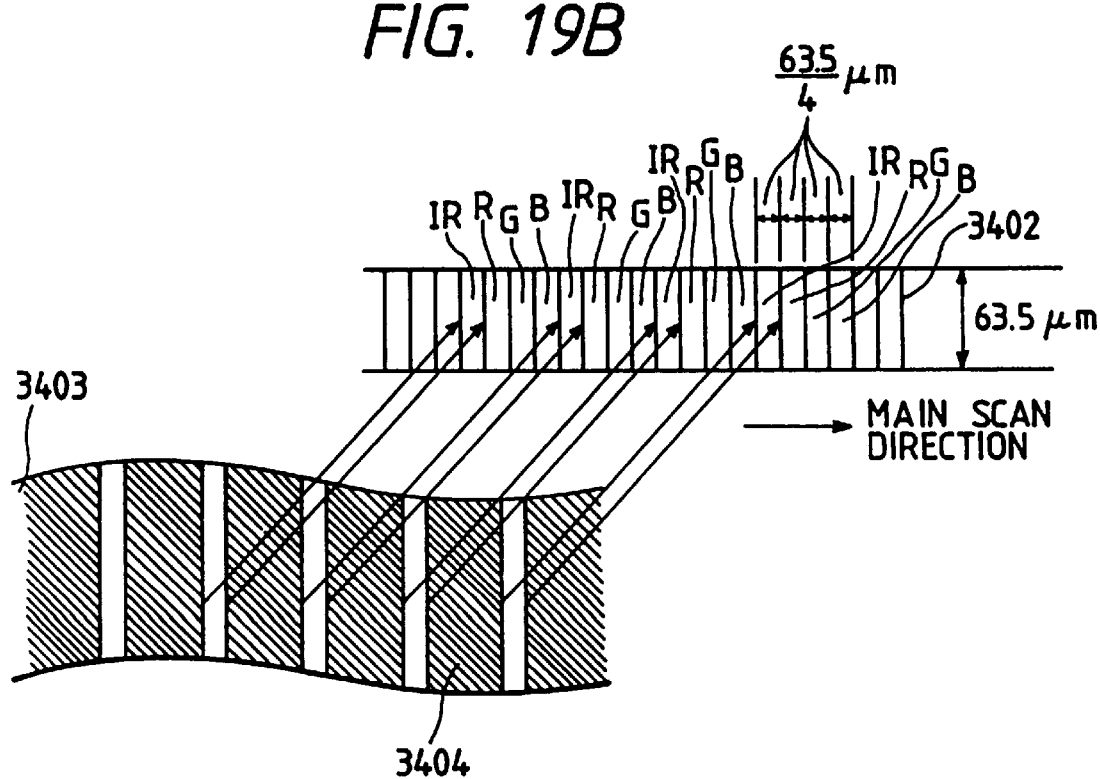

FIGS. 19A and 19B illustrate an example of the structure of a third embodiment of the image reading apparatus according to the present invention.

A CCD 3401 comprises a sensor 3402 having R, G, B and IR pixels formed on lines as shown in FIG. 18A so that image data for one pixel is color-decomposed (the wavelength is decomposed) by the combination of IR, R, G and B to read the image data.

Each of the IR, R, G and B pixels has a size of 63.5/4 μm in the main scan direction so that a pixel of 63.5 μm is read by a combination of IR, R, G and B.

Since the sensor according to this embodiment reads an original document at 400 dpi, the contraction ratio of an optical system is made to be one time so that the size 63.5 μm (one pixel of 400 dpi) of the original document retainer is projected onto the size of 63.5 μm.

The IR reading pixel has R and B filters having the characteristics shown in FIG. 10 and superposed on the sensor to have the infrared ray transmission characteristics of the IR sensor 210-1.

By combining it with the far infrared ray cutting filter disposed in the imaging optical system (omitted from illustration) and having the characteristics shown in FIG. 12, the infrared ray reading characteristics similar to that obtainable from that according to the first embodiment can be attained. The R, G and B reading pixels have color decomposing filters having the characteristics shown in FIG. 10.

A glass plate 3403 having dichroic filters 3403-11 for cutting infrared rays, evaporated at a pitch of 63.5 μm and having a width of 63.5/4 μm is fastened on the sensor as shown in FIG. 19A.

The dichroic filter 3404 has the infrared ray cutting characteristics similarly to 210-11.

The glass plate is fastened to the CCD chip similarly to that shown in FIGS. 7A and 7B in such a manner that its evaporated side faces the surface of the chip and the portion, which is not evaporated, corresponds to the IR pixels as shown in FIGS. 19A and 19B.

When the identification pattern according to the first embodiment was measured with the foregoing detection apparatus, an excellent judgment was performed.

Although the third embodiment is arranged in such a manner that the IR, R, G and B pixels for reading one pixel are arranged in the main scan direction, another structure may be employed which is arranged in such a manner that they are disposed in a 2D manner and the infrared ray cutting dichroic filters are disposed in only the portions of the glass plate that correspond to the R, G and B pixels.

Although the foregoing embodiment is arranged in such a manner that the infrared ray cutting filter is made of transparent material and it is fastened to the sensor, the filter is not limited to the infrared ray cutting filter. The filter may be a filter for cutting ultraviolet rays that are not required to read visible information.

As described above, use of the invisible information recorded medium having the identification mark composed of a region having a high reflectance and a region having a low reflectance region as compared with the reflectance of the medium at the same near infrared ray wavelength and an apparatus for detecting the invisible information recording medium enables the specific original document to be judged assuredly while reducing the cost.

Further, an attempt of judgment prevention using the infrared ray absorbing film or an infrared reflecting film can assuredly be judged.

Fourth Embodiment

This embodiment is arranged in such a manner that an invisible information recording medium is used which serves as a recording medium for inhibiting copying and reading, having no information recorded in the visible ray region thereof and having an identification mark which absorbs near infrared rays so that inhibition of copying and reading is identified.

The invisible information recording medium according to this embodiment and having visible information comprises the identification mark representing the copying and reading inhibition so that copying and reading are inhibited when the mark is detected.

The identification mark having the invisible information for inhibiting copying is recorded in such a manner that coloring material or pigment which does not absorb visible rays and which absorbs near infrared rays is dissolved or dispersed in a binder and a predetermined pattern is, by printing or the like, formed in the recording medium for inhibiting copying.

The near infrared ray absorbing coloring material or pigment may be a material having the absorption wavelength peak in a range of 700 nm or longer, preferably 750 nm or longer. Since the material having the absorption wavelength peak in a range of 700 nm or shorter can be visually detected, the secrecy cannot satisfactorily be maintained. If a material having the absorption wavelength peak in a range of 1100 nm or longer is used, sensitivity of a Si-type photo-detection device, such as a CCD, deteriorates. In this case, the identification mark cannot accurately be judged. It is further preferable to employ a coloring material or pigment having the absorption wavelength peak in a range of 1000 nm or shorter.

The foregoing near infrared ray absorbing coloring material or pigment may be dispersed or mixed with the binder while being combined with an ultraviolet absorber or an antioxidant.

The near infrared ray absorbing coloring material or pigment must be a type that does not absorb visible rays. The absorbance of the maximum absorbing wavelength in the infrared ray region must be 5 times or more the absorbance of the maximum absorbing wavelength, more preferably 10 times or more. If it is 5 times or less, it can easily visibly recognized in a visible ray region if the mark in the near infrared ray region is allowed to have a thickness that can be identified. Therefore, an adverse influence is resulted on the information to be recorded.

More specifically, any one of the following near infrared ray absorbing coloring material or pigment may be used.

However, a material may be used regardless of the exemplified materials if it absorbs near infrared rays and exhibits large absorbance and excellent weathering and light resistance.

Compounds (1) to (44)

The binder resin for use in the foregoing near infrared ray absorbing coloring material or pigment may be a urea resin, melamine resin, alkyd resin, acryl resin, vinyl chloride resin, aromatic sulfonamide resin, or a benzoquanamine resin or their copolymer.

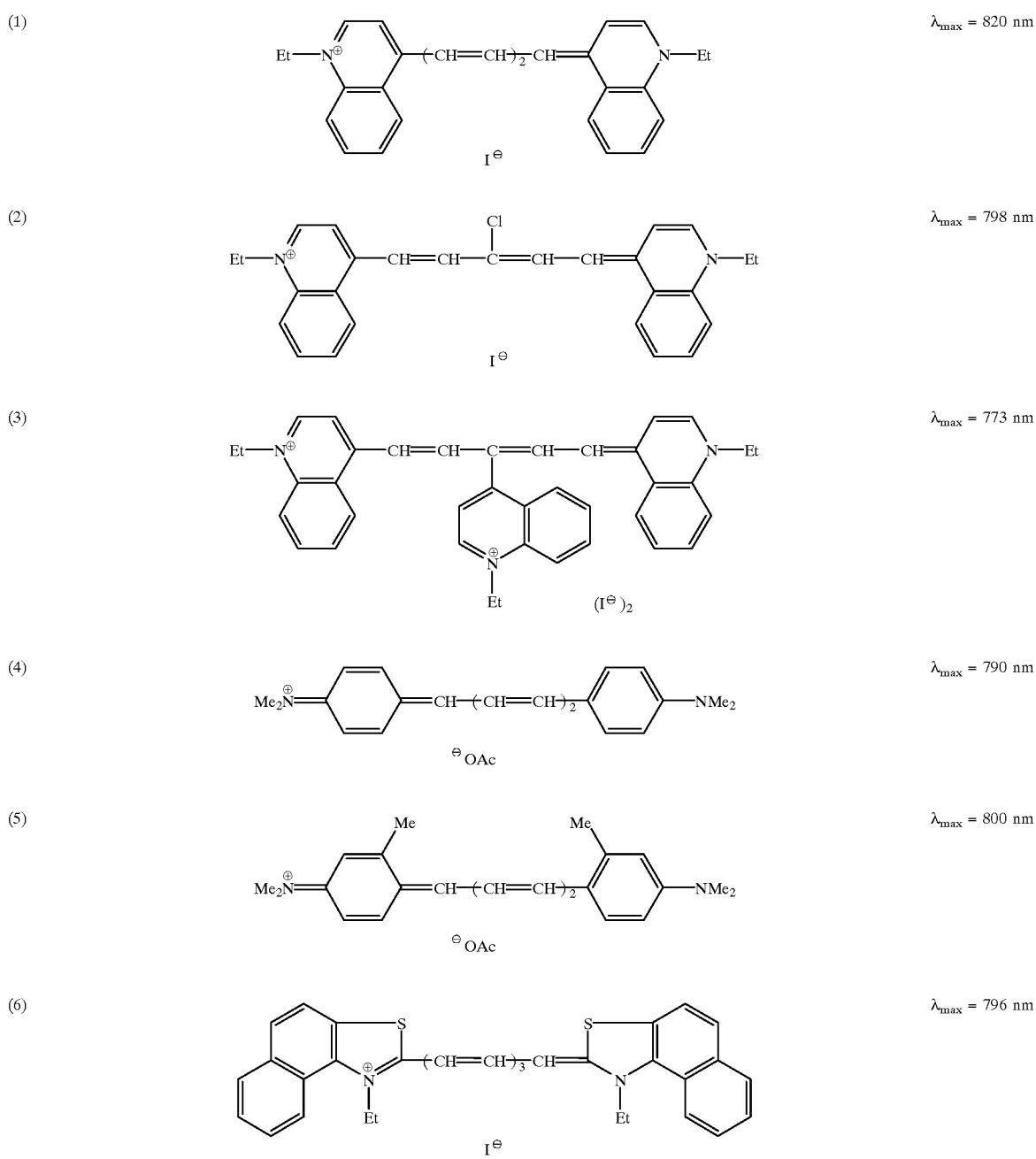

(7) 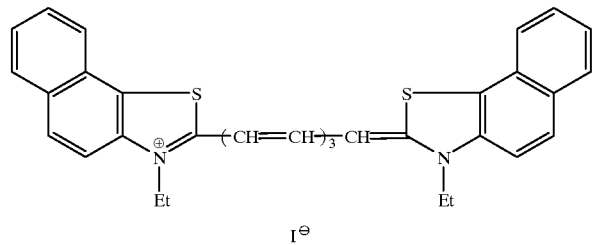 λ_max = 793 nm
(8) 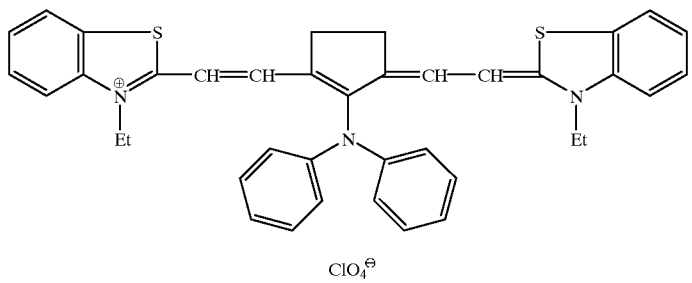 λ_max = 801 nm
(9) 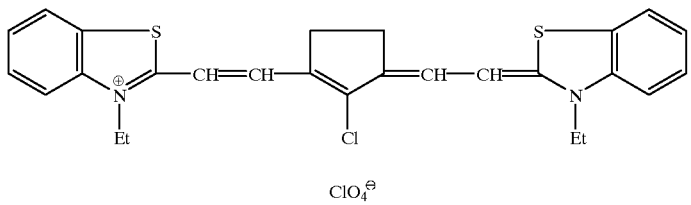 λ_max = 819 nm
(10) 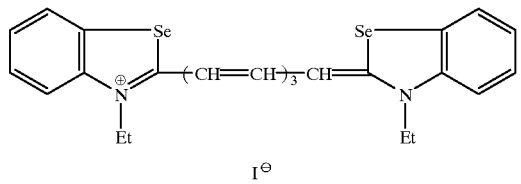 λ_max = 769 nm
(11) 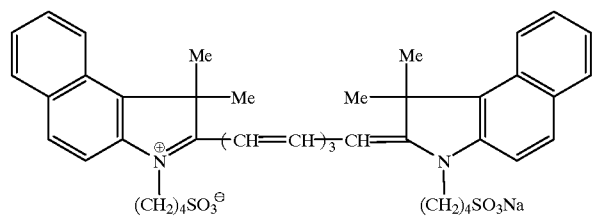 λ_max = 785 nm
(12) 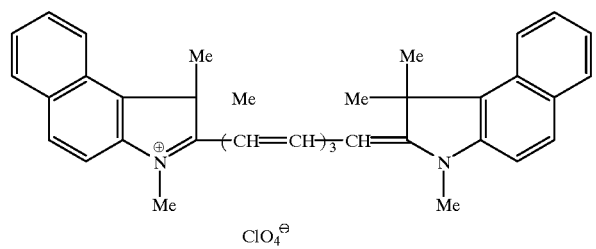 λ_max = 778 nm -continued
(13) 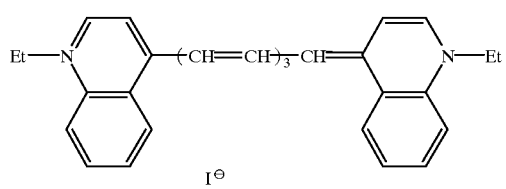 λ_max = 928 nm
(14) 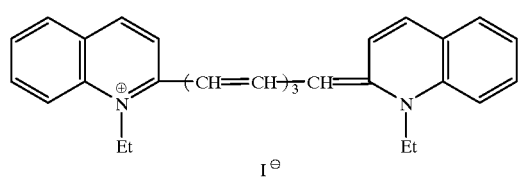 λ_max = 816 nm
(15) 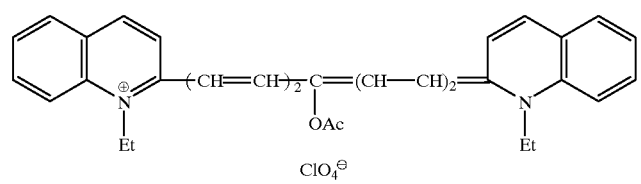 λ_max = 927 nm
(16) 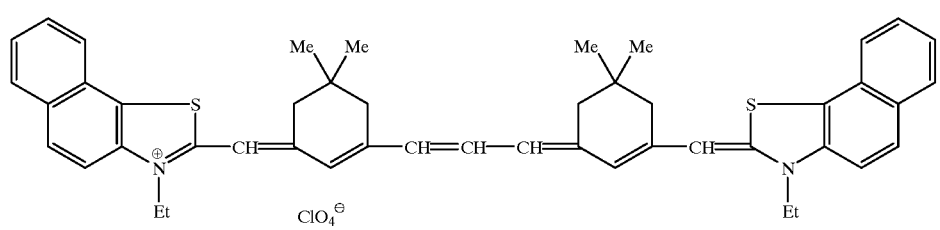 λ_max = 1050 nm
(17) 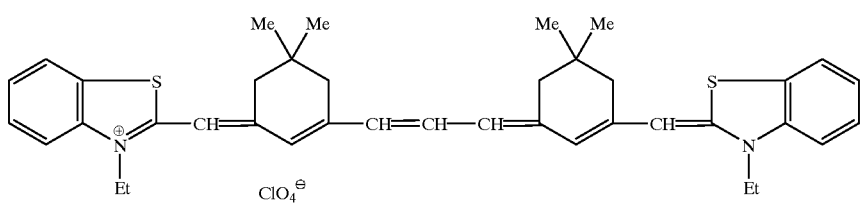 λ_max = 1010 nm
(18) 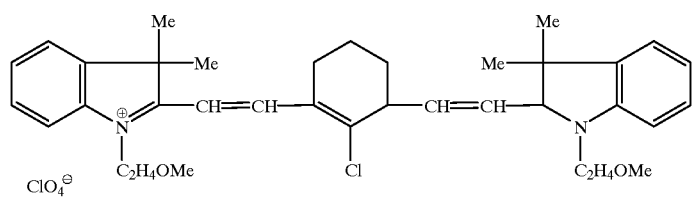 λ_max = 787 nm
(19) 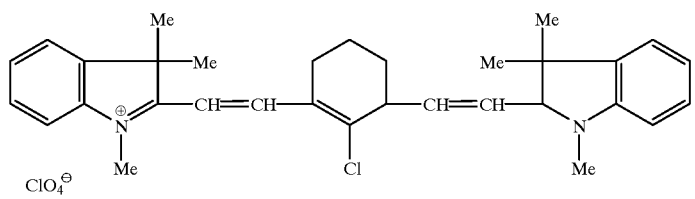 λ_max = 785 nm -continued
(20) 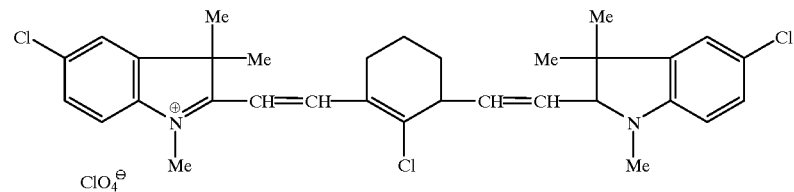 λ_max = 794 nm
(21) 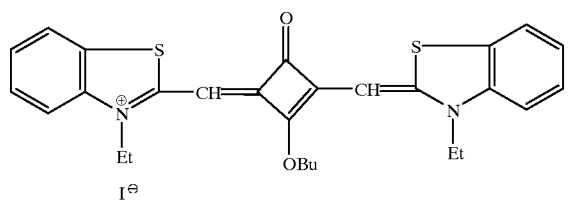 λ_max = 796 nm
(22) 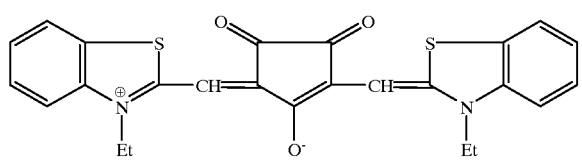 λ_max = 771 nm
(23) 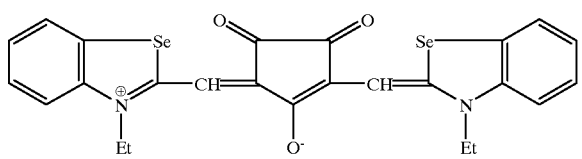 λ_max = 790 nm
(24) 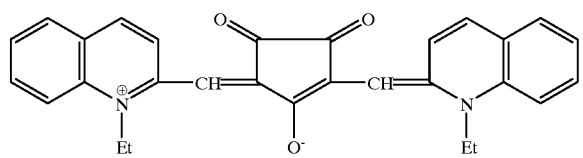 λ_max = 831 nm
(25) 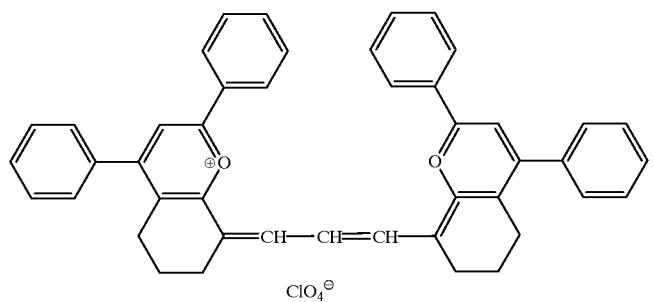 λ_max = 940 nm
(26) 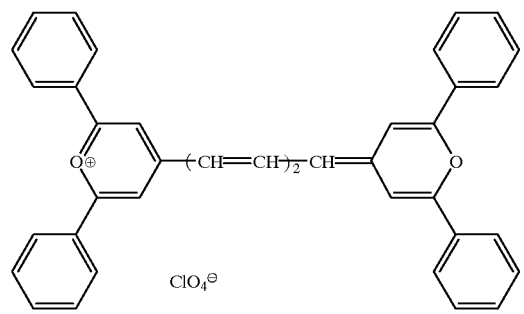 λ_max = 805 nm -continued
(27) 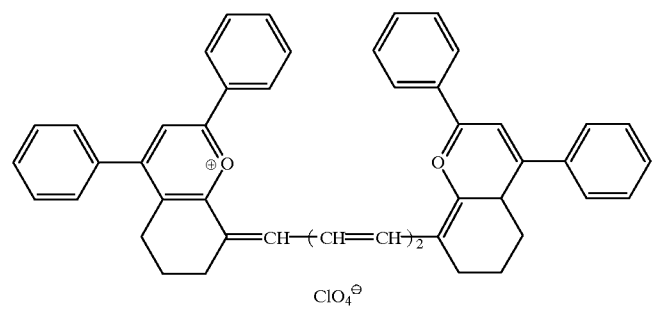 λ_max = 1060 nm
(28) 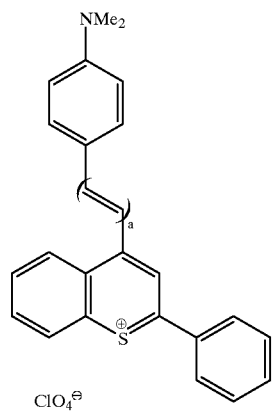 λ_max = 944 nm
(29) 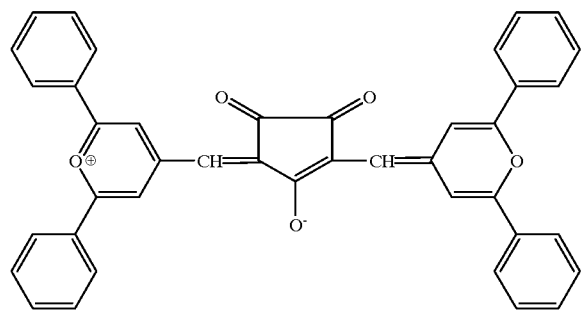 λ_max = 954 nm
(30) 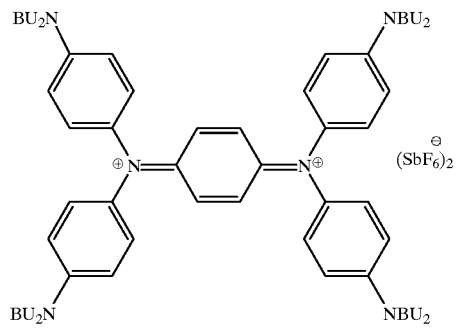 λ_max = 1090 nm -continued
(31) 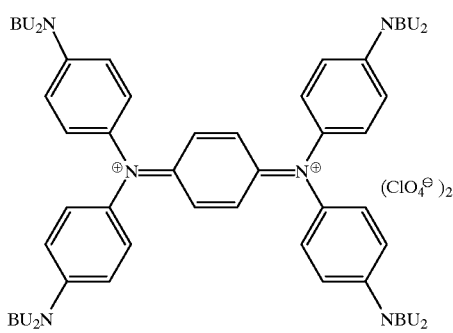 λ_max = 1090 nm
(32) 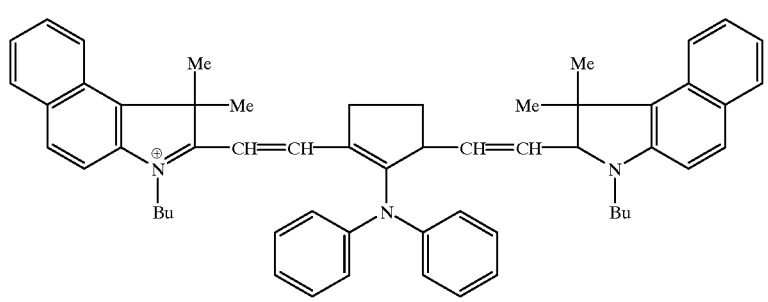 λ_max = 840 nm
(33) 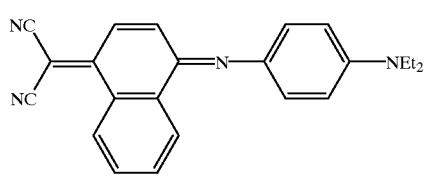 λ_max = 772 nm
(34) 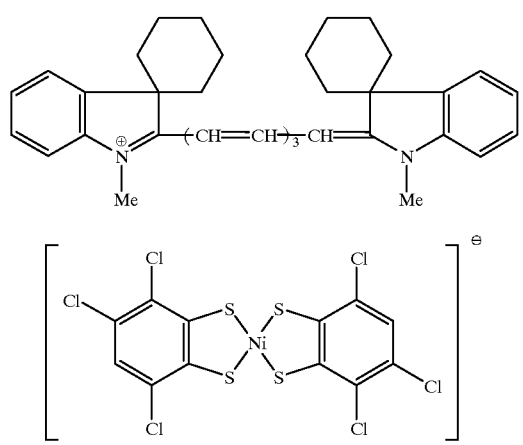 λ_max = 765 nm
(35) 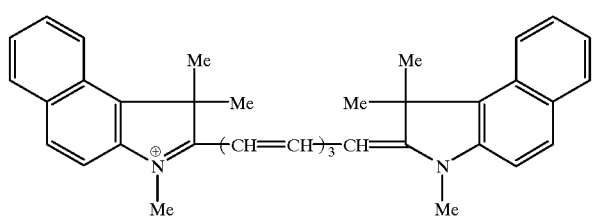 λ_max = 790 nm -continued
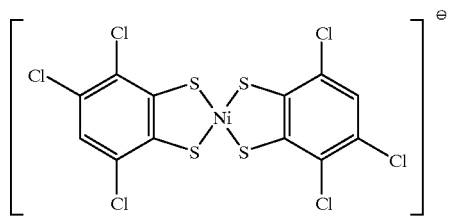
(36) 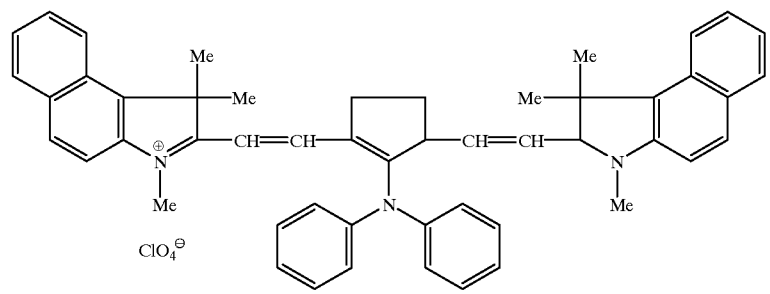  $\lambda_{max}$ = 835 nm
(37) 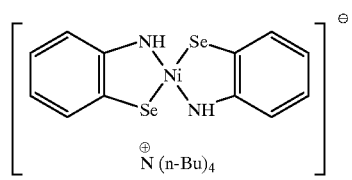  $\lambda_{max}$ = 858 nm
(38) 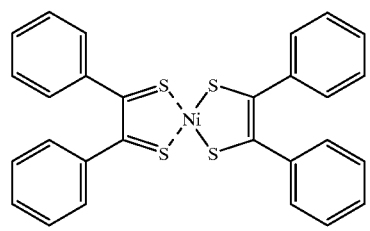  $\lambda_{max}$ = 855 nm
(39) 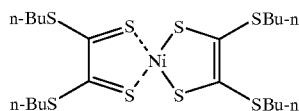  $\lambda_{max}$ = 1010 nm
(40) 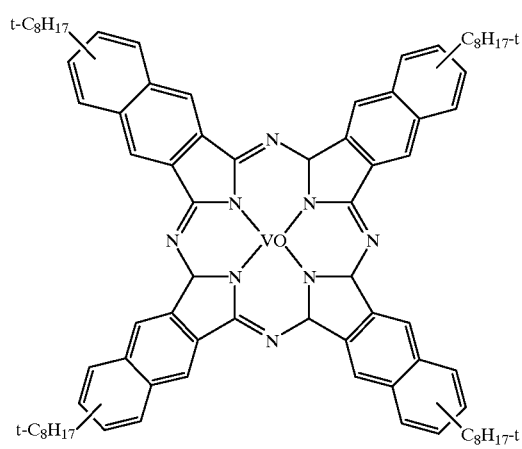  $\lambda_{max}$ = 770 nm -continued

(41) 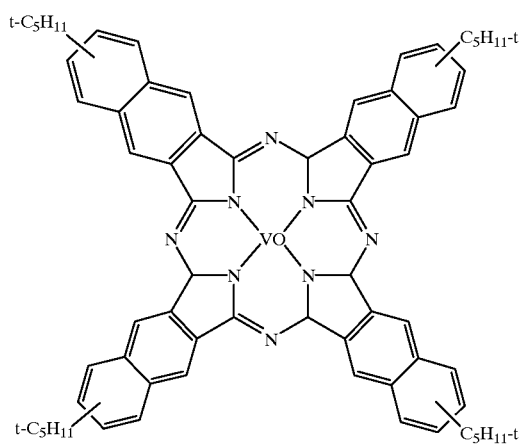 $\lambda_{max} = 765$ nm

(42) 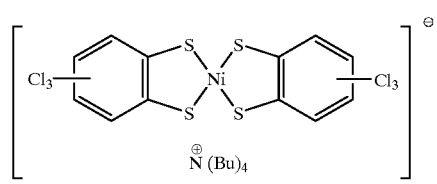 $\lambda_{max} = 870$ nm

(43) 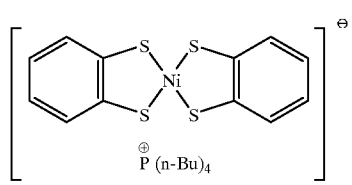 $\lambda_{max} = 875$ nm

(44) 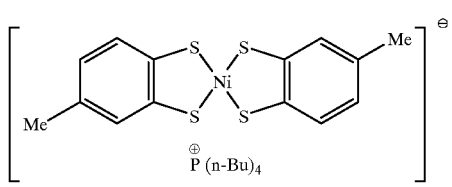 $\lambda_{max} = 905$ nm

As another example of the identification mark having invisible information for inhibiting copying, fluorescent coloring material or pigment which does not absorb the visible rays but which has fluorescent characteristics in the near infrared ray region is dissolved or dispersed in the binder and a predetermined pattern is, by printing or the like, formed on the recording medium for inhibiting copying.

The fluorescent coloring material or pigment may be a material having the fluorescent wavelength peak in a range of 700 nm or longer, preferably 800 nm or longer.

Since the material having the fluorescent wavelength peak in a range of 700 nm or shorter can be visually detected, the secrecy cannot satisfactorily be maintained. If a material having the fluorescent wavelength peak in a range of 1100 nm or longer is used, sensitivity of a Si-type photo-detection device, such as a CCD, deteriorates. In this case, the identification mark cannot accurately be judged. It is further preferable to employ a fluorescent coloring material or pigment having the fluorescent wavelength peak in a range of 1000 nm or shorter. Since the near infrared fluorescent rays can be detected when they are separated from exciting rays, it is preferable that the two types of the rays have wavelengths which are considerably different from each other. Therefore, near infrared fluorescent coloring material or pigment and exciting rays are selected such that they are different from each other by 50 nm or more, preferably 100 nm or more.

If the absorption of exciting rays takes place in the visible region, it can be recognized visually and information to be recorded is adversely affected. It is preferable to employ the exciting rays having the absorption wavelength peak of 750 nm or longer.

The exciting wavelength is selected depending upon the type of the light source and the spectrum filter. The near infrared fluorescent coloring material may be a xanthene, oxazine, thiazine, polymethine or stryl compound. As an inorganic compound, a solid laser material of a type containing a rare earth element is used.

More specifically, any one of the following near infrared fluorescent coloring material may be used. However, a material may be used regardless of the exemplified materials if it has fluorescent rays in the near infrared ray region and exhibits excellent fluorescent quantum yield, weather and light resistance.

Compounds (45) to (65)

The binder resin for use in the foregoing near infrared fluorescent coloring material or pigment may be a urea resin, melamine resin, alkyd resin, acryl resin, vinyl chloride resin, aromatic sulfonamide resin, or a benzoquanamine resin or their copolymer. By using a ultraviolet absorber or an anti-oxidant with the foregoing resin, the light resistance of the resin can be improved. The binder resin can be manufactured by a block resin crushing method, emulsification polymerizing method or a resin precipitation method or the like.

(45) 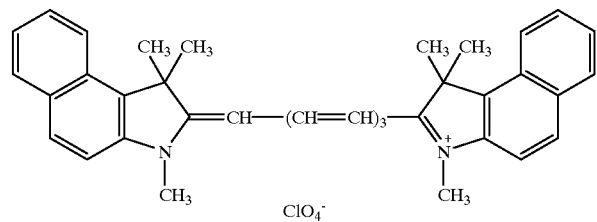 λabs 780 nm

(46) 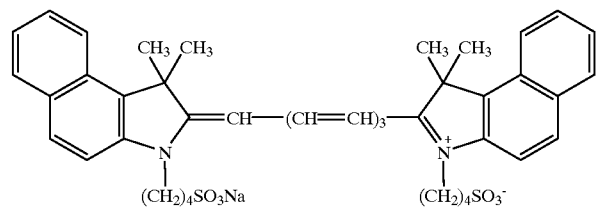 λabs 790 nm

(47) 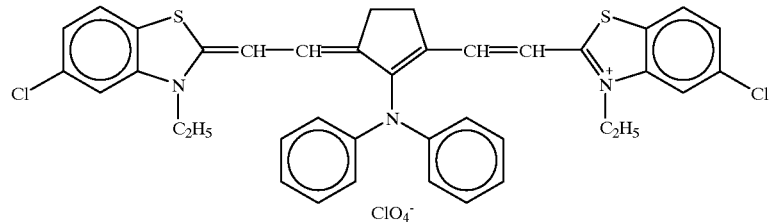 λabs 820 nm

(48) 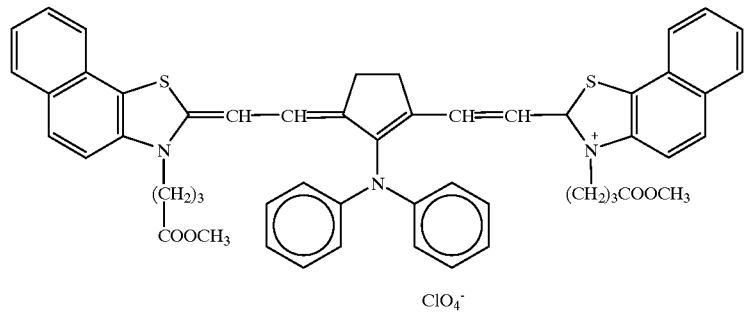

(49) 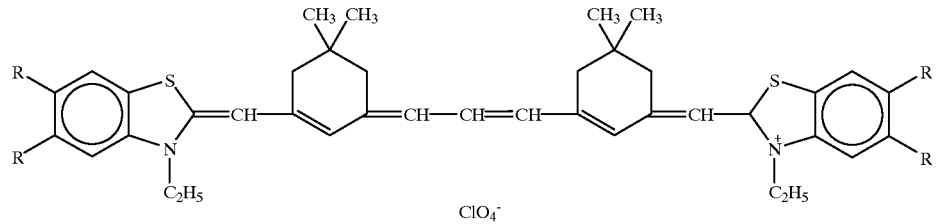 R = H

-continued
(50) 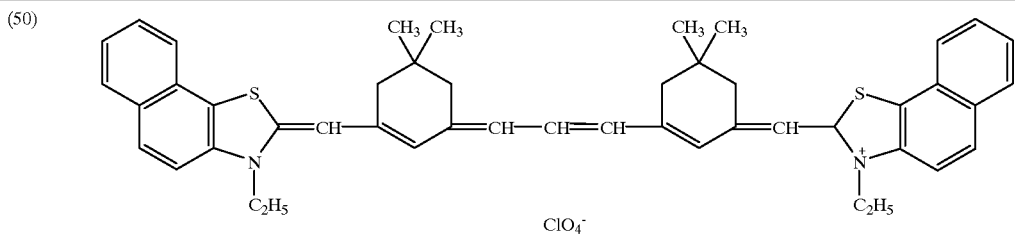
(51) $NdP_5O_{14}$
(52) $LiNdP_4O_{12}$
(53) $Na_5Nd(WO_4)_4$
(54) $Al_3Nd(BO_3)_4$
(55) $Cs_2NaNdCl_6$
(56) $Li(Nd_{0.9}Yb_{0.1})P_4O_{12}$
(57) 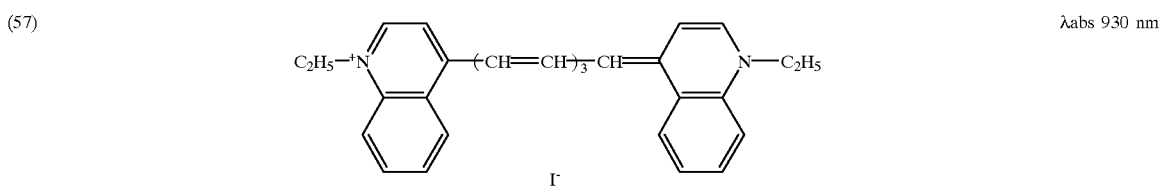  λabs 930 nm
(58)   λabs 930 nm
(59) 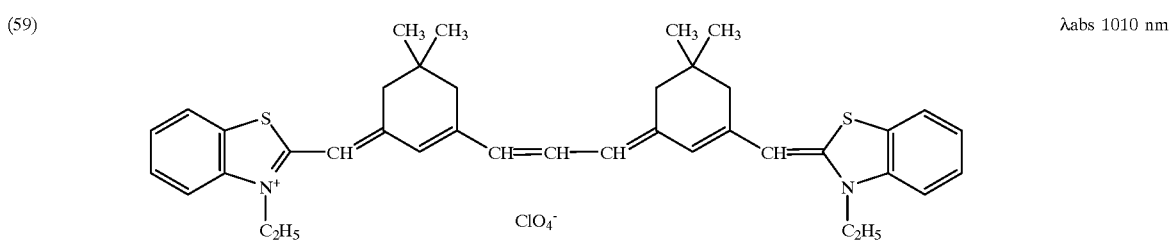  λabs 1010 nm
(60) 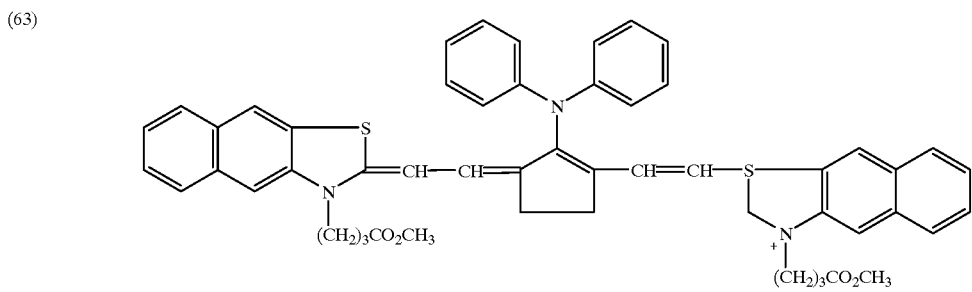  λabs 1050 nm
(61) Nichira Chemical Industry NP-870   λabs 250 nm
(62) $LiAlO_2:Fe^{3+}$   λabs 250 nm
(63)   λabs 830 nm -continued

(64) 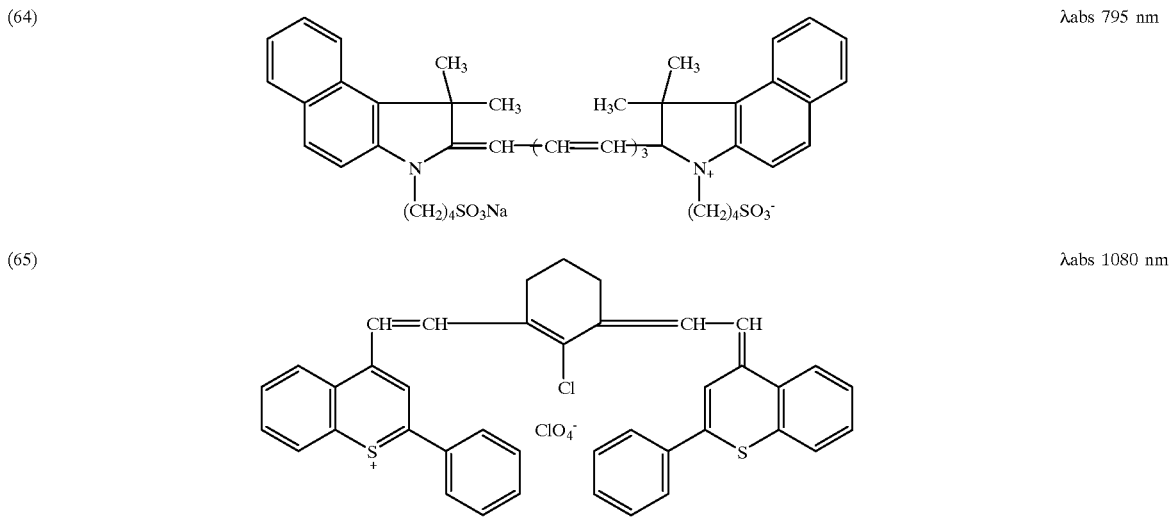
λabs 795 nm

(65)
λabs 1080 nm

FIG. 21 illustrates reflection spectrum of copying paper for a copying machine as an example of a recording medium in a state prior to recording the identification mark. Since the copying paper has a substantially constant reflectance in a range from 450 to 1200 nm, it is preferable to be used as a medium in the present invention.

Since the usual paper, such as the copying paper, has a relatively high reflectance, change due to absorption is suitable as the change in the reflectance utilized as the identification mark according to the present invention.

In case where fluorescent rays are used, the absorption wavelength for use as the excitement ray is usually shorter than the fluorescent wavelength. Therefore, the visible region is easily affected. If the wavelength is lengthened to prevent the influence upon the visible portion, the fluorescent wavelength is further lengthened. Therefore, the structure of the optical system becomes difficult to be formed.

Figure 3:
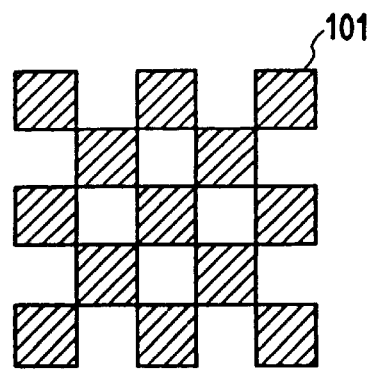
FIG. 3 is a structural view which illustrates a specific original document identification pattern according to a fourth embodiment of the present invention.

An image pattern to be detected and according to the present invention will now be described with reference to FIG. 3. FIG. 3 illustrates a low reflection portion 101 recorded by using ink formed by dissolving, in a PMMA, infrared absorption coloring material which has the characteristics shown in FIG. 9 and which is not absorbed in the visible portion.

Since the image patterns are printed as small patterns in the form of squares each having a side of about 120 μm and they are substantially the same color in the visible region, the image pattern shown in FIG. 3 cannot be identified visually. However, it can be detected in an infrared region. Although a pattern in the form of a square having a side of about 120 μm is described as an example to make ensuing descriptions, the foregoing region has a size of about four pixels if the region b is read at 400 dpi (dot per inch). It should be noted that the method of forming the pattern is not limited to the foregoing method.

If an attempt is made to prevent the judgment by forming an infrared ray absorbing film in order to copy an original document recorded by using a recording medium having the identification mark according to the present invention, the intensity of the infrared ray is weakened on the overall surface of the original document. Therefore, the abnormality can be judged.

If an attempt is made to prevent the judgment by using an infrared ray reflecting film, the intensity of the near infrared ray is straightened on the overall surface of the original document, the abnormality can be judged.

If an intermediate-density infrared ray absorbing film or an infrared ray reflecting film is used, the change of the reflectance of the identification mark on the original document takes place usually although the base value deviates. Therefore, the judgment can be performed.

As described above, the invisible information recording medium is used as a recording medium for inhibiting copying and reading, the invisible information recording medium having no information in the visible region thereof and having the identification mark which is absorbed or reflected in the near infrared ray region. As a result, an effect can be obtained in that copying and reading of a medium having visible information, copying or reading of which is intended to be inhibited, can be assuredly prevented by detecting the identification mark while preventing an influence upon the visible information.

Fifth Embodiment

According to this embodiment, toner particles containing a resin and a coloring agent are used as a developer for recording secret information by an electrophotographic method. Further, the coloring agent is an infrared ray absorbing coloring material or pigment which is free from absorption in the visible resion and absorption of which takes place in the near infrared region. Therefore, secret recording can be performed with a usual copying machine or in a usual photography.

Since use of the toner according to the present invention causes no image to be present in the visible portion, another visible image can be formed with a usual toner which is free from absorption in the near infrared ray region. Therefore, the secrecy of information in the near infrared ray portion can further be improved.

The toner according to this embodiment is able to contain, as a coloring agent, an infrared ray absorbing coloring material or pigment which is free from absorption in the visible portion but which is absorbed in the near infrared ray portion.

The near infrared ray absorbing coloring material or pigment may be a material having the absorption wavelength peak in a range of 700 nm or longer, preferably 750 nm or longer. Since the material having the absorption wavelength peak in a range of 700 nm or shorter can be visually detected, the secrecy cannot satisfactorily be maintained. If a material having the absorption wavelength peak in a range of 1100 nm or longer is used, sensitivity of a Si-type photo-detection device, such as a CCD, deteriorates. In this case, the identification mark cannot accurately be judged. It is further preferable to employ a coloring material or pigment having the absorption wavelength peak in a range of 1000 nm or shorter.

The foregoing near infrared ray absorbing coloring material or pigment may be dispersed or mixed with the binder while being combined with an ultraviolet absorber or an antioxidant.

The near infrared ray absorbing coloring material or pigment must be a type that does not absorb visible rays. The absorbance of the maximum absorbing wavelength in the infrared ray region must be 5 times or more the absorbance of the maximum absorbing wavelength, more preferably 10 times or more.

If it is 5 times or less, it can easily visibly be recognized in a visible ray region if the mark in the near infrared ray region is allowed to have a thickness that can be identified. Therefore, an adverse influence is resulted on the information to be recorded.

More specifically, any one of the following near infrared ray absorbing coloring material or pigment may be used. However, a material may be used regardless of the exemplified materials if it absorbs near infrared rays and exhibits large absorbance and excellent weathering and light resistance.

Compounds (1) to (44)

The binder resin for use in the foregoing near infrared ray absorbing coloring material or pigment may be a urea resin, melamine resin, alkyd resin, acryl resin, vinyl chloride resin, aromatic sulfonamide resin, or a benzoquanamine resin or their copolymer.

(1) 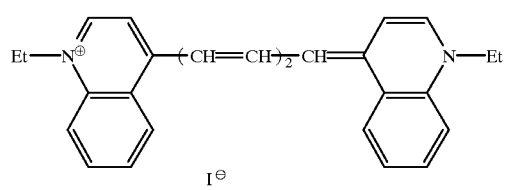 $\lambda_{max}$ = 820 nm (2) 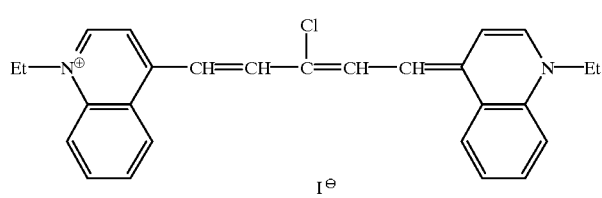 $\lambda_{max}$ = 798 nm (3) 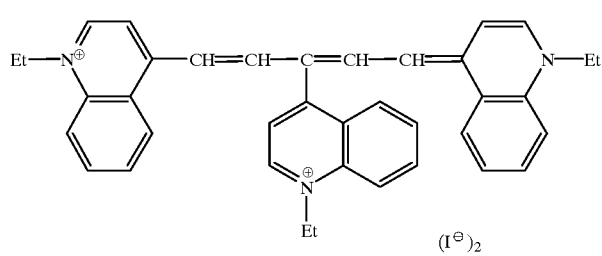 $\lambda_{max}$ = 773 nm (4) 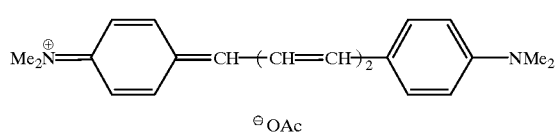 $\lambda_{max}$ = 790 nm (5) 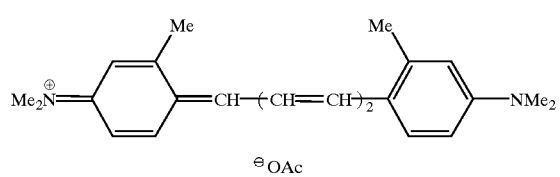 $\lambda_{max}$ = 800 nm -continued
(6) 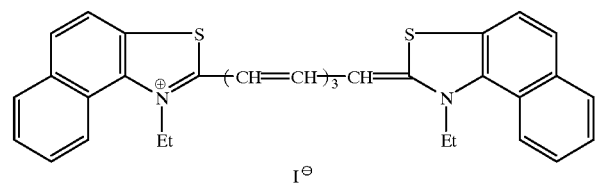 λ$_{max}$ = 796 nm
(7) 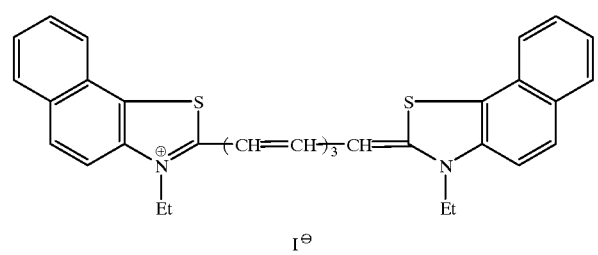 λ$_{max}$ = 793 nm
(8) 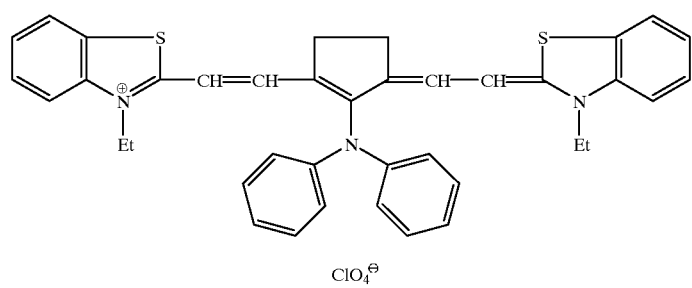 λ$_{max}$ = 801 nm
(9) 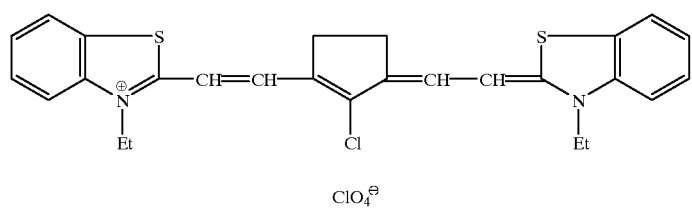 λ$_{max}$ = 819 nm
(10) 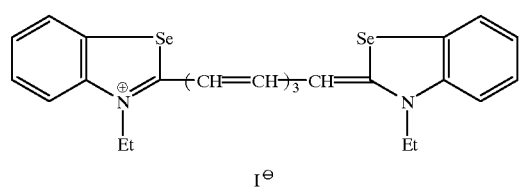 λ$_{max}$ = 769 nm
(11) 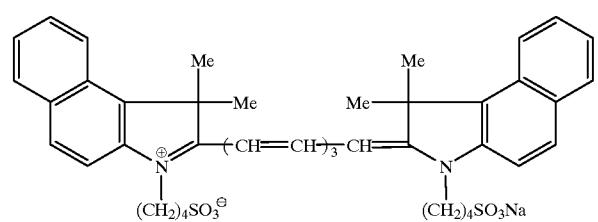 λ$_{max}$ = 785 nm -continued
(12) 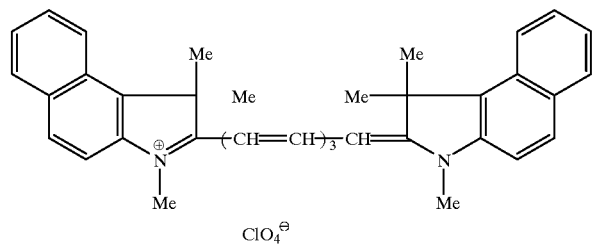 λ_max = 778 nm
(13) 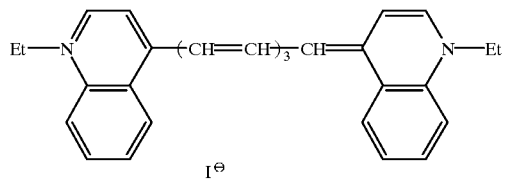 λ_max = 928 nm
(14) 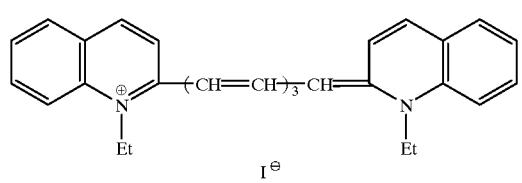 λ_max = 816 nm
(15) 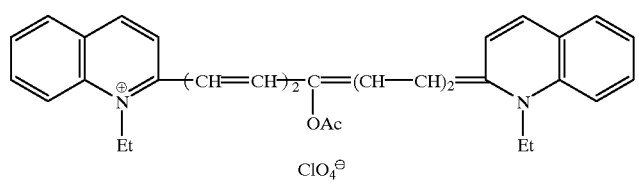 λ_max = 927 nm
(16) 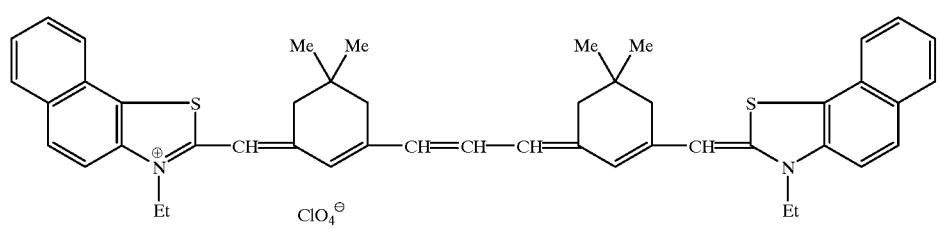 λ_max = 1050 nm
(17) 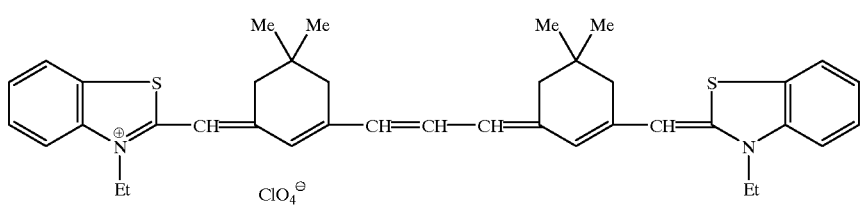 λ_max = 1010 nm
(18) 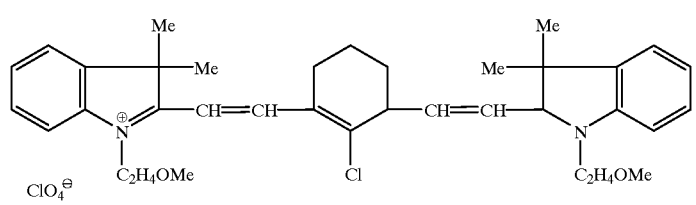 λ_max = 787 nm -continued
(19) 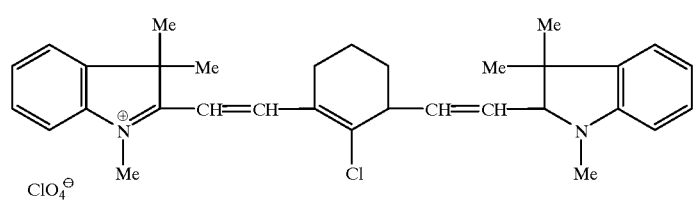 λ_max = 785 nm
(20) 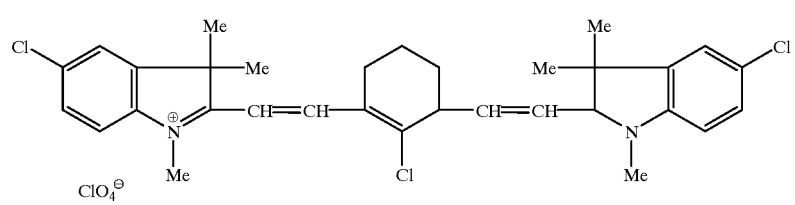 λ_max = 794 nm
(21) 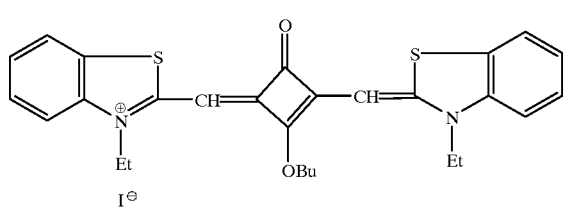 λ_max = 796 nm
(22) 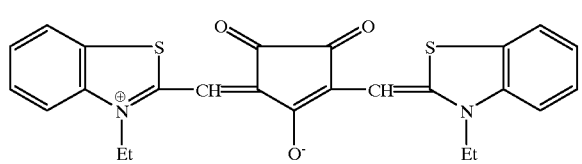 λ_max = 771 nm
(23) 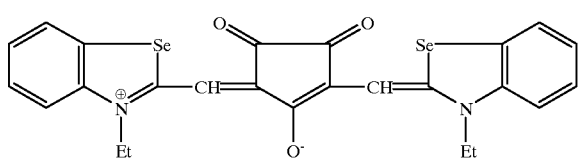 λ_max = 790 nm
(24) 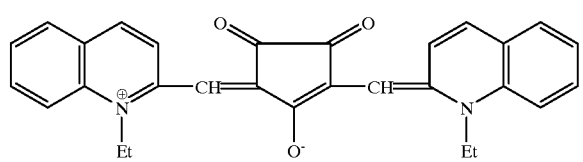 λ_max = 831 nm
(25) 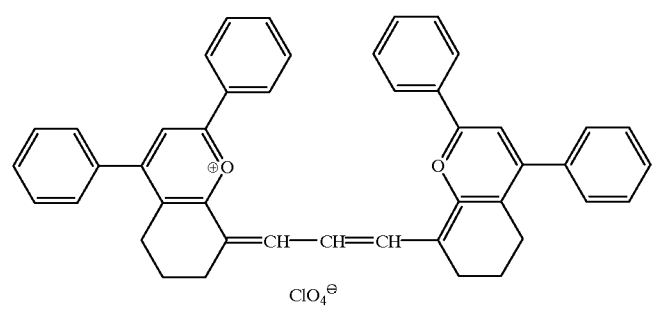 λ_max = 940 nm

(26) 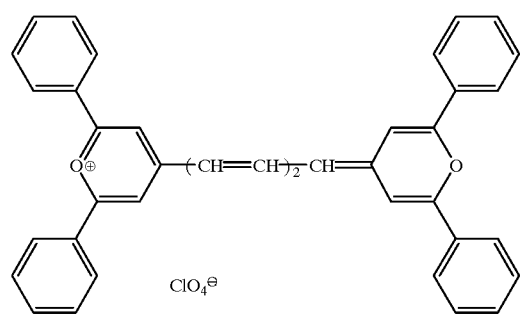 λ_max = 805 nm
(27) 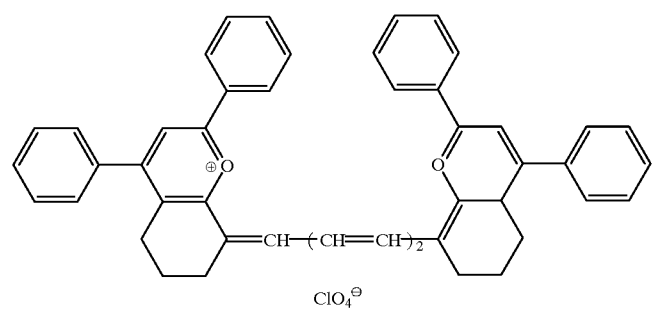 λ_max = 1060 nm
(28) 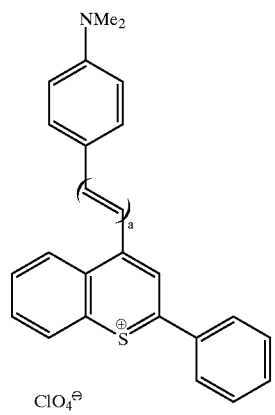 λ_max = 944 nm
(29) 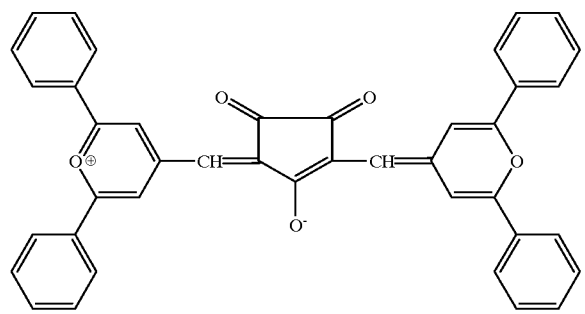 λ_max = 954 nm -continued
(30) 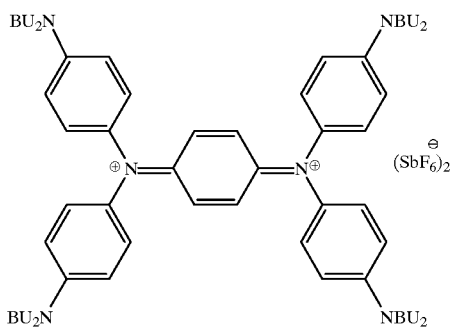 λ_max = 1090 nm
(31) 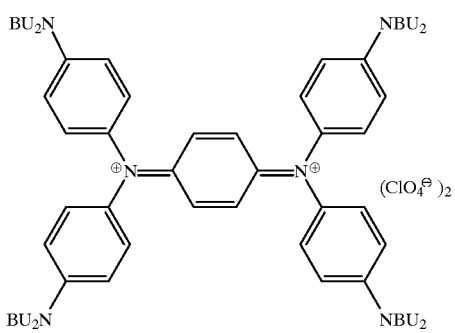 λ_max = 1090 nm
(32) 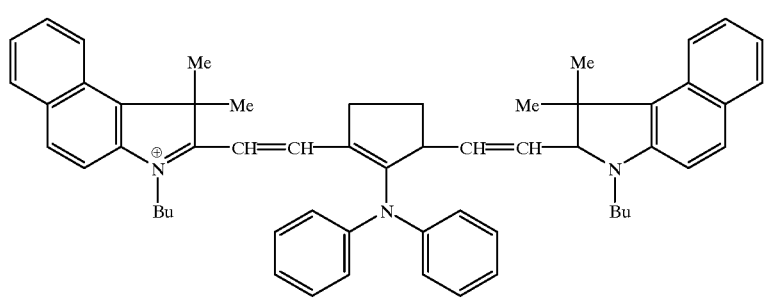 λ_max = 840 nm
(33) 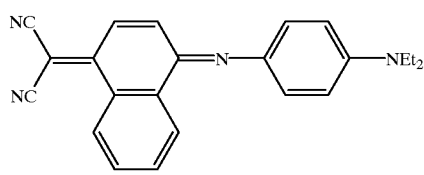 λ_max = 772 nm
(34) 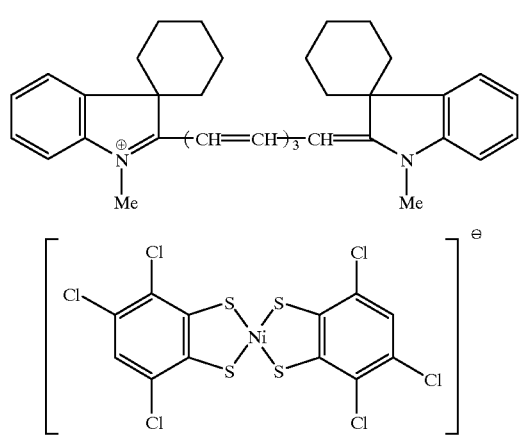 λ_max = 765 nm -continued
(35) 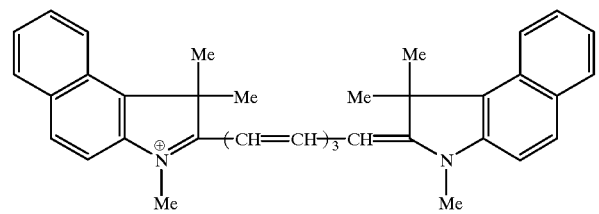 λ_max = 790 nm
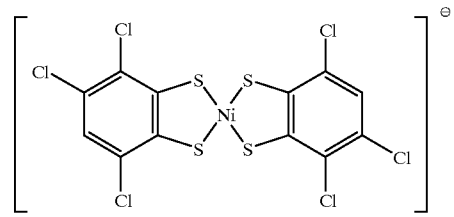
(36) 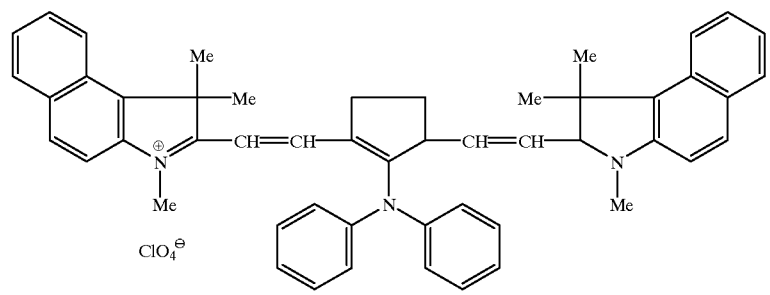 λ_max = 835 nm
(37) 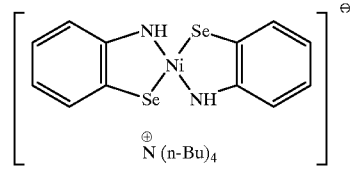 λ_max = 858 nm
(38) 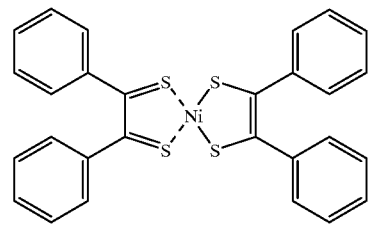 λ_max = 855 nm
(39) 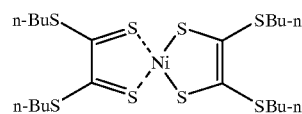 λ_max = 1010 nm -continued

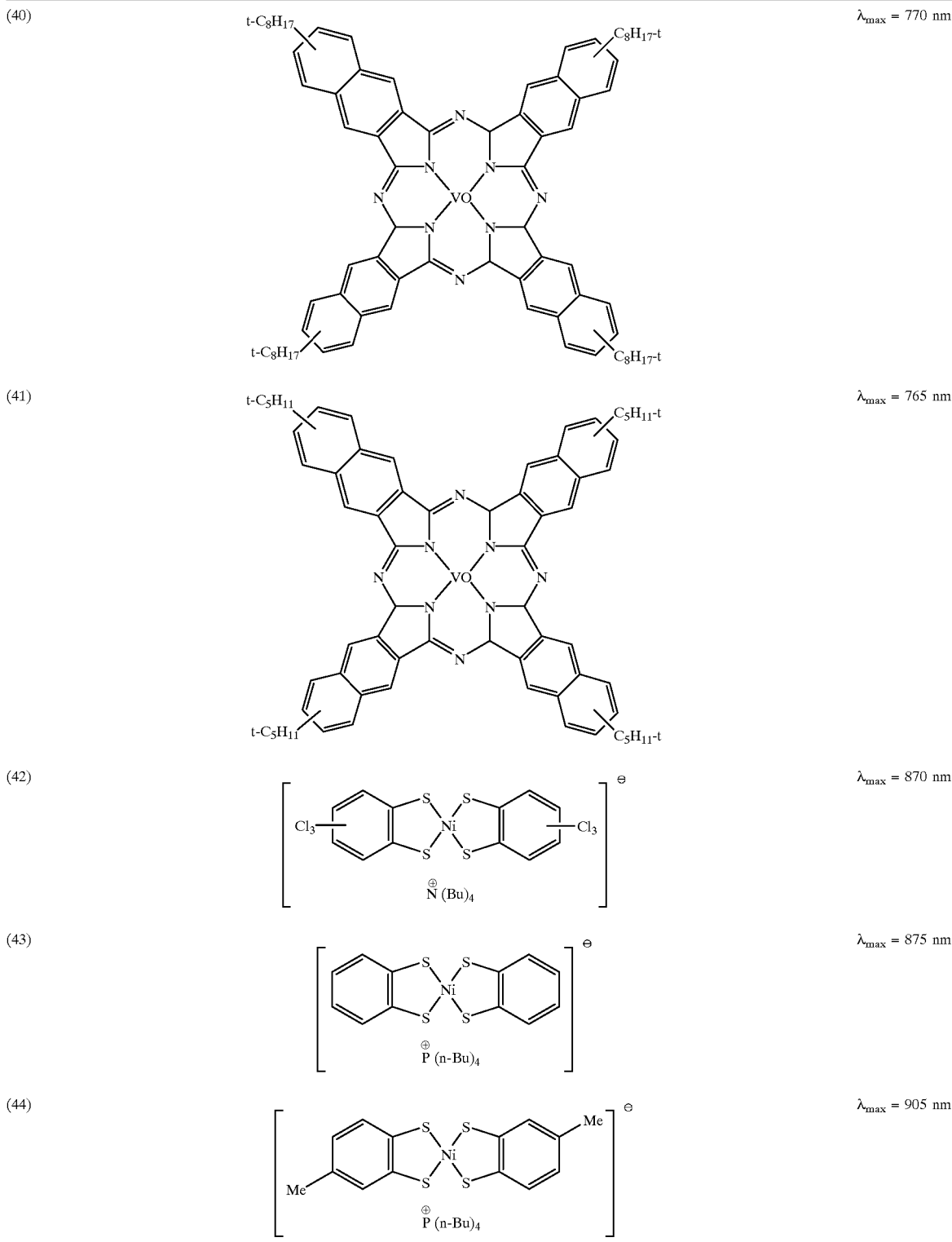

The toner according to the present invention may comprise an adequate resin material. If the toner is used in a full color electrophotographic method, it is preferable to use a substantially transparent resin material. Although the toner may contain the resin comprising the substantially transparent resin material, it is preferable to use a resin having other preferred characteristics.

It is preferable that a resin of a type which is in the form of, for example, a non-viscous solid at room temperature as to be used easily in an ordinary electrophotographic process.

It is preferable that the resin be a thermoplastic resin having a melting point higher than room temperature and lower than a level at which usual paper tends to be burnt black so that the resin can be melted on the paper when heated at the time of generating a toner image on the paper or transferring the same on to a paper copying sheet.

It should be noted that the necessity of meeting the foregoing conditions can be eliminated. The reason for this is that a resin having a higher melting point may be used and that the foregoing resin is used in another method (for example, U.S. Pat. No. 2,776,907 invented by Carlson) of applying vapor of a solvent with respect to the foregoing resin to a paper copying sheet for carrying a toner image so that it can be melted onto the paper copying sheet.

The toner may, of course, be melted onto another surface.

However, the foregoing surface enables the heating value required to melt the toner onto the foregoing surface to be adjusted due to its heat conductivity and wet characteristics. Further, it is preferable that the toner resin have-excellent frictional charging characteristics and satisfactory insulating characteristics to charge electricity as to be used in development in various electrophotographic method, such as a cascade development of an electrophotographic latent image disclosed in U.S. Pat. No. 2,618,552 invented by Wise and U.S. Pat. No. 2,638,416 invented by Walkup and Wise and the other known development method in the related technical field or an electrostatic powder image transfer method disclosed in U.S. Pat. No. 2,576,047 invented by Shaffart and U.S. Pat. No. 2,626,865 invented by Mayo.

Although an arbitrary and adequate transparent resin may be used in the toner according to the present invention, use of an esterified product composed of a vinyl resin and diol comprising dicarboxylic acid and diphenyl will enable excellent result to be obtained.

The toner according to the present invention may comprise an arbitrary and adequate vinyl resin. The vinyl resin may be a homopolymer or a copolymer of two or more types of vinyl monomers. Typical monomers for use to manufacture the vinyl polymer are exemplified by the following materials.

Styrene; p-chlorostyrene; vinyl naphthalene; ethylene unsaturated monoolefin such as ethylene, propylene, butylene or isobutylene; vinyl ester such as vinyl chloride, vinyl bromide, vinyl fluoride, vinyl acetate, vinyl propionate; vinyl benzonate; vinyl butyrate; α-methylene aliphatic monocarboxylic acid such as methyl acrylate, ethyl acrylate, n-butyl acrylate, isobutyl acrylate, dodecyl acrylate, n-octyl acrylate, 2-chloroethyl acrylate, phenyl acrylate, α-chloroacrylate, methyl methacrylate, ethyl methacrylate or butyl methacrylate; acrylonitryl, methacrylonitryl or acryl amide; vinyl ether such as vinyl methyl ether, vinyl isobutyl ether or vinyl ethyl ether; vinyl ketone such as vinyl methyl ketone, vinyl hexylketone or methyl isobrophenyl ketone; halogated vinylidene such as vinylidene chloride or vinylidene chlorine fluoride; N-vinyl compound such as N-vinyl pyrol, N-vinyl carbazole, N-vinyl indol or N-vinyl pyloridone; and their mixture.

The vinyl resin suitable for use in the toner usually has weight average molecular weight of about 3,000 to 500,000.

It is preferable to use a toner of a type containing a styrene resin in a relatively large quantity.

A further thick image can be obtained if the styrene resin is present in the toner in a quantity of 25 wt % or more of the overall weight of the resin in the toner. The styrene resin may be a homopolymer of styrene or a homolog of styrene or may be a copolymer of styrene and another monomer having a single methylene group bonded to a carbon atom with a double bond.

That is, monomers of a type that can be copolymerized with styrene by additional polymerization are as follows.

P-chlorostyrene; vinyl naphthalene; ethylene unsaturated monoolefin such as ethylene, propylene, butylene or isobutylene; vinyl ester such as vinyl chloride, vinyl bromide, vinyl fluoride, vinyl acetate, vinyl propionate, vinyl benzonate; vinyl butyrate; α-methylene aliphatic monocarboxylic acid such as methyl acrylate, ethyl acrylate, n-butyl acrylate, acrylic acid, isobutyl acrylate, dedecyl acrylate, n-octyl acrylate, 2-chloroethyl acrylate, phenyl acrylate, α-chloroacrylate, methyl methacrylate, ethyl methacrylate or butyl methacrylate; acrylonitryl, methacrylonitryl or acryl amide; vinyl ether such as vinyl methyl ether, vinyl isobutyl ether or vinyl ethyl ether; vinyl ketone such as vinyl methyl ketone, vinyl hexylketone or methyl isobrophenyl ketone; halogated vinylidene such as vinylidene chloride or vinylidene chlorine fluoride; N-vinyl compound such as N-vinyl pyrol, N-vinyl carbazole, N-vinyl indol or N-vinyl pyloridone; and their mixture.

The styrene resin may be manufactured by polymerizing a mixture of two or more types of the foregoing unsaturated monomers and a styrene monomer.

The expression "additional polymerization" includes known methods, such as a free radical polymerizing method, an anion polymerizing method, and an action polymerizing method.

The vinyl resin containing the styrene type resin may be mixed with one or more types of the other resins.

In the case where the vinyl resin is mixed with the other resin, it is preferable that the resin to be added be another vinyl resin.

The reason for this is that the obtainable mixture is characterized in that excellent frictional charging stability and uniform resistance against physical deterioration.

The vinyl resin to be mixed with the styrene resin or another resin may be manufactured by additional polymerization of an adequate vinyl monomer, such as a vinyl monomer.

Another thermal plastic resin may be mixed with the vinyl resin according to the present invention.

Typical non-vinyl thermal plastic resins are exemplified by the following materials.

In a case where phenol formaldehyde resin denatured with rosin, epoxy resin denatured with oil, polyurethane resin, fiber resin, polyether resin or the resin component of a toner of their mixture contains a mixture of styrene co-polymerized with another unsaturated monomer or polystyrene and another resin, it is preferable that the styrene is contained in a quantity of 25 wt % or more of the total weight of the resin present in the toner.

The reason for this is that a thicker image can be obtained.

A polymerized ester compound of dicarboxylic acid and diol containing diphenyl may be used as a preferred resin for the toner according to the present invention, the diphenyl reactant having the following general formula:

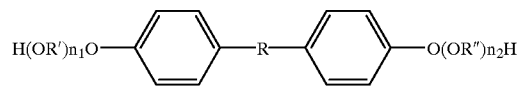

where R is an alkylene group which comprises or which does not comprise a substituent having 2 to 12 carbon atoms or alkylidene group having 1 to 12 carbon atoms; R' and R" are alkylene groups each of which comprises or which does not comprise a substituent having 2 to 12 carbon atoms, an alkylene group having 8 to 12 carbon atoms and allylene group; X and X' respectively are alkyl groups each having 1 to 4 hydrogen or carbon atoms; $n_1$ and $n_2$ respectively are 1 or larger and the average sum of $n_1$ and $n_2$ is smaller than 21. If R is the alkylidene group having 2 to 4 carbon atoms and R' and R" are alkylene groups each having 3 to 4 carbon atoms, it is preferable to use diphenol.

The reason for this is that resistance against blocking can be enlarged, the clearness of characters is improved, and the toner image can further completely be transferred.

The optimum result can be obtained in a case of diol in which R is an isopropylidene group and R' and R" are propylene group or butylene group.

The reason for this is that the resin manufactured from the foregoing diol has strong resistance against aggregation and it is able to quickly penetrate into a receiving paper sheet under the melted condition. It is preferable that dicarboxylic acid having 3 to 5 carbon atoms be used.

The reason for this is that the obtained toner resin has strong resistance against the formation of the film on an image generating surface that can be used again. Further, it has strong resistance against generation of fine powder under condition where the apparatus is being operated.

The optimum result can be obtained from use of α-unsaturated dicarboxylic acid containing fumaric acid, maleic acid or maleic acid anhydride. The reason for this is that it has the strongest resistance against physical deterioration of the toner and it can be quickly dissolved.

If an unsaturated bond is present in the reactant of the α-unsaturated dicarboxylic acid, tough resin molecules can be obtained without adverse influence upon dissolving and crushing characteristics.

Any diphenyl expressed by the foregoing formula may be used. Typical diphenyl having the foregoing general structure is exemplified by the following materials.

2,2-bis (4-β-hydroxyethoxyphenyl)-propane, 2,2-bis (4-hydroxyisopropoxyphenyl) propane, 2,2-bis (4-β-hydroxyethoxyphenyl)-pentane, 2,2-bis (4-β-hydroxyethoxyphenyl)-butane, 2-2-bis (4-hydroxypropoxyphenyl)-propane, 2,2-bis (4-hydroxypropoxyphenyl) propane, 2,2-bis (4-hydroxypropoxyphenyl) propane, 1,1-bis (4-hydroxy-ethoxyphenyl)-butane, 1,1-bis (4-hydroxyisopropoxyphenyl) heptane, 2,2-bis (3-methyl-4-β-hydroxyethoxyphenyl) propane, 1,1-bis (4-β-hydroxyethoxyphenyl)-cyclohexane, 2,2'-bis (4-6-hydroxyethoxyphenyl)-norvalnan, 2-2-bis (4-β-hydroxystryloxyphenyl) propane, polyoxyethylene ether of isopropylidene diphenol (the two phenolhydroxyl groups are oxyethlated and the average oxyethylene group per mole is 2.6), polyoxypropylene ether of 2-butylidenediphenyl (the two phenol hydroxy groups are oxyalkylated and the average oxypropylene groups is 2.5). It is preferable that diphenol is used in which R is an alkylidene group having 2 to 4 carbon atoms and R' and R" are alkylene groups each having 3 to 4 carbon atoms.

The reason for this is that resistance against formation into a block can be strengthened, the clearness of characters can be improved and the tone image transference can be performed further completely. The optimum result can be realized in a case where diol is used which is selected from a group in which R is isopropylidine and R' and R" are propylene and butylene. The reason for this is that the resin obtainable from the foregoing diol has further strong resistance against formation of blocks and it can considerably quickly be penetrated into a paper receiving sheet under the melted condition.

Any arbitrary dicarboxylic acid is able to react with the foregoing diol so that the toner resin according to the present invention is manufactured. The foregoing acid may be substituted, not substituted, saturated or not saturated. The foregoing acid is expressed by the following general formula:

$$HOOCR'''n_3COOH$$

where R''' is an alkylene group which has a substituent or which has no substituent and which has 1 to 12 carbon atoms, an allylene group or an alkylene allylene group having 10 to 12 carbon atoms, and $n_3$ is smaller than 2. In this specification ("What is claimed is" included), the expression "dicarboxylic acid" includes anhydride of the foregoing acid (a case where the hydride is present). Typical dicarboxylic acid includes the following materials: oxalic acid, malonic acid, succinic acid, glutaric acid, adipic acid, pimeric acid, suberic acid, azelaic acid, sebacic acid, phthalic acid, mesaconic acid, homophthalic acid, isophthalic acid, telephthalic acid, O-phenyl acetate-β-propionic acid, itaconic acid, maleic acid, maleic anhydride, fumaric acid, phthalic anhydride, traumatinic acid, and citraconic acid.

It is preferable to use dicarboxylic acid having 3 to 5 carbon atoms. The reason for this is that the obtainable toner resin has strong resistance against formation of film on the image generating surface that can be used again. Further, it has resistance against generation of fine powder in a state where the apparatus is being operated. The optimum result can be obtained from α-unsaturated dicarboxylic acid including fumaric acid, maleic acid or maleic anhydride.

The reason for this is that maximum resistance against physical deterioration of the toner can be obtained, and molten substance can quickly be obtained. Although the mechanism has not been cleared yet, it can be considered that the presence of an unsaturated bond in the a-unsaturated dicarboxylic acid reactant enables further tough resin molecules to be obtained while preventing an adverse influence upon the melting characteristics and crushing characteristics.

The polymerized esterified product to be contained in the toner according to the present invention may be copolymerized or mixed with one or more thermal plastic resins if necessary. If it is mixed with another thermal plastic resin, it is preferable that the resin to be added is an aromatic resin, an aliphatic resin or their mixture. The reason for this is that the obtainable mixture has uniform density and excellent prediction for each batch due to its physical properties. A great number of types of thermal plastic resins is able to mix with the resin according to the present invention. Typical thermal plastic resins are as follows.

Formaldehyde resin denatured with rosin, epoxy resin denatured with oil, polyurethane resin, fiber resin, vinyl resin and their mixture.

If the resin component in the toner contains the additive resin, the additive component must be contained in a quantity of about 50 wt % or less with respect to the overall weight of the resin present in the toner. It is preferable that the condensation-polymerized product of diol and dicarboxylic acid be present in a relatively large quantity in the resin component of the toner. The reason for this is that the melting temperature is further lowered if the additive material is added in a predetermined quantity. If the condensation-polymerized product of diol and dicarboxylic acid is contained in the toner in a large quantity, a clearer and thicker image can be obtained. The additive resin may be contained in the toner mixture by any one of methods selected from a group consisting of a hot melting method, a solvent method and an emulsifying method. The obtainable resin mixture and the copolymer have a substantially uniform characteristic and they are satisfactorily adaptable to the pigment and the dye. The coloring agent may be added prior to, simultaneously with or after performing the polymerizing process.

It is preferable that an adequate vinyl resin or a polyester alkyd resin be added to the toner according to the present invention. The optimum result can be obtained in electrophotography if any one of the following materials is used which is selected from a group consisting of styrene-butyl methacrylate copolymer, styrene-vinyl toluene copolymer, styrene-acrylate copolymer, polystyrene resin, a resin mainly composed of styrene of a type disclosed in Reissue U.S. Pat. No. 25,136 disclosed by Carlson, a resin mainly composed of polystyrene, and a polystyrene mixture disclosed in U.S. Pat. No. 2,788,288 by Rheinfrank and Jones.

The toner composition according to the present invention can be manufactured by any one of known toner mixing methods and crushing methods. For example, a method may be employed in which the components are mixed and kneaded, and the obtained mixture is fined to sufficiently mix the components. The toner particles can be formed by another known method, such as a method using a suspension fluid of the toner composition, a method using a hot molten substance or a method of spraying and drying a solution.

If the toner mixture according to the present invention is adapted to a cascade development method, the toner must have an average particle size of about 30 $\mu$ or less. In order to obtain the optimum result, it is preferable that the average particle size ranges about 5 to about 17 $\mu$. If the toner mixture is used in the powder cloud development method, it is preferable that the particle size be slightly smaller than 1 $\mu$.

A coated or non-coated carrier substance has been known which is adaptable to the cascade development method or the magnetic brush development method.

The carrier particles may be electroconductive, insulating, magnetic or non-magnetic particles. However, the necessity lies in that the carrier particles are supplied with a charge, the polarity of which is opposite to the polarity of the toner particles when the toner particles adhere to the carrier particles and the carrier particles are brought into contact with the toner particles as to surround the toner particles. If positive copying of an electrostatic latent image is required, the carrier particles must have a charge, the polarity of which is opposite to the magnetism of the electrostatic latent image. If inverse copying of the electrostatic latent image is desired, the carrier particles must have the same polarity as that of the electrostatic latent image.

As described above, the material of the carrier particles is selected depending upon the frictional charging characteristics in relation to the toner to be charged such that a first component of the developer is charged positively if the residual component of the developer is at a lower position in the frictional charging sequence with respect to the first component of the developer. On the other hand, the residual component is charged negatively if the residual component is at an upper position than the position of the first component in the frictional charging sequence. By adequately selecting the material depending upon the influence of the frictional charge of the material, the charged polarity of the materials is made as follows at the time of the foregoing mixture: the charged toner particles adhere to the surfaces of the carrier particles as to be coated on the surfaces while being allowed to adhere to the portions of the electrostatic image carrying surfaces having larger attracting force.

Typical carriers are exemplified by sodium chloride, ammonium chloride, aluminum potassium chloride, Rochelle salt, sodium nitrate, methyl methacrylate, glass and silicon dioxide. The carrier may be used together with the coating material or used without the coating material.

A large portion of the typical carriers has been disclosed in U.S. Pat. No. 2,618,551 and U.S. Pat. No. 2,638,416 respectively disclosed by L. E. Warcup and U.S. Pat. No. 2,618,552 disclosed by E. N. Wise.

It is preferable to use carrier particles each having a diameter of about 50 to about 1,000 $\mu$ and finally coated.

The reason for this is that the carrier particles have sufficient density and inertia to prevent the adhesion to the electrostatic image. The adhesion of the carrier particles to the surface of the photosensitive drum must be prevented because the surface is caused to have a deep flaw in a case where cleaning is performed by a web cleaner using a web arranged as disclosed in U.S. Pat. No. 3,186,838 disclosed by W. P. Graff, Jr. and the like during the process of transferring the image and during the process of cleaning the drum.

When the carrier particles are allowed to adhere to the image generating surface of the photosensitive member, deletion of copying takes place. In general, a satisfactory result can be obtained when a toner in a quantity of about one part by weight is used together with about 10 to about 200 parts of the carrier.

The toner composition according to the present invention can be used to form an electrostatic latent image on an ordinary photoconductive surface and an adequate electrostatic latent image holding surface.

Typical photoconductive substances have been disclosed in U.S. Pat. No. 2,803,542 filed by Walrich, U.S. Pat. No. 2,970,906 filed by Bixby, U.S. Pat. No. 3,121,007 filed by Middleton, and U.S. Pat. No. 3,151,982 filed by Corrsin.

50 parts by weight of a copolymer of 65 parts by weight of styrene and 35 parts by weight of butyl methacrylate and 1 part by weight of transparent infrared ray absorbing coloring material (SIR-159 manufactured by Mitsui Toatsu) were used so that an infrared ray absorbing toner mixture was prepared. The infrared ray absorbing toner mixture was melted and previously mixed, and then the composition was kneaded in a roll mill so that the near infrared ray absorbing coloring material was uniformly dissolved and dispersed. The obtained composition was cooled, and fined by a jet crushing machine so that near infrared ray absorbing toner having an average particle size of 10 $\mu$m was obtained.

Sixth Embodiment

The toner according to the fifth embodiment and the two-component cascade developer disclosed in U.S. Pat. No. 2,618,551 were mixed. The foregoing toner was allowed to adhere to the electrostatic latent image formed on an image carrier comprising an OPC by a cascade development method so that the image was developed. Then, the image was transferred to paper by an electrostatic transfer method before it is melted and fixed by a hot roller.

The obtained record could not visually be judged. Reflection spectrum measured with a spectrum light intensity meter Shimazu UV-3100S is shown in FIG. 22.

Figure 22:
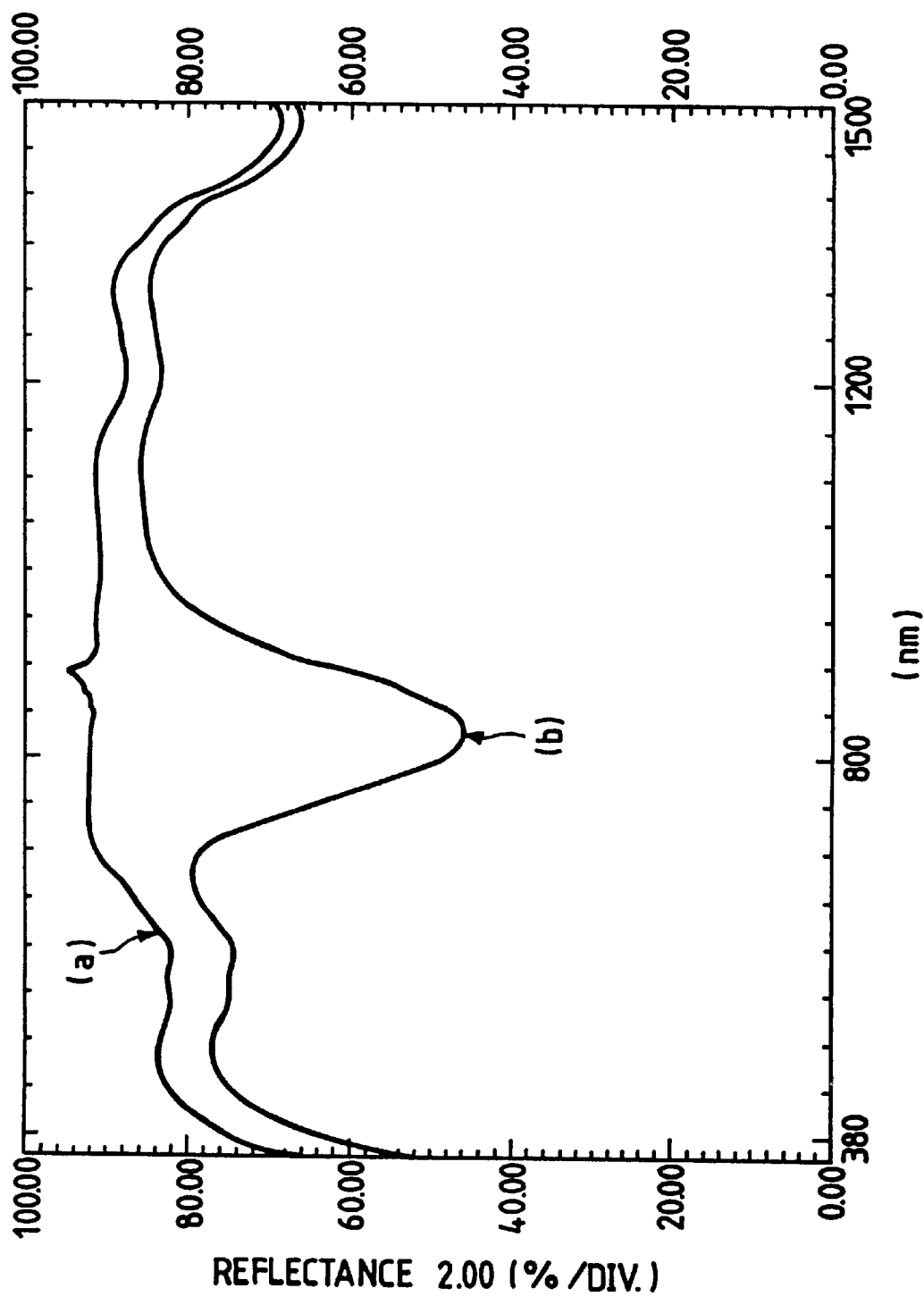
FIG. 22 illustrates reflection spectrum of an image recorded with the toner according to the present invention.

FIG. 22 shows the reflection spectrum of the paper used in the foregoing process.

Seventh Embodiment

Figure 23:
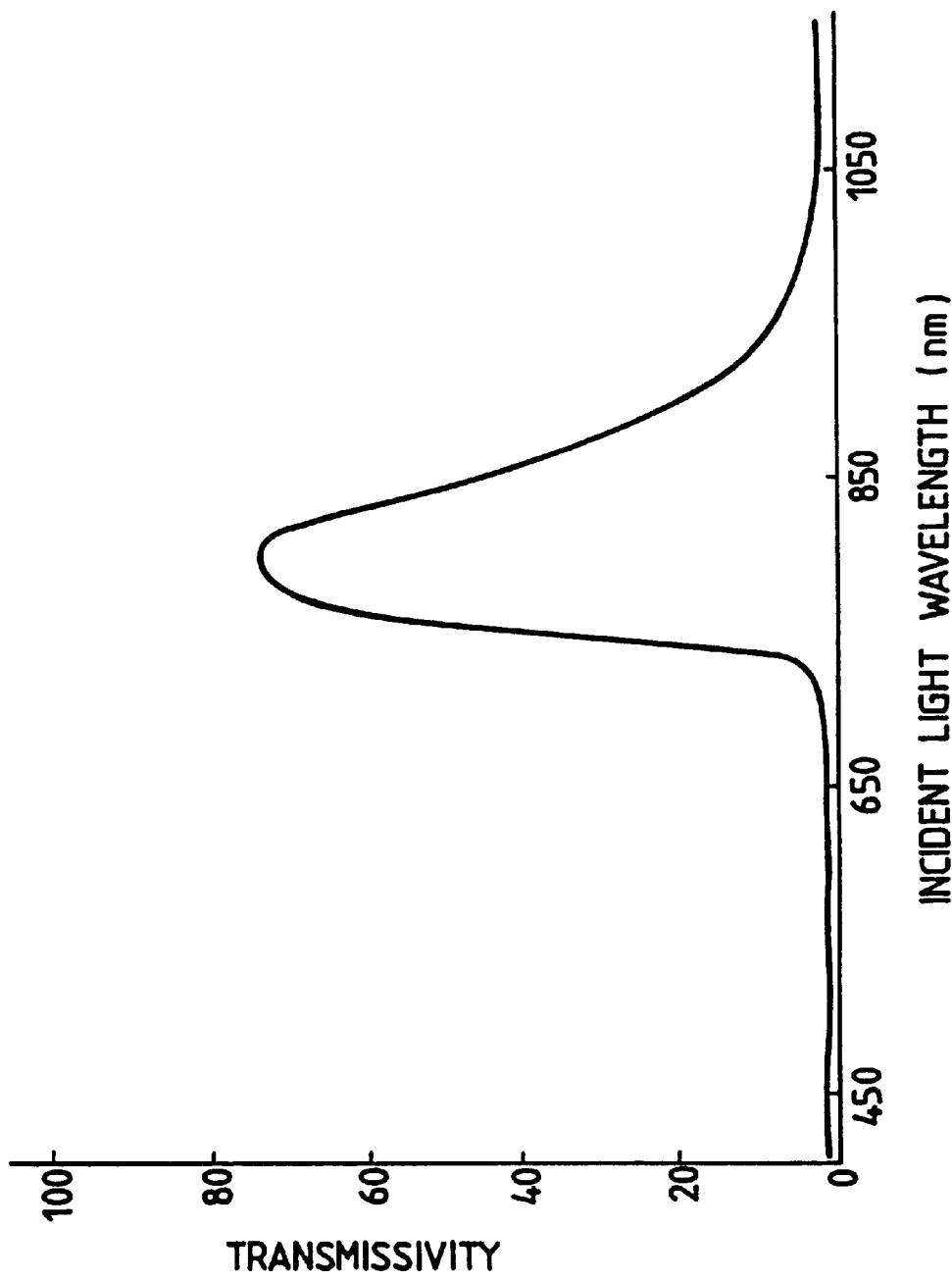
FIG. 23 illustrates a transmission spectrum of a filter for the CCD for use to reproduce information recorded with the toner according to the present invention.

The image recorded in the process according to the sixth embodiment was read by a digital copying machine (CLC-500 manufactured by Canon) having the filter shown in FIG. 23, and the read image was converted into a visible image which was then transmitted, resulting in an excellent image to be obtained.

Eighth Embodiment

The image recorded on the paper in the process according to the sixth embodiment was intended to be read and copied by the digital copying machine (CLC-500 manufactured by Canon) having a usual filter, resulting in no image to be obtained.

As described above, the toner particles containing the resin and the coloring agent were used as the developer for recording secret information by the electrophotographic method. The fact that the coloring agent is the near infrared ray absorbing coloring material or pigment which does not absorb visible rays but which absorbs near infrared rays enables an effect to be obtained in that secret recording can be performed with a usual copying machine or in a usual photography.

According to the present invention, there are provided a recording medium having invisible information for assuredly judging a specific image such as a bill with a low cost and an invisible information detection apparatus capable of detecting and utilizing the foregoing mark.

According to the present invention, there is provided an invisible information recording medium serving as recording paper capable of easily identifying a specific original document which must not be copied.

According to the present invention, there is provided a novel recording material for use in an image forming apparatus, such as a copying machine, and more particularly, in an electrophotographic apparatus.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An invisible information detection apparatus comprising:

irradiation means for irradiating a light onto a medium;

detection means for detecting invisible information which is defined by an infrared light generated from the medium, in accordance with the irradiation by said irradiation means; and judgement means for judging a specific pattern consisting of a plurality of same shape patterns on the medium from reflection characteristics of the medium corresponding to said detected invisible information, wherein one of said same shape patterns represents higher reflectance than reflectance of the medium in substantially same infrared wavelength region and the other of said same shape patterns represents lower reflectance than the reflectance of the medium.

2. An apparatus according to claim 1, wherein said irradiation means irradiates the light onto the medium, and a wavelength of the light irradiated has a difference of at least 50 nm from a wavelength of the infrared wavelength region.

3. An apparatus according to claim 2, wherein the infrared wavelength region is a wavelength region of 700 m to 1100 nm.

4. An apparatus according to claim 1, wherein said detection means detects invisible information which is defined by an excitation light excited by the light irradiated by said irradiation means.

5. An apparatus according to claim 4, wherein the irradiated light is an ultraviolet light.

6. An apparatus according to claim 4, wherein the irradiated light is a visible light.

7. An apparatus according to claim 1, wherein the medium has substantially constant reflectance for the irradiated light of 450 nm to 1200 nm.

8. An apparatus according to claim 1, further comprising:

reader means for reading visible information of the medium; and process means for processing the read visible information in accordance with a judgment result of said judgment means.

9. An apparatus according to claim 8, wherein, in a case where the judgment result directs that the specific image is not judged, said process means performs an image formation according to the visible information.

10. An apparatus according to claim 8, wherein, in a case where the judgment result directs that the specific image is judged, said process means does not perform an image formation according to the visible information.

11. An apparatus according to claim 1, further comprising reader means for reading visible information of the medium, and wherein said judgment means performs the judgment in accordance with the detection result and the read visible information.

12. An invisible information detection method comprising:

an irradiation step of irradiating a light onto a medium;

a detection step of detecting invisible information which is defined by an infrared light generated from the medium, in accordance with the irradiation in said irradiation step; and a judgement step of judging a specific pattern consisting of a plurality of same shape patterns on the medium from reflection characteristics of the medium corresponding to said detected invisible information, wherein one of said same shape patterns represents higher reflectance than reflectance of the medium in substantially same infrared wavelength region and the other of said same shape patterns represents lower reflectance than the reflectance of the medium.

* * * * *

UNITED STATES PATENT AND TRADEMARK OFFICE
CERTIFICATE OF CORRECTION

PATENT NO. : 6,153,879
DATED : November 28, 2000
INVENTOR(S) : Kazuo Yoshinaga et al.

It is certified that error appears in the above-identified patent and that said Letters Patent is hereby corrected as shown below:

Column 1,
Line 17, "arises" should read -- raises --.
Line 22, "have" should read -- have been --.
Line 38, "informed." should read -- detected. --.

Column 4,
Line 26, "tehreon" should read -- thereon --.

Column 23,
Line 23, "do" should read -- does --.

Column 24,
Line 29, "do" should read -- does --.
Line 38, "resisntace." should read -- resistance. --.

Column 47,
Line 22, "anti-oxidant" should read -- antioxidant --.
Line 31, "In usual," should read -- Usually, --.
Line 55, "on to" should read -- onto --.

Column 48,
Line 54, "a" should read -- an --.

Column 49,
Line 20, "10 1m" should read -- 10 $\mu$m --.

Column 52,
Line 31, "Ar" should read -- A, --.
Line 32, "Bo" should read -- B, --.

Column 78,
Line 53, "usual" (first occurrence) should read -- conventional -- and "in a usual" should read -- by conventional --.

Column 94,
Line 66, "as" should read -- is --.

Column 95,
Line 19, "have-excellent" should read -- have excellent --.
Line 22, "method," should read -- methods, --.
Line 28, "Shaffart" should read -- Shaffert --.

UNITED STATES PATENT AND TRADEMARK OFFICE
CERTIFICATE OF CORRECTION

PATENT NO. : 6,153,879
DATED : November 28, 2000
INVENTOR(S) : Kazuo Yoshinaga et al.

It is certified that error appears in the above-identified patent and that said Letters Patent is hereby corrected as shown below:

Column 100,
Line 6, "Warcup" should read -- Walkup --.
Line 9, "finally" should read -- finely --.
Line 54, "is" should read -- was --.

Column 101,
Line 14, "usual" (first occurrence) should read -- conventional -- and "in a usual" should read -- by conventional --.
Line 30, "particularly," should read -- particularity --.

Column 102,
Line 2, "m" should read -- nm --.

Signed and Sealed this

Fourteenth Day of May, 2002

*Attest:*

JAMES E. ROGAN
*Attesting Officer*   *Director of the United States Patent and Trademark Office*